US005491535A

United States Patent [19]

Hirata et al.

[11] Patent Number: 5,491,535

[45] Date of Patent: Feb. 13, 1996

[54] CONTROL APPARTUS OF COPYING MACHINE WITH IMPROVED COMMUNICATION FUNCTION FOR CENTRALIZED CONTROL

[75] Inventors: Sumiaki Hirata; Kazunobu Maekawa; Kenzo Nagata, all of Aichi, Japan

[73] Assignee: Minolta Camera Kabushiki Kaisha, Osaka, Japan

[21] Appl. No.: 188,121

[22] Filed: Jan. 28, 1994

Related U.S. Application Data

[63] Continuation of Ser. No. 682,107, Apr. 8, 1991, abandoned.

[30] Foreign Application Priority Data

| | | | |
|---|---|---|---|
| Apr. 10, 1990 | [JP] | Japan | 2-95268 |
| Apr. 10, 1990 | [JP] | Japan | 2-95269 |
| Apr. 10, 1990 | [JP] | Japan | 2-95270 |
| Jun. 6, 1990 | [JP] | Japan | 2-148168 |
| Jun. 29, 1990 | [JP] | Japan | 2-173579 |
| Jul. 18, 1990 | [JP] | Japan | 2-190101 |
| Aug. 1, 1990 | [JP] | Japan | 2-204423 |

[51] Int. Cl.[6] .......... G03G 21/00; H04M 11/00

[52] U.S. Cl. .......... 355/204; 355/205; 355/206; 355/208; 379/100; 379/106

[58] Field of Search .......... 355/202, 203, 355/204, 205, 206, 207, 208; 379/100, 92, 106, 107, 104

[56] References Cited

U.S. PATENT DOCUMENTS

| | | | |
|---|---|---|---|
| 3,997,873 | 12/1976 | Thornton | 340/149 R |
| 4,086,434 | 4/1978 | Bocchi | 179/2 |
| 4,104,486 | 8/1978 | Martin et al. | 379/106 |
| 4,167,322 | 9/1979 | Yano et al. | 355/204 X |
| 4,241,237 | 12/1980 | Paraskevakos et al. | 379/107 X |
| 4,322,813 | 3/1982 | Howard et al. | 364/900 |
| 4,361,851 | 11/1982 | Asip et al. | 358/84 |
| 4,390,953 | 6/1983 | Johnstone et al. | 364/474 |
| 4,495,596 | 1/1985 | Sciulli | 379/107 X |
| 4,497,037 | 1/1985 | Kato et al. | 364/900 |
| 4,549,044 | 10/1985 | Durham | 179/5 R |
| 4,583,834 | 4/1986 | Seko et al. | 355/14 |
| 4,739,366 | 4/1988 | Braswell et al. | 355/14 |
| 4,766,548 | 8/1988 | Cedrone et al. | 364/479 |
| 4,797,706 | 1/1989 | Sugishima et al. | 355/200 X |
| 4,893,248 | 1/1990 | Pitts et al. | 379/106 X |
| 4,979,132 | 12/1990 | Sugimoto | 364/520 |

(List continued on next page.)

FOREIGN PATENT DOCUMENTS

| | | |
|---|---|---|
| 59-142559 | 8/1984 | Japan . |
| 60-90460 | 5/1985 | Japan . |
| 63-286095 | 11/1988 | Japan . |
| 63-301667 | 12/1988 | Japan . |

OTHER PUBLICATIONS

Research Newsletter, Dataquest, "Remote Diagnostic–Tool Kit of the Future", 1989, pp. 1–6.

*Primary Examiner*—A. T. Grimley
*Assistant Examiner*—Nestor R. Ramirez
*Attorney, Agent, or Firm*—Burns, Doane, Swecker & Mathis

[57] ABSTRACT

A copying machine control system in accordance with the present invention includes a control terminal collecting data about a copying machine and a centralized control unit collecting data from the control terminal. The centralized control unit includes a first timer device for counting the present time, and a transmitting device for transmitting the present time counted by the first timer device as the present time data. The control terminal includes a first receiving device for receiving the data from the copying machine, a second timer device for counting the present time, a communication device for communicating with the centralized control unit on the basis of the data received by the first receiving device when the present time counted by the second timer device comes to a predetermined time, a second receiving device for receiving the present time data from the transmitting device of the centralized control unit, and a correcting device for correcting the present time counted by the second timer device on the basis of the present time data received by the second receiving device.

22 Claims, 45 Drawing Sheets

U.S. PATENT DOCUMENTS

| | | | |
|---|---|---|---|
| 4,994,926 | 2/1991 | Gordon et al. | 358/400 |
| 4,996,703 | 2/1991 | Gray et al. | 379/40 |
| 5,057,866 | 10/1991 | Hill, Jr. et al. | 355/205 |
| 5,077,582 | 12/1991 | Kravette et al. | 355/206 |
| 5,081,680 | 1/1992 | Bennett | 380/50 |
| 5,084,875 | 1/1992 | Weinberger et al. | 355/205 X |
| 5,142,324 | 8/1992 | Ito | 355/206 |
| 5,157,716 | 10/1992 | Naddor et al. | 379/92 |
| 5,184,179 | 2/1993 | Tarr et al. | 355/206 |
| 5,214,772 | 5/1993 | Weinberger et al. | 395/575 |
| 5,216,461 | 6/1993 | Maekana et al. | 355/202 |
| 5,220,380 | 6/1993 | Hirata et al. | 355/204 |
| 5,282,127 | 1/1994 | Mill | 355/206 X |
| 5,300,980 | 4/1994 | Maekawa et al. | 355/204 |

FIG.3
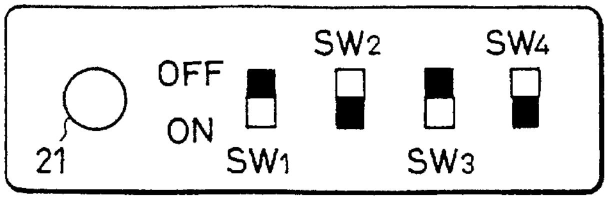
FIG.4
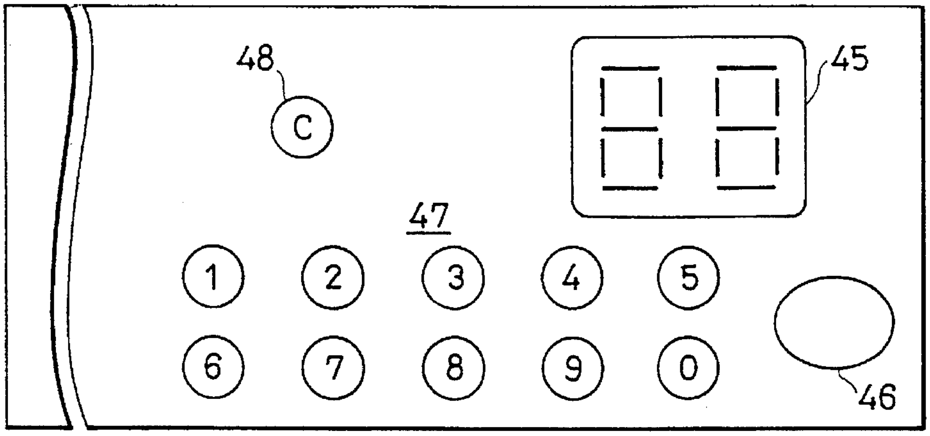
FIG.5
| | | | | | | | |
|---|---|---|---|---|---|---|---|
| $b_7$ | $b_6$ | $b_5$ | $b_4$ | $b_3$ | $b_2$ | $b_1$ | $b_0$ |
DISCHARGE CODE : A SHEET OF PAPER DISCHARGE = TRAILING EDGE OF $b_0$
JAM CODE : $b_7 = 1$, $b_6 = 0$
TROUBLE CODE : $b_7 = 1$, $b_6 = 1$

CONTROL APPARTUS OF COPYING MACHINE WITH IMPROVED COMMUNICATION FUNCTION FOR CENTRALIZED CONTROL

This application is a continuation of application Ser. No. 07/682,107, filed Apr. 8, 1991, now abandoned.

BACKGROUND OF THE INVENTION

1. Field of the Invention

The present invention relates to a copying machine controlling system, and particularly to copying machine controlling apparatus functioning as terminal devices and a copying machine controlling system including the copying machine controlling apparatus and a centralized control unit.

2. Description of the Related Art

A system for management of a plurality of copying machines is disclosed in U.S. Pat. No. 4,583,834. In the disclosed system, various operating data of the copying machine such as a total number of copies, machine malfunctions and amounts of remaining copy sheets and toner are transmitted to a computer through a communication network. The computer processes the transmitted data and feeds back to the copying machine instructions.

In a copying machine controlling system in which condition data of each copying machine is collected to a control center through a communication line from each copying machine controlling apparatus as a terminal device, a method of transmitting data from each copying machine controlling apparatus side in data transmission is introduced. This is because not only periodical data collection but also data collection for trouble occurrence of copying machines and so forth are demanded.

Therefore, in the above system, periodical transmission times from respective copying machine controlling apparatus are set different from each other in order to prevent overlapping transmission.

In a timer provided inside each copying machine controlling apparatus, however, an error peculiar to each timer is developed after a long time period, resulting in a cause of the above transmission overlap.

A system is proposed for communication between a central control unit and a terminal device through a network (a public telephone network) in an apparatus equivalent to the above.

In a system in which control data for a plurality of copying machines are transmitted from respective terminal devices to a control unit on the center side through a communication network (a public telephone network) for centralized control, connection between the terminal devices and the control unit on the center side sometimes can not be made.

For example, it is when the network connection can not be made because of overlapping dialing from a number of terminal devices, or when some operational fault occurs in the control unit on the center side.

In such cases, re-dialing may be made after a predetermined time period. In the case where dialing from a great number of terminals overlap, however, in spite of the re-dialing, it is difficult to make connection with the centralized control unit.

Accordingly, the connection with a control center can not be made in some cases even when data communication must be made immediately with the control center side.

As a case where the connection with the central control unit is impossible, for example, occupation of the communication line on the center side due to successive dialings from a large number of communication terminal devices is possible.

In such a case, after a predetermined time period, for example, it is desired to quickly make a connection to the center side by automatic redialing.

Accordingly, general devices and networks such as a telephone machine and a facsimile are usually shared as the above-described communication terminal devices and communication networks.

Accordingly, when the probability of line connection with the center side is low (a large number of dialings are overlapping, for example), it is not preferable to repeat redialing because it occupies the line on the user side in vain to limit use of a telephone machine and the like.

Furthermore, in a system for controlling in a centralized manner a large number of copying machines (precisely speaking, copying machine controlling apparatus connected to respective copying machines) through a communication line, a peculiar fixed time transmission time is assigned to each copying machine controlling apparatus, and a corresponding copying machine controlling apparatus and the centralized control unit are connected with each other at the fixed time transmission time for communication of predetermined data.

Also, not only data communication at the fixed time transmission time, but also data communication required for dealing with a trouble is also made by making a connection with the centralized control unit when a trouble occurs, for example.

As described above, however, the data communication between copying machine controlling apparatus and the centralized control unit is made through a communication line, so that a connection with the centralized control unit can not be made when a telephone machine or the like sharing the communication line is in use even at the fixed time transmission time, for example.

Connection with the centralized control unit can not be made either in data communication between another copying machine controlling apparatus and the centralized control unit when some trouble occurs in another copying machine controlling apparatus.

In such a case, a re-dialing time is automatically set by the copying machine controlling apparatus to call the centralized control unit again at the re-dialing time.

Accordingly, when a fixed time transmission time of a certain copying machine controlling apparatus is set in a time zone in which connection with the centralized control unit is difficult due to some reasons, re-calling of the centralized control unit frequently takes place in the particular copying machine controlling apparatus. This is useless and also prevents use of a telephone machine sharing the communication line by occupying the communication line of the particular user, for example.

The time period in which connection with the centralized controlling unit is difficult includes a time period in which a user of a particular copying machine controlling apparatus frequently uses a telephone machine, a time period in which a trouble is likely to occur ill each copying machine controlling apparatus, and a time period in which a power supply is turned on in each copying machine controlling apparatus and calling frequently takes place like early in the morning.

SUMMARY OF THE INVENTION

It is an object of the present invention to enhance a connection rate with a centralized control unit in a controlling apparatus communicating with the centralized control unit.

It is another object of the present invention to avoid overlapping transmission from a plurality of controlling apparatus in a controlling apparatus communicating with the centralized control unit.

It is still another object of the present invention to control the possibility of connection with the centralized control unit according to the degree of emergency of communication in a controlling apparatus communicating with the centralized control unit.

It is yet another object of the present invention to enhance the rate of connection of urgent communication with the centralized control unit in a controlling apparatus communicating with the centralized control unit.

It is still another object of the present invention to decrease excessive re-dialing when the rate of communication connection with the centralized control unit in a controlling apparatus communicating with the centralized control unit.

it is yet another object of the present invention to make communication to the centralized control unit at an appropriate time depending on the communication contents in a control apparatus communicating with the centralized control unit.

It is still another object of the present invention to solve inconvenience when a fixed time transmission time is set in a time period in which connection with the centralized control unit is difficult in a control apparatus communicating with the centralized control unit..

In order to achieve the above objects, a control apparatus according to one aspect of the present invention is a controlling apparatus collecting data related to a copying machine and communicating with a centralized control unit on the basis of the collected data, including first receiving means for receiving data from the copying machine, timer means for counting the present time, communication means for communicating with the centralized control unit on the basis of the data received by the first receiving means when the counted present time becomes a predetermined time, second receiving means for receiving present time data from the centralized control unit, and correcting means for correcting the present time counted by the timer means on the basis of the present time data received by the second receiving means.

In a control apparatus configured as described above, the counted present time is corrected on the basis of the time data received from the centralized control unit, so that communication with the centralized control unit based on the time always accurate is made possible.

In order to achieve the above objects, a control apparatus in accordance with another aspect of the present invention is a controlling apparatus collecting data related to a copying machine and communicating with a centralized control unit on the basis of the collected data, including communication means for calling the centralized control unit, first control means for activating the communication means when a predetermined transmission condition is satisfied, the predetermined transmission condition including one with high priority and one with low priority, and determining means for determining that connection with the centralized control unit is impossible is spite of activation of the communication means, differentiating means for differentiating priority of the predetermined transmission condition, setting means for setting a retransmission time in response to outputs of the determining means and differentiating means, the setting means setting a retransmission time in a time period excluding a transmission forbidding time period provided to be longer than a time period required for communication with the centralized control unit and provided at predetermined time intervals when the priority of the predetermined transmission condition is low, and timer means for counting the present time, and second control means for activating the communication means again when the counted present time becomes the retransmission time.

In the control apparatus configured as described above, the connection rate with the centralized control unit is enhanced since the retransmission time is set on the basis of the priority of the transmission condition.

In order to achieve the above objects, a control apparatus according to still another aspect of the present invention is a controlling apparatus collecting data related to a copying machine and communicating with the centralized control unit on the basis of the collected data, communication means for calling the centralized control unit, first control means for activating the communication means when a predetermined transmission condition is satisfied, the predetermined transmission conditions including one with high priority and one with low priority, and determining means for determining that connection with the centralized control unit can not be made in spite of activation of the communication means, differentiating means for differentiating the priority of the predetermined transmission condition, setting means for setting a retransmission time in response to outputs of the determination means and the differentiating means, the setting means setting a retransmission time under a predetermined permittable condition according to the priority of the predetermined transmission condition, and timer means for counting the present time, second control means for activating the communication means again when the predetermined time becomes the retransmission time, counting means for counting the number of times of retransmission of the communication means by the second control means, deciding means for deciding that the number of times of retransmission counted exceeds the predetermined times, and third control means for changing predetermined permittable condition in response to an output of the deciding means.

In the control apparatus configured as described above, the connecting rate with the centralized control unit is increased since the permittable condition on the basis of the priority of communication is changed according to the value of the number of times of the retransmission.

In order to achieve the above objects, a copying machine control system in accordance with yet another aspect of the present invention is a copying machine controlling system including a plurality of control terminals collecting data related to each of a plurality of copying machines and a centralized control unit collecting data from the control terminals, wherein each of the control terminals includes first timer means for counting the present time, communication means for calling the centralized control unit, control means for activating the communication means when the counted present time becomes a predetermined time specified by the centralized control unit, and wherein the centralized control unit includes second timer means for counting the present time, detecting means for detecting a control terminal which does not make communication when the counted present time becomes the specified predetermined time, and changing means for changing the set time specified for the control terminal which does not make communication even when the counted present time becomes the specified predetermined time.

In the copying machine control system configured as described above, a control terminal which does not make communication at a predetermined time is detected, and the predetermined time specified for the control terminal is changed, so that the communication connection rate from control terminals to the centralized control unit is enhanced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing contents of operation switches of the control apparatus shown in FIG. 1.

FIG. 4 is a diagram showing contents of an operation panel of the copying machine shown in FIG. 1.

FIG. 5 is a diagram showing configuration of data transmitted from the copying machine to the control apparatus of FIG. 1.

DETAILED DESCRIPTION OF THE EMBODIMENTS

Embodiments of the present invention will be described below.

[1] Configuration of System

First, a system configuration including "a copying machine, DT (a data terminal), a network (a public telephone line), a center" will be described.

Figure 1:
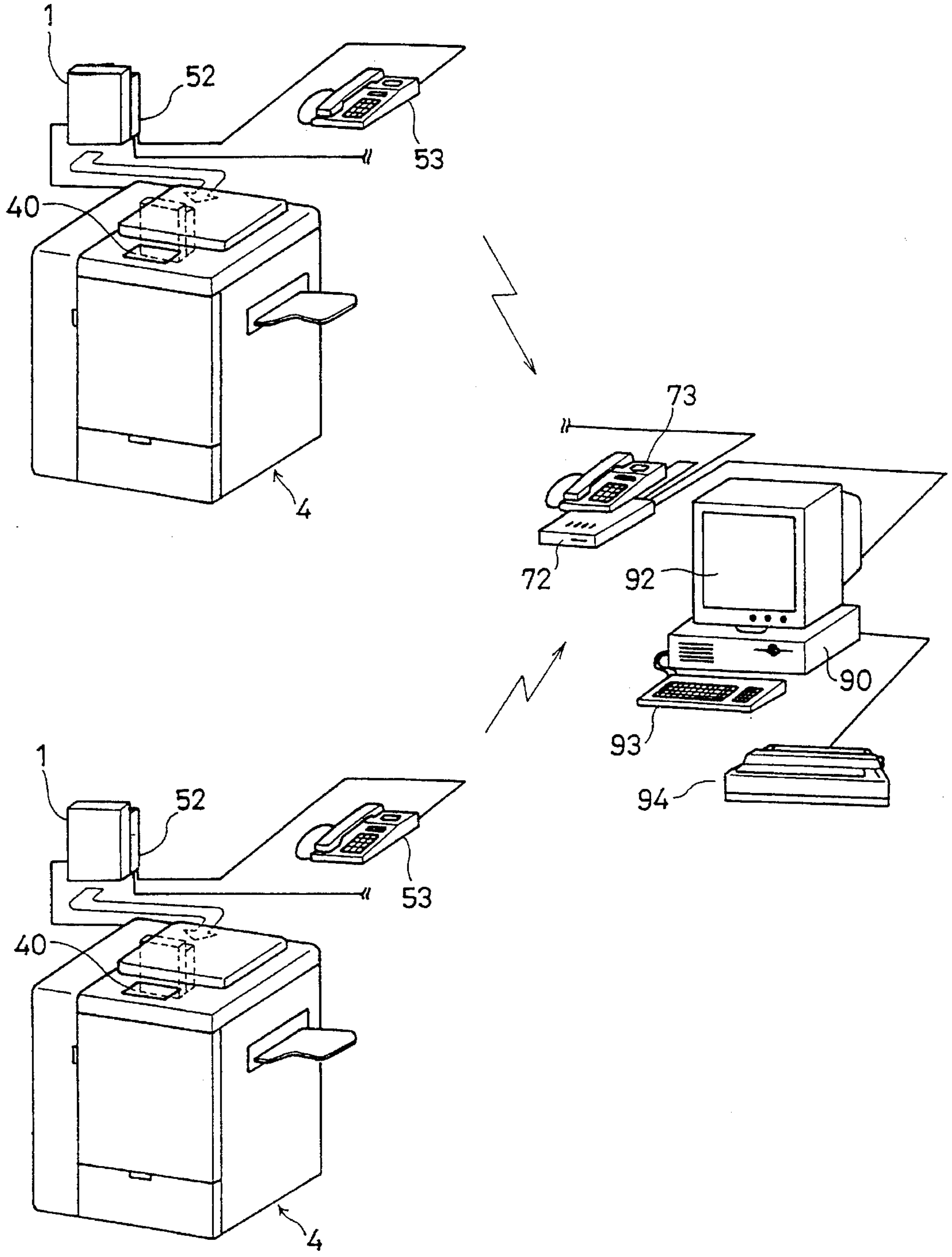
FIG. 1 is a diagram showing a system configuration of a copying machine control system in accordance with the first embodiment of the present invention.
Figure 2:
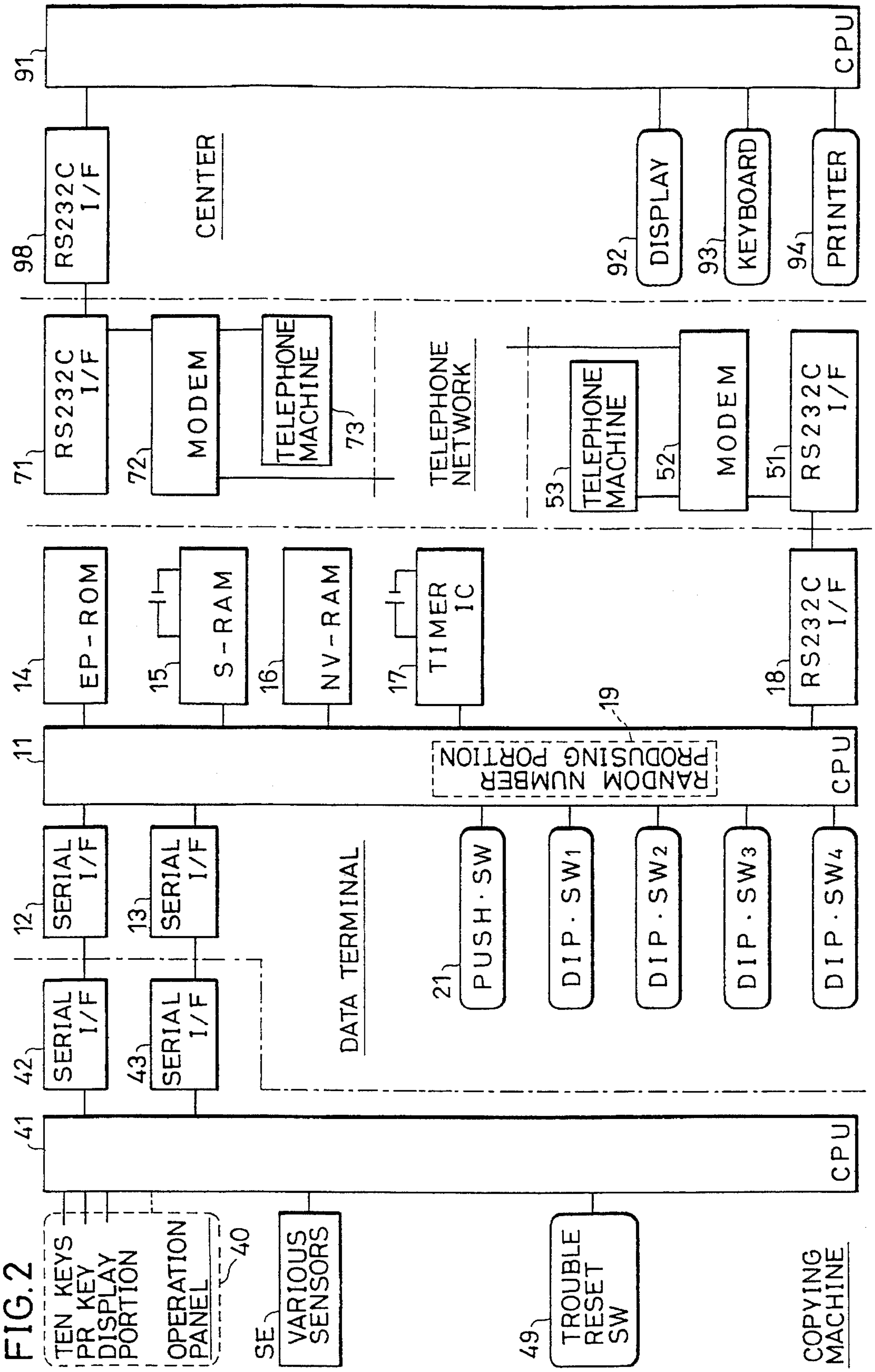
FIG. 2 is a block diagram showing a circuit configuration of the system of FIG. 1.

FIG. 1 is a schematic diagram for describing the configuration of the above system, and FIG. 2 is a block diagram of a circuit configuration of the system. In FIG. 2, the relationship between one apparatus on the user side and an apparatus on the center side is shown.

As shown in the figure, the present system includes a plurality of machines on the user side, an apparatus on the center side which is a management base, and a network connecting the above.

At each user, a copying machine 4, a DT (Data Terminal) 1, a modem 52 as a communication terminal device, and a telephone machine 53 as a common communication device are provided.

On the other hand, at the center which is a management base, a modem 72 as a communication terminal device, a telephone machine 73 as a common communication device, and a computer 90 (a main body, a display 92, a keyboard 93 and a printer 94) are provided.

Each of DTs 1 is a device for taking in various information of each of copying machines 4, applying predetermined processes to the same, and transmitting the same to computer 90 on the center.

On the other hand, on the center, data for controlling each of the copying machines is produced based on the transmitted data to carry out required processes.

Respective devices at each user and devices on the center will be described below.

Copying Machine 4

Copying machine 4 is an apparatus for forming a copied image on paper by original image scanning.

In copying machine 4, various kinds of element data having effects upon the image forming process (a time required for paper transport, a surface potential of a photoreceptor drum, a toner concentration in a developer, an amount of exposure of the photoreceptor drum, a developing bias voltage, an amount of toner sticking on photoreceptor drum, a grid voltage of a corona charger, etc.) are detected by a group of various sensors SE, which are taken in and processed in CPU 41, and then transmitted to CPU 11 of DT 1 through a serial I/F43 and a serial I/F13. The above-described various kinds of element data are expressed in an abstract manner as element data $X_i$ (i=1− the number of items of the element data) in the description of flow charts described later.

In copying machine 4, each of counted values is counted in each counter as a base of an amount of charge asked from the management side (a total counter indicating the number of times of paper discharge and a counter for each paper size indicating the number of sheets used for each paper size), counters as criteria for maintenance (a JAM counter for each portion indicating the number of jams for each portion, a trouble counter for each portion indicating the number of troubles for each portion, and a PM counter for each part indicating the number of times each part is used), and transmitted to CPU 11 of DT 1 through serial I/F42 and serial I/F12. The PM counter is a counter for counting the number of times each part is used, which is a criterion of the time for parts replacement.

Also, copying machine 4 performs predetermined operation/mode settings with signals from various kinds of key switches on the operation panel (FIG. 4) (a print (PR) key 46 for commanding start of copying operation, a group of ten keys 47 for numerical input, a clear key 48 for commanding to clear input data, etc.), various kinds of switches out of the operation panel (a trouble reset switch 49 for commanding reset of troubles, etc.), and transmits a corresponding signal as needed to CPU 11 of DT 1 through serial I/F 42 and serial I/F12. Numerical data displayed in display portion 45 is also included in the transmitted data.

DT 1

DT 1 is a device for taking in data of copying machine 4 and activating modem 52 under a predetermined condition (a condition in which a transmission flag is set to "1") to connect a line to the center side for transmitting data for controlling the copying machine (the above element data, the count data, etc.) to CPU 91 on the center.

A ROM 14 in which a control program is stored, a nonvolatile memory 16 for storing number data (described later) and so forth, a system RAM 15 for works backed up by a battery, and a timer IC 17 similarly backed up by a battery are connected to controlling CPU 11 of DT 1.

As described above, CPU 11 takes in the data from copying machine 4 from serial I/F12 or serial I/F13 and performs predetermined processes. CPU 11 also performs predetermined operations and mode setting and the like corresponding to input of operation switches. Such processes will be described with respect to the description of flow charts. FIG. 5 is a diagram showing the data configuration of a paper discharge code, a JAM code and a trouble code which are data inputted through serial I/F12. The paper discharge code is expressed by a trailing edge (a change of the bit data from "1" to "0") of a bit b0, and the JAM code is expressed as bit $b_7=1$, $b_6=0$. The trouble code is expressed as bit $b_7=1$, $b_6=1$.

As above-mentioned operation switches, as shown in FIG. 3, four dip switches DIP.SW1–DIP.SW4 and a push switch 21 are provided.

DIP.SW4 is a switch for setting an initialization mode. DIP.SW1 is a switch for setting a center selection number (telephone number) input mode, DIP.SW2 for an ID number (DTID) input mode for distinguishing DTs 1, and DIP.SW3 for an ID number (center ID) input mode for distinguishing a center, respectively. Push switch 21 is a switch for commanding initialization transmission (refer to S145 in FIG. 8), etc.

The CPU 11 is connected to communication I/F (RS232CI/F) 51 of modem 52 through communication I/F (RS232CI/F) 18.

That is, it is configured to be able to communicate with computer 90 at the center by connecting a line with modem 72 on the center side by commanding transmission of an off-hook signal and a center selection signal to modem 52 through these equipments.

The contents of data transmitted from DT 1 to the center side (the data for controlling copying machine 4) are determined according to a type of a transmission flag set to "1" as will be described later.

Center

The center is a computer equipment configured so that it can be connected to a large number of DTs through a communication network, which is an apparatus for controlling copying machines corresponding to above-mentioned a number of DTs in a centralized manner.

That is, controlling data indicating conditions of a copying machine to which a DT is connected is produced based on data inputted in CPU 91 (the above-mentioned element data, count data, etc.) through the communication network, modem 72, a modem side communication I/F (RS232CI/F) 71 and a computer side communication I/F (RS232CI/F) 98 from each DT side.

A bill is printed out on the basis of the controlling data, and determinations as to whether a serviceman should be dispatched or not, as to which parts are to be prepared in the dispatch and the like are made.

After completion of receipt of data from each DT side, data are transmitted from CPU 91 to each of the DT sides. The details thereof will be described in the description about flow charts.

[2] System Control

Next, control of a system including "copying machines, a DT, (a communication network) and a center" will be described.

Before describing flow charts, the terms "on edge" and "off edge" are defined.

The "on edge" is defined to mean a condition change in which conditions of a switch, a sensor, a signal or the like changes from an off state to an on state.

The "off edge" is defined to mean a condition change in which a state of a switch, a sensor, a signal or the like changes from an on state to an off state.

Processes in Copying Machine

Figure 6:
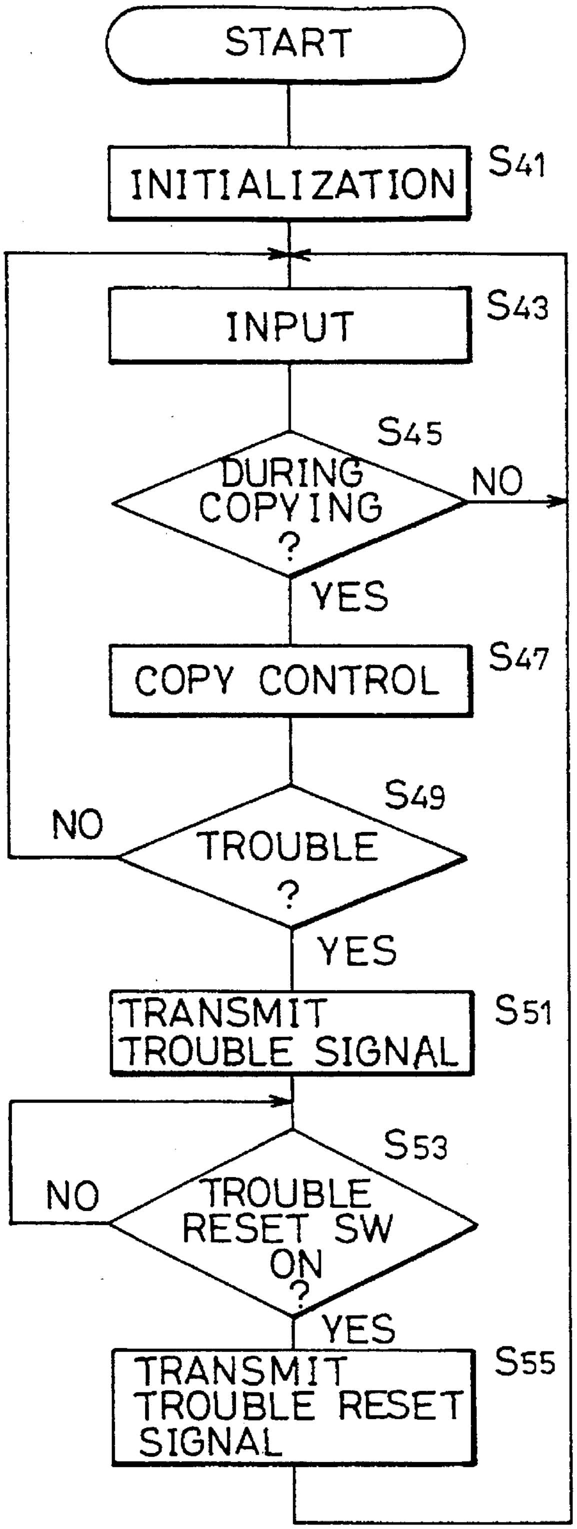
FIG. 6 is a flow chart showing processes performed by a control CPU of the copying machine of FIG. 1.

First, the processes in control CPU 41 of a copying machine will be described referring to the flow chart of FIG. 6.

CPU 41, for example, starts processing upon turn-on of a power source, makes initialization such as memory clear, standard mode setting or the like (S41), and subsequently, carries out the processes in steps S43–S49.

Step 43 is an accepting process for input signals from a group of key switches on operation panel 40 (a group of ten keys 47 for numerical input, a print (PR) key 46 for copy start command, a clear key 48 for set number clear command, etc.), a group of switches such as a trouble reset switch 49, and a group of sensors (not shown) provided in a copying machine. Step S47 is a step collectively indicating processes necessary for copying operation and so forth, which are paper feed control, scanning control, photoreceptor drum control, and developing device control, for example.

When a trouble such as JAM occurs (YES in S49), a signal corresponding to that trouble is transmitted to controlling CPU 11 of the DT (S51). Furthermore, when trouble reset switch 49 is operated by an operator or the like (YES in S53), similarly to the above description, a trouble reset signal is transmitted to controlling CPU 11 of the DT (S55).

Processing in Data Terminal

Processes in controlling CPU 11 of a DT will be described referring to the flow charts shown in FIGS. 7–16.

(a) Main Routine

First, the outline of the processes will be described on the basis of the main routine of FIG. 7.

The controlling CPU 11 starts processing upon turn-on of a power source, carries out an initialization process as required (S13), and then transmits a copy permitting signal to controlling CPU 41 of a copying machine (S15). Subsequently, it proceeds to the repeated loop process of steps S17–S33.

Generally, the following processes are carried out in respective sub routine steps.

* Initialization: S13

Upon turn-on of the power source, when dip switch DIP.SW4 is ON, that is, when it is an initialization mode (YES in S11), this routine is executed. Specifically, as will be described in FIGS. 8A and 8B, a selection number (telephone number) of a center, an ID number of DT (DTID), an ID number of the center (center ID) are set and initialization transmission is performed.

* Count Data receipt: S17

A receiving process of various kinds of count data transmitted from controlling CPU 41 of a copying machine is carried out.

The data contents include a discharge code, JAM and trouble codes, data of JAM and trouble counters, a counter for each paper size and a PM counter.

The controlling CPU 11 of a DT updates such data to the newest values and holds the same.

* Element Data Receipt and Data Process: S19

Figure 9A:
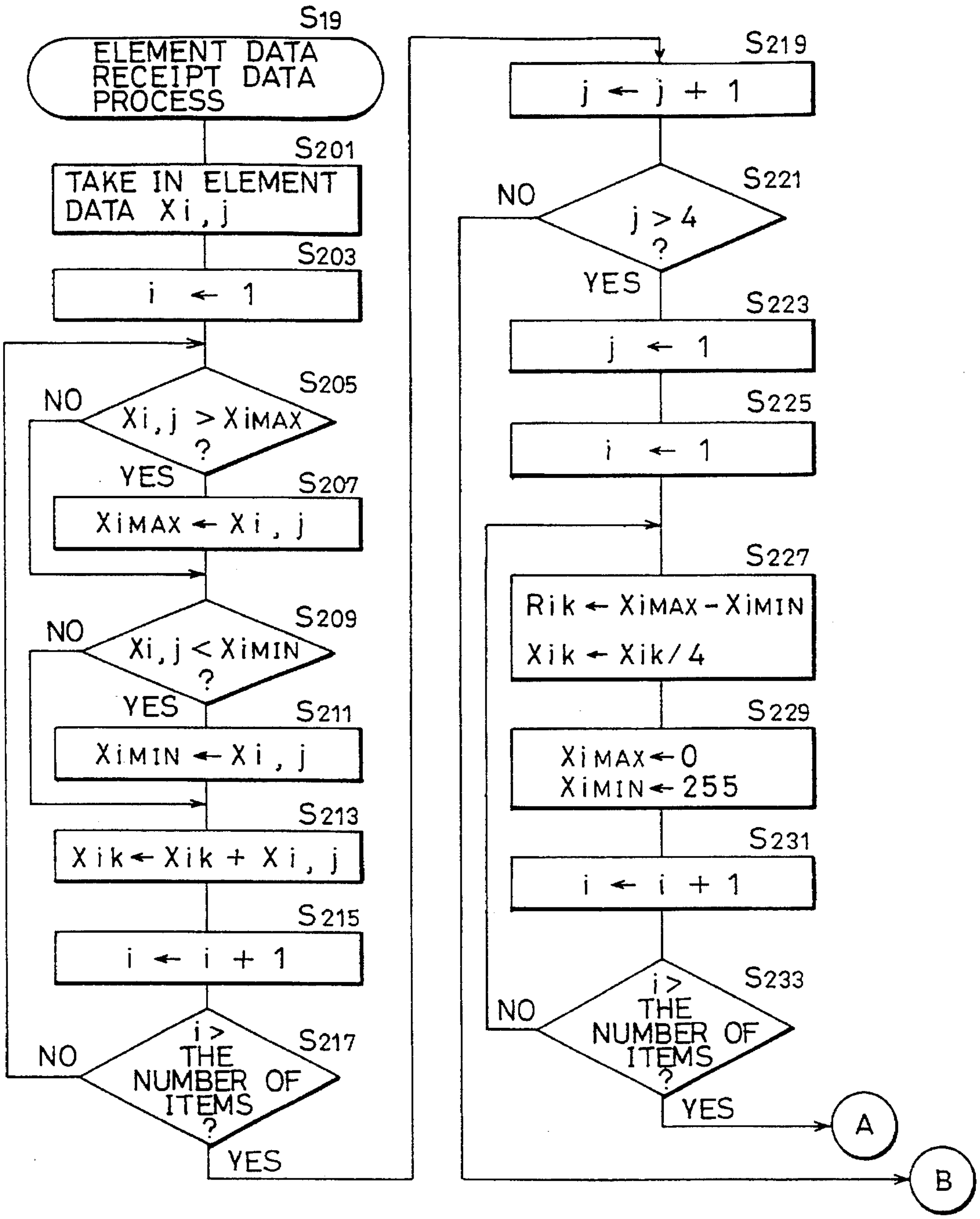
FIGS. 9A and 9B are flow charts showing specific contents of the element data receipt and the data process routines of FIG. 7.
Figure 9B:
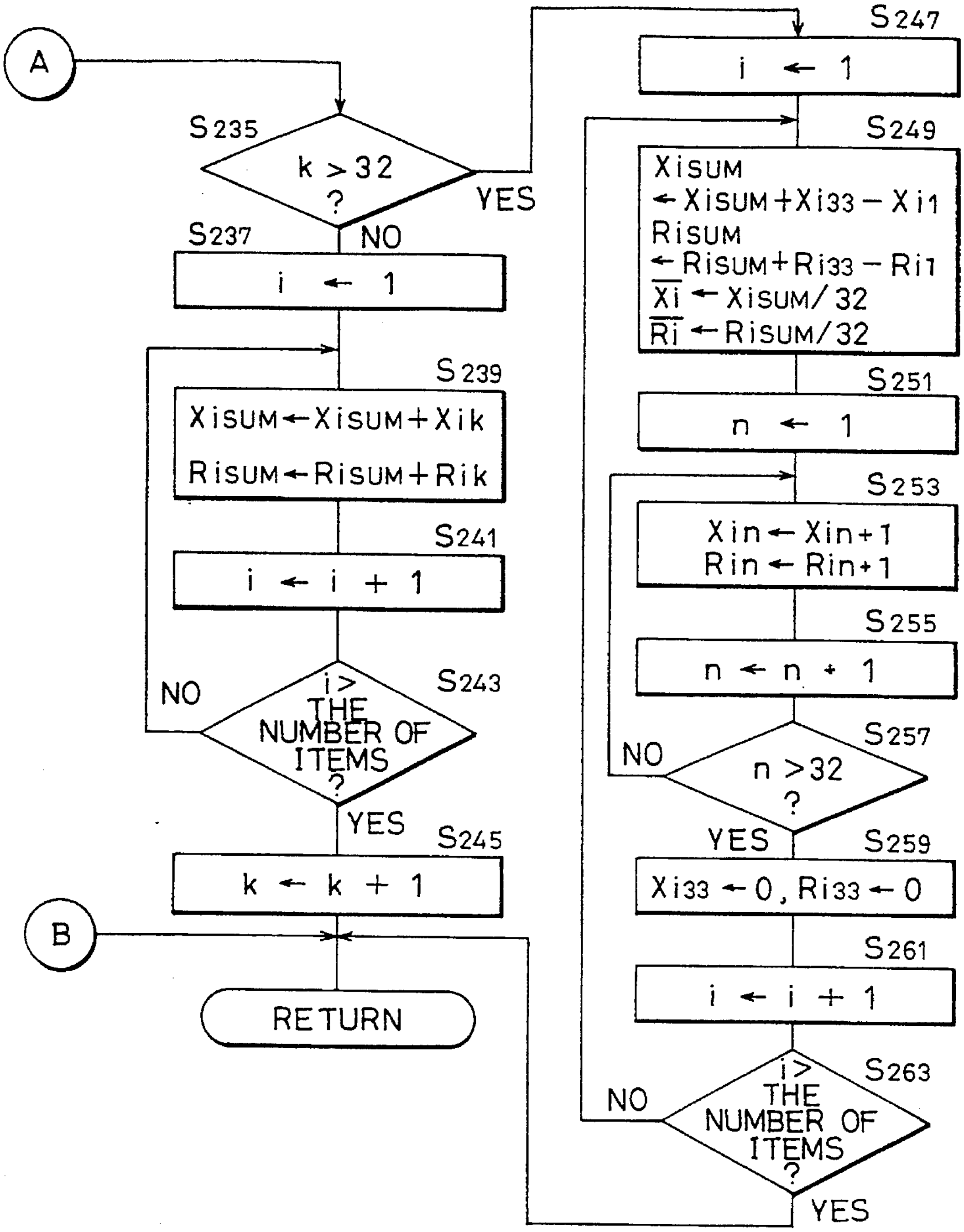

As will be described in FIGS. 9A and 9B, CPU 11 sequentially calculates data corresponding to an average value of each element data and a standard deviation to update them to the newest values.

Trouble Transmission Determination: S21

As will be described in FIG. 10, a determination is made as to, for example, whether or not the trouble data and trouble recovery data should be transmitted to the center.

* Fixed Time Transmission Determination: S23

As will be described in FIG. 11, a fixed time transmission flag is set to 1 at a predetermined fixed time transmission time and various kinds of count data and various kinds of element data are transmitted to the center.

After completion of transmission by the fixed time transmission, fixed time transmission time data for the next time, current time data and data of the closing date of a bill are transmitted in turn from the center side.

* Warning Transmission Determination: S25

As will be described later in FIGS. 12A and 12B, element data, a counted value of a JAM counter, and a counted value of a PM counter are compared with predetermined threshold values, respectively.

On the basis of the results thereof, a determination is made as to whether or not warning data, warning recovery data should be transmitted to the center.

* Manual Transmission Determination: S27

When it is not in the initialization mode, when push switch 21 is turned on, a manual transmission flag is set to 1.

By this, various count data, various element data are transmitted to the center.

* PM Transmission Determination: S29

As will be described in FIG. 13, a count value before clearing the PM counter in which a count value is cleared to "0" by parts replacement is transmitted to the center.

* Line Communication Process: S31

As will be described in FIGS. 14A and 14B, when any of the transmission flags is set, line connection with the center is commanded, and after connection, the data communication is implemented.

* Present Time Setting Process: S32

Figure 16:
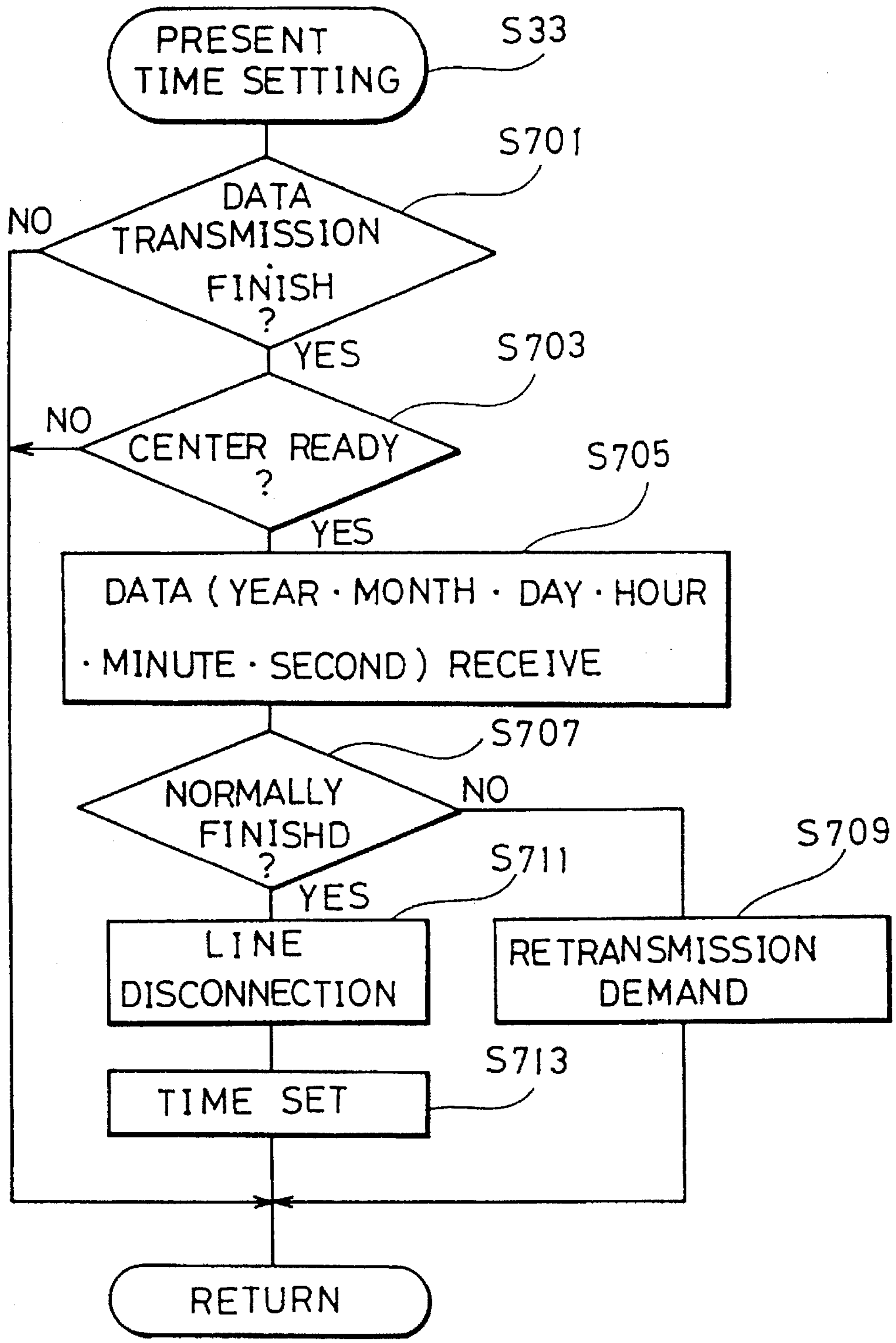
FIG. 16 is a flow chart showing specific contents of the present time setting routine of FIG. 7.

As will be described in FIG. 16, present time data transmitted from the center is received and the timer IC 17 is corrected on the basis of the received data.

* Counter CT: S35

Figure 15A:
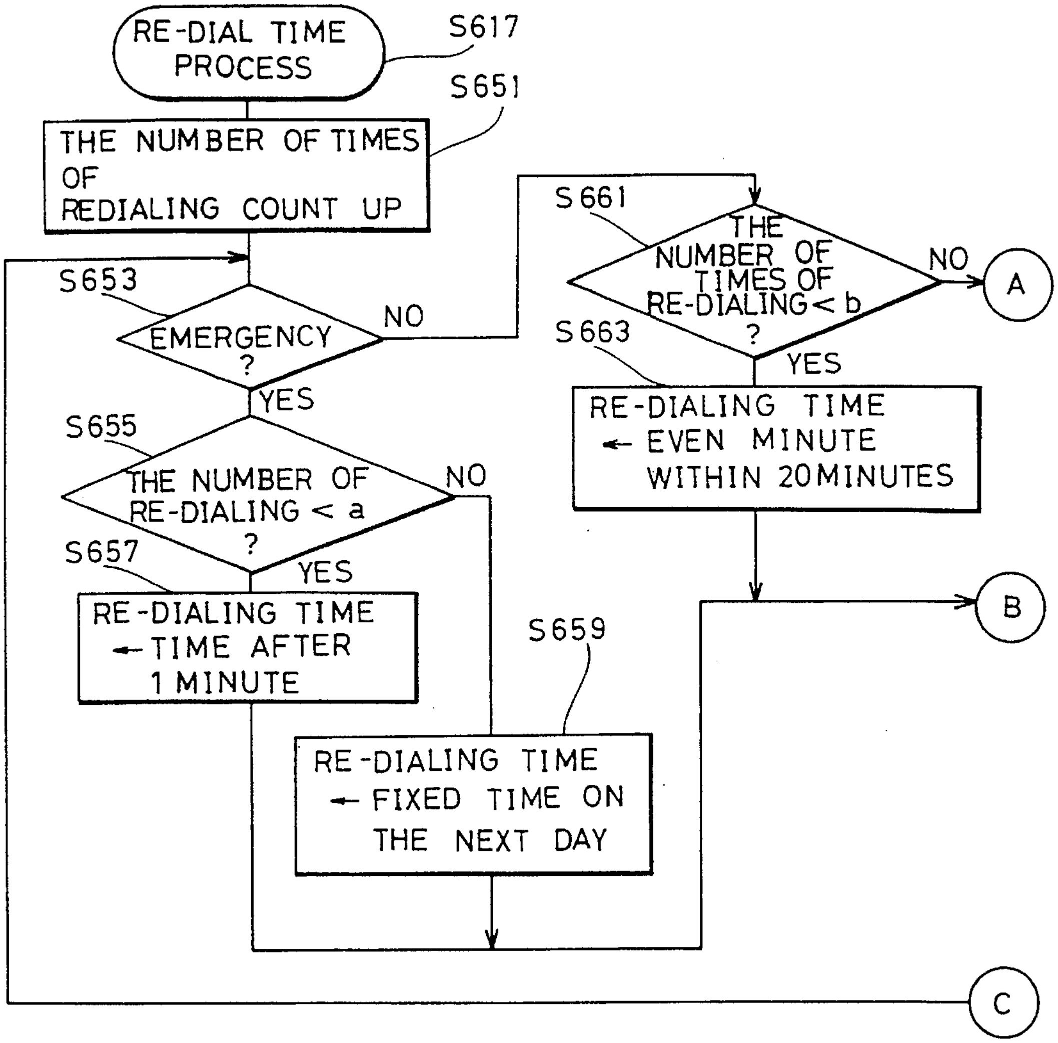
FIGS. 15A and 15B are flow charts showing specific contents of the redialing time process routine of FIG. 14B.
Figure 15B:
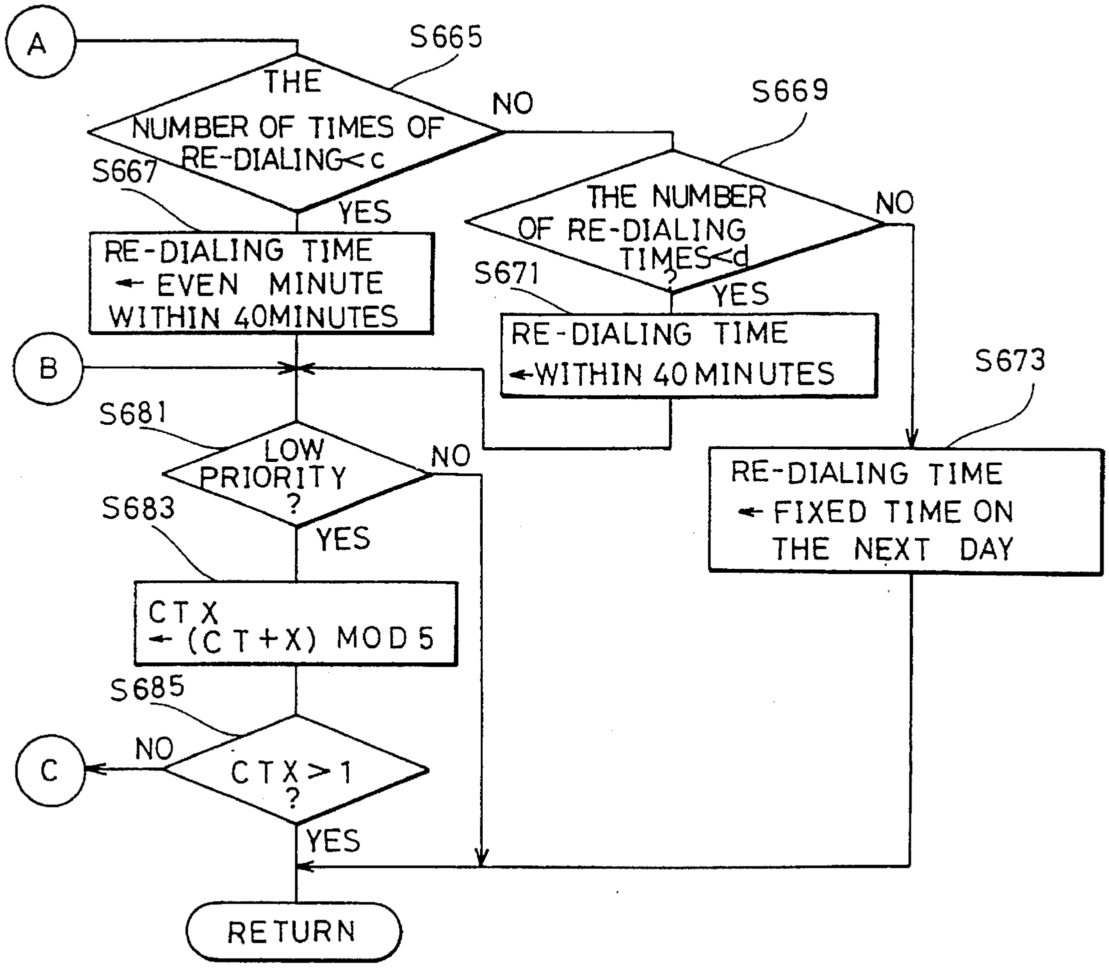

Every time one minute passes (YES in S33), the counter CT is subjected to addition by "1" and a remainder obtained by dividing the value after the addition by "5" is substituted into the counter CT (S35). The counter CT will be described in the description of the re-dialing time process (FIGS. 15A and 15B).

(b) Sub Routine

Next, details of sub routine steps will be described referring to FIGS. 8A and 8B to 16.

Figure 8A:
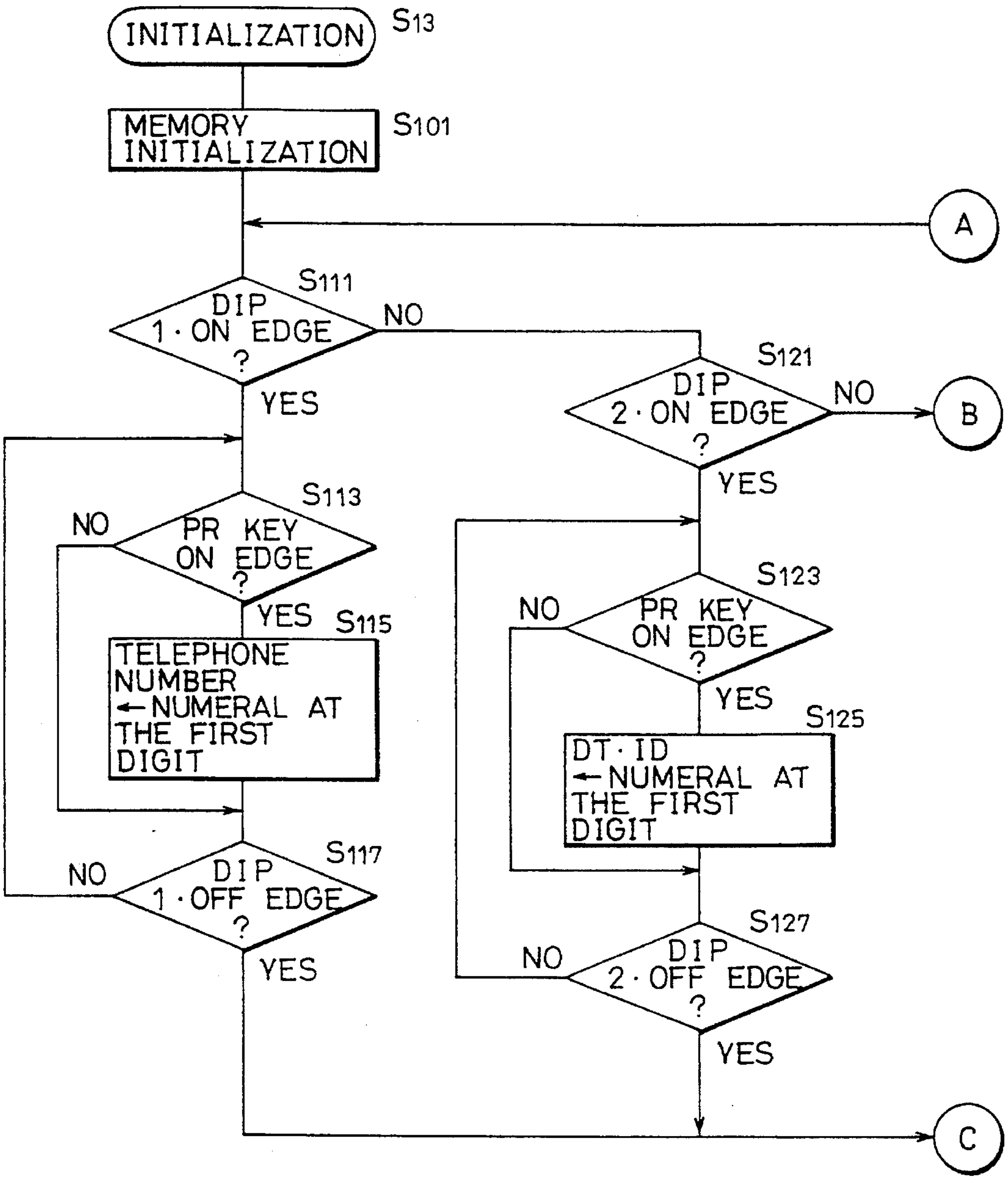
FIGS. 8A and 8B are flow charts showing specific contents of the initialization routine of FIG. 7.
Figure 8B:
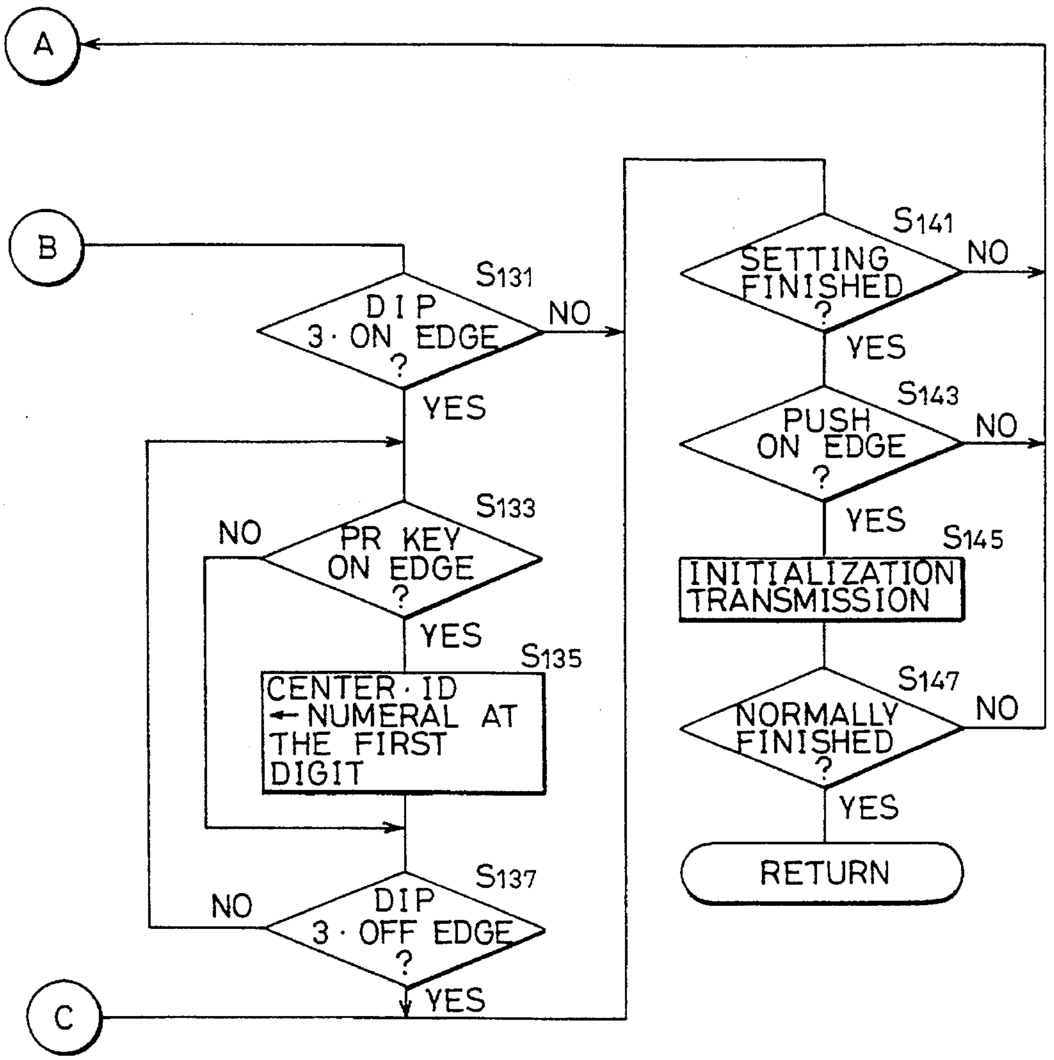

* initialization Process (FIGS. 8A and 8B)

This process is a process carried out when dip switch DIP.SW4 is on in turn-on of the power source (YES in S11), wherein initialization of a selection number of the center, an ID number of a data terminal (DTID) and an ID number of the center (center ID) are accepted, and then initialization transmission is carried out.

First, memory 15 is initialized (S101), and ON of dip switches DIP.SW1–DIP.SW3 are stood by.

when DIP.SW1 is turned on (YES in S111), an input mode of the selection number (telephone number) is implemented. That is, a figure inputted with ten key 47 of the copying machine and displayed at the first digit of display portion 45 is stored in a nonvolatile memory 16 as selection number data of the center in response to input of print key 46 (YES in S113). The selection number input mode is released with OFF of DIP.SW1 (S117).

Similarly, in response to ON of DIP.SW2 (YES in S121), an input mode of DTID is set, and a figure displayed at the first digit of display portion 45 is stored in nonvolatile memory 16 (S125) as DTID data in response to input of print key 46 (YES in S123). The DTID input mode is released with OFF of DIP.SW2 (S127).

Similarly, in response to ON of DIP.SW3 (YES in S131), an input mode of the center ID is set and a figure displayed at the first digit of display portion 45 is stored in nonvolatile memory 16 as the center ID data (S135) for every input of print key 46 (YES in S133). The center ID input mode is released with OFF of DIP.SW3

In this way, when three kinds of data setting have been finished all (YES in S141), push switch 21 is made valid, and upon ON of the push switch 21 (YES in S143), initialization transmission is made to the center (S145).

That is, CPU 11 calls the center through the telephone network to transmit the above two kinds of ID data to CPU 91 of the center. When the transmission is finished, CPU 11 receives the data transmitted from CPU 91 of the center (the closing date of the count data, the next fixed time transmission time, the current time, and a threshold value of a warning determination).

When the above transmission and receipt are finished, a determination is made as to whether the communication has been normally made or not (S147).

As a result, when the communication has not been normally performed (NO in S147), it returns to step S111 and another ON of DIP.SW1 is stood by.

On the other hand, when the communication has been made normally (YES in S147), it returns to the main routine and the processes after step S15 are carried out.

* Element Data Receipt, etc. (FIGS. 9A and 9B)

In this sub routine process, data for comparison with a threshold value (refer to the warning transmission determination routine of FIG. 12) is calculated on the basis of the element data transmitted from a copying machine.

First, a group of element data $X_{i,\ j}$ transmitted from a copying machine for every discharge of copy paper are taken in from serial I/F13 (S201). Here, the subscript i expresses an item number of the element data and the subscript j expresses the order in each item.

Next, after substituting an initial value 1 for the item number i (S203), CPU 11 sequentially updates the maximum value $X_{iMAX}$, the minimum value $X_{iMIN}$ and a sum $X_{ik}$ for each item (S205–S217).

Subsequently, the subscript j is incremented (S219), and when j is less than 4, the flow returns to the main routine.

In this way, when the processes of steps S201–S217 are carried out four times for each item (S221; YES), the subscript j is reset to 1 (S223), an initial value 1 is substituted into the item number i (S225), and the difference $R_{ik}$ between the maximum value and the minimum value and an average value $X_{ik}$ of four pieces of data are respectively calculated for each item (S227–S233). In step S229, initial values of the maximum value $X_{iMAX}$ and the minimum value $X_{iMIN}$ are given for preparation of processes in the next steps S205–S211.

After the processes of the above S227–S233, the processes of steps S237–S245, or of steps S247–S263 are carried out.

Steps S237–S245 are processes for a case in which the total of the processes of above S227–S233 does not reach thirty three times, wherein a sum $R_{iSUM}$ of the difference $R_{ik}$ between the above-mentioned maximum value and the minimum value and a sum $X_{iSUM}$ of the average value $X_{ik}$ of the above-mentioned four pieces of data are calculated for the data for thirty two times for each item.

Steps S247–S263 are processes for the case in which the total of processes in the above S227–S233 is thirty three times or more, wherein a sum $R_{iSUM}$ of the above difference $R_{ik}$ and a sum $X_{iSUM}$ of the above average value $X_{ik}$ are calculated for the newest data for thirty two times for each item, and also calculating average values $\overline{X_i}$ and $\overline{R_i}$, respectively.

As described above, an average value $\overline{X_i}$ of the newest 128 (=4×32) pieces of data and an average value of deviations (a value corresponding to the standard deviation) $\overline{R_i}$ are obtained for each item of the element data.

Figure 10:
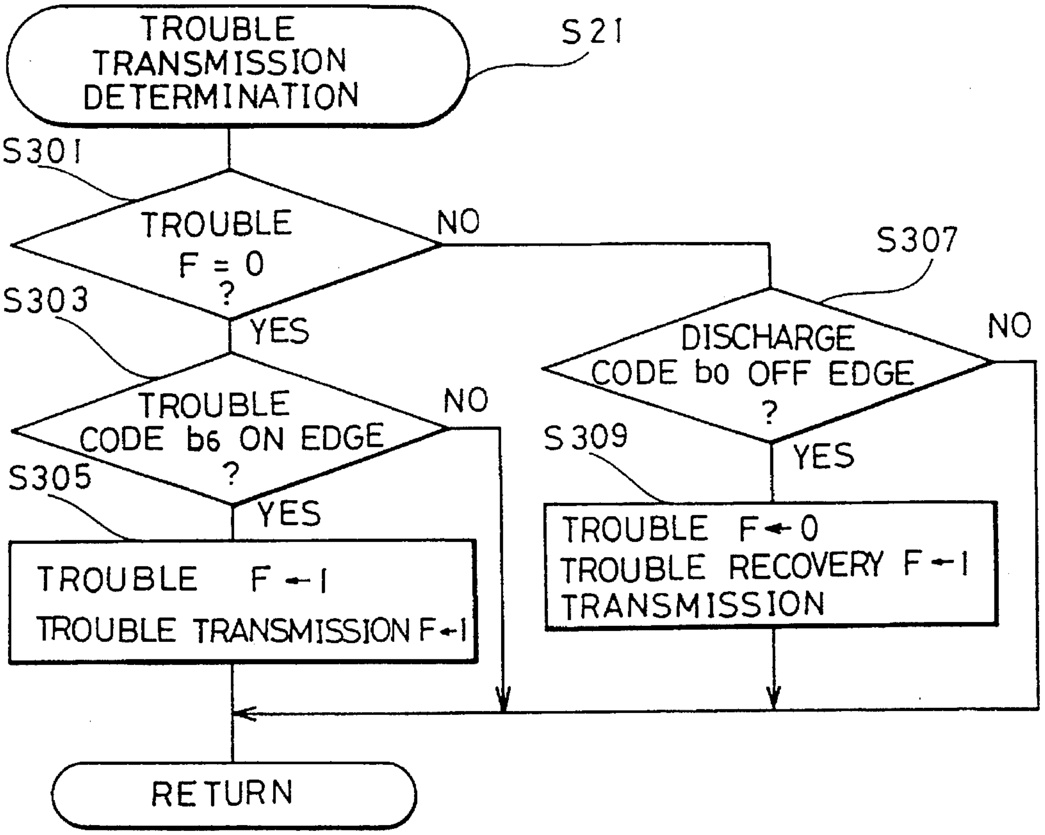
FIG. 10 is a flow chart showing specific contents of the trouble transmission determination routine of FIG. 7.

* Trouble Transmission Determination (FIG. 10)

The process is a sub routine for controlling trouble transmission and trouble recovery transmission.

That is, when "trouble flag=0" (YES in S301), if a trouble code is detected from a copying machine (YES in S303), the trouble flag and a trouble transmission flag are set to "1", respectively (S305).

Under the condition of "trouble flag=1" (NO in S301), when a paper discharge code from a copying machine is detected (YES in S307), the trouble flag is reset to "0", and the trouble recovery transmission flag is set to "1" (S309). This is because paper discharge in a copying machine is an operation to be performed after the trouble recovery.

Upon setting of the trouble transmission flag and the trouble recovery transmission flag, a line communication process (FIGS. 14A and 14B) is carried out and trouble data and trouble recovery data are transmitted to the center, respectively.

Figure 11:
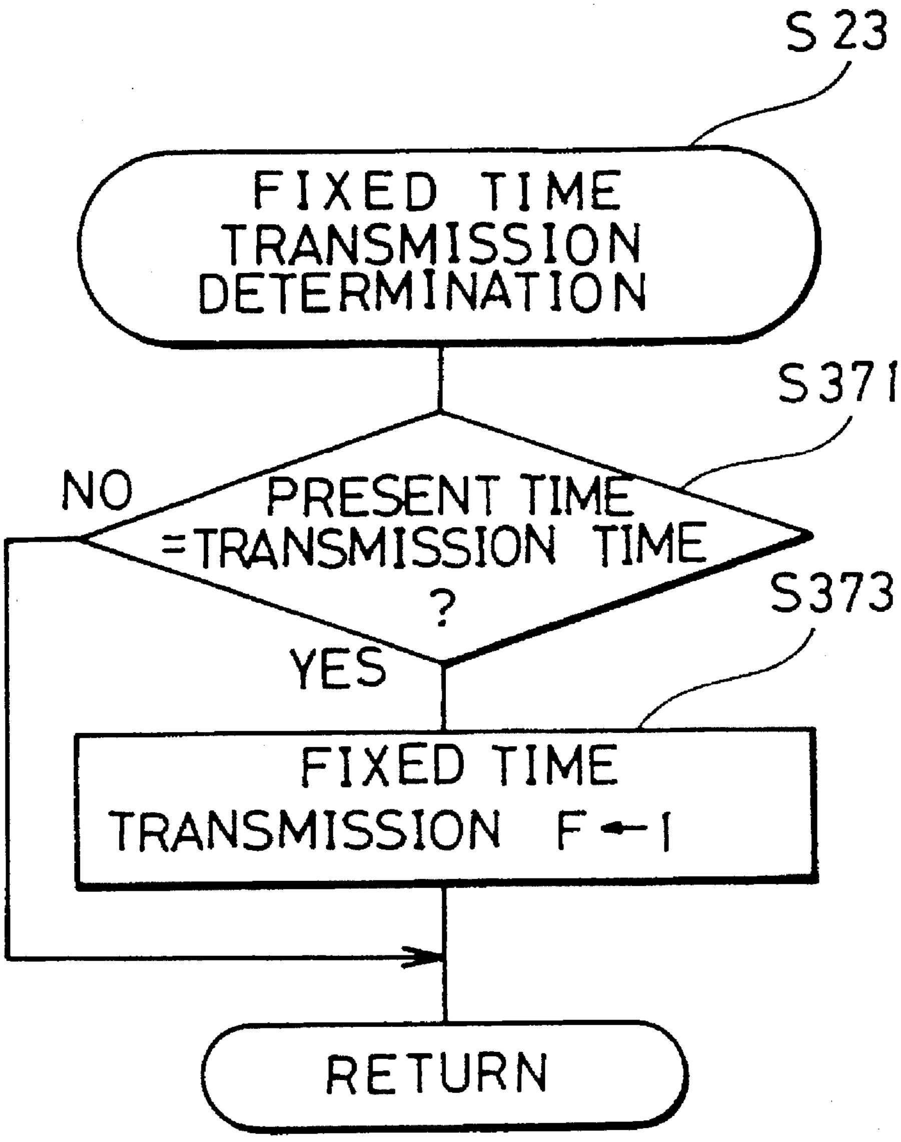
FIG. 11 is a flow chart showing specific contents of the fixed time transmission determination routine of FIG. 7.

* Fixed Time Transmission Determination (FIG. 11)

In this routine, the fixed time transmission is controlled.

That is, when the current time read from timer IC 17 coincides with the fixed time transmission time data transmitted from the center in the communication by the previous fixed time transmission (or in the communication by the initializing transmission of FIGS. 8A and 8B) (YES in S371), the fixed time transmission flag is set to "1" (S373).

Upon setting of the fixed time transmission flag, the line communication process (FIGS. 14A and 14B) is carried out, and the count values of the above-mentioned various counters, and various element data are transmitted to the center. CPU 11 receives from-the center the next fixed time transmission time, a closing date, the current time, and a warning determining threshold value (FIGS. 12A and 12B).

Figure 12A:
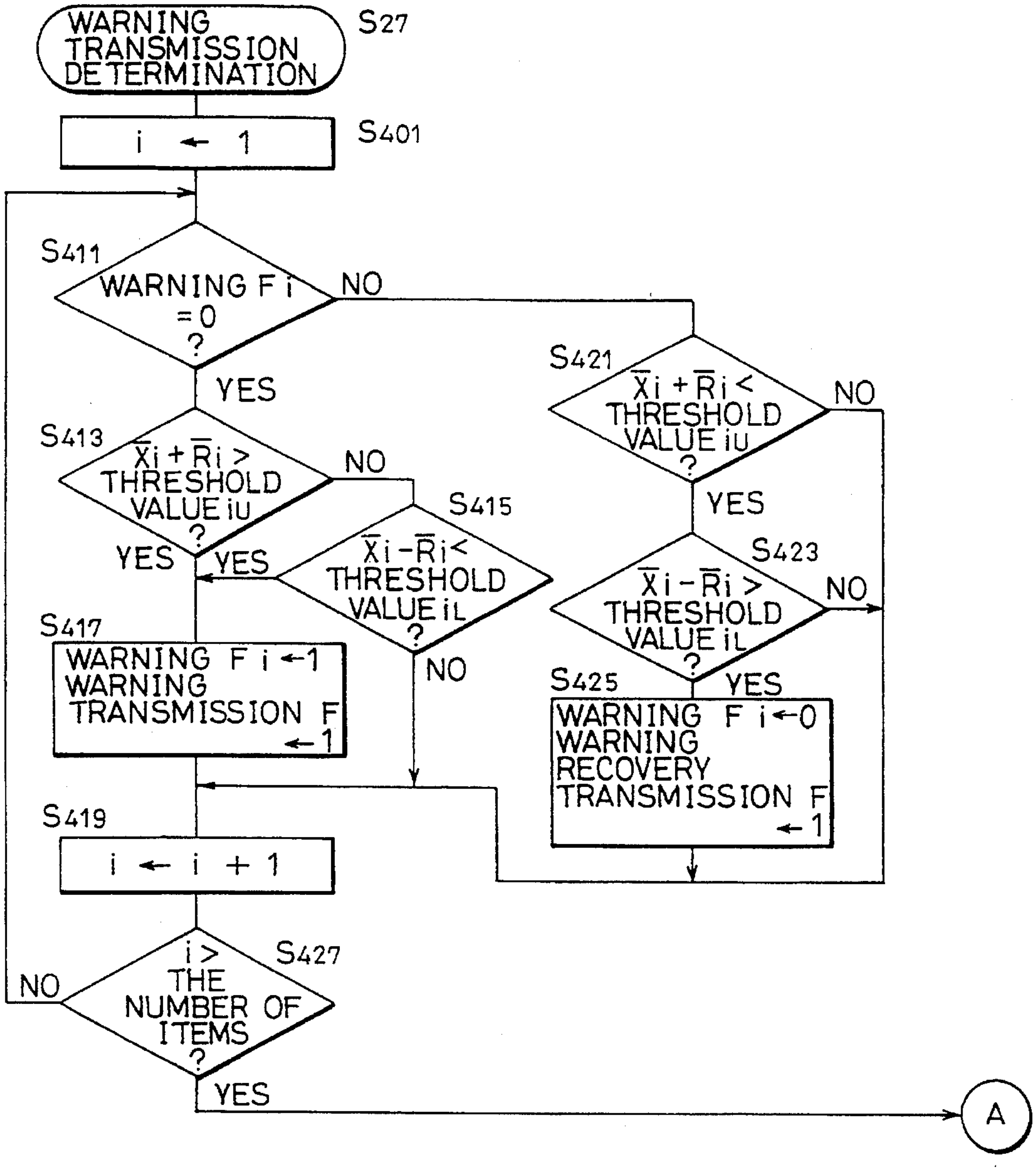
FIGS. 12A and 12B are flow charts showing specific contents of the warning transmission determination routine of FIG. 7.
Figure 12B:
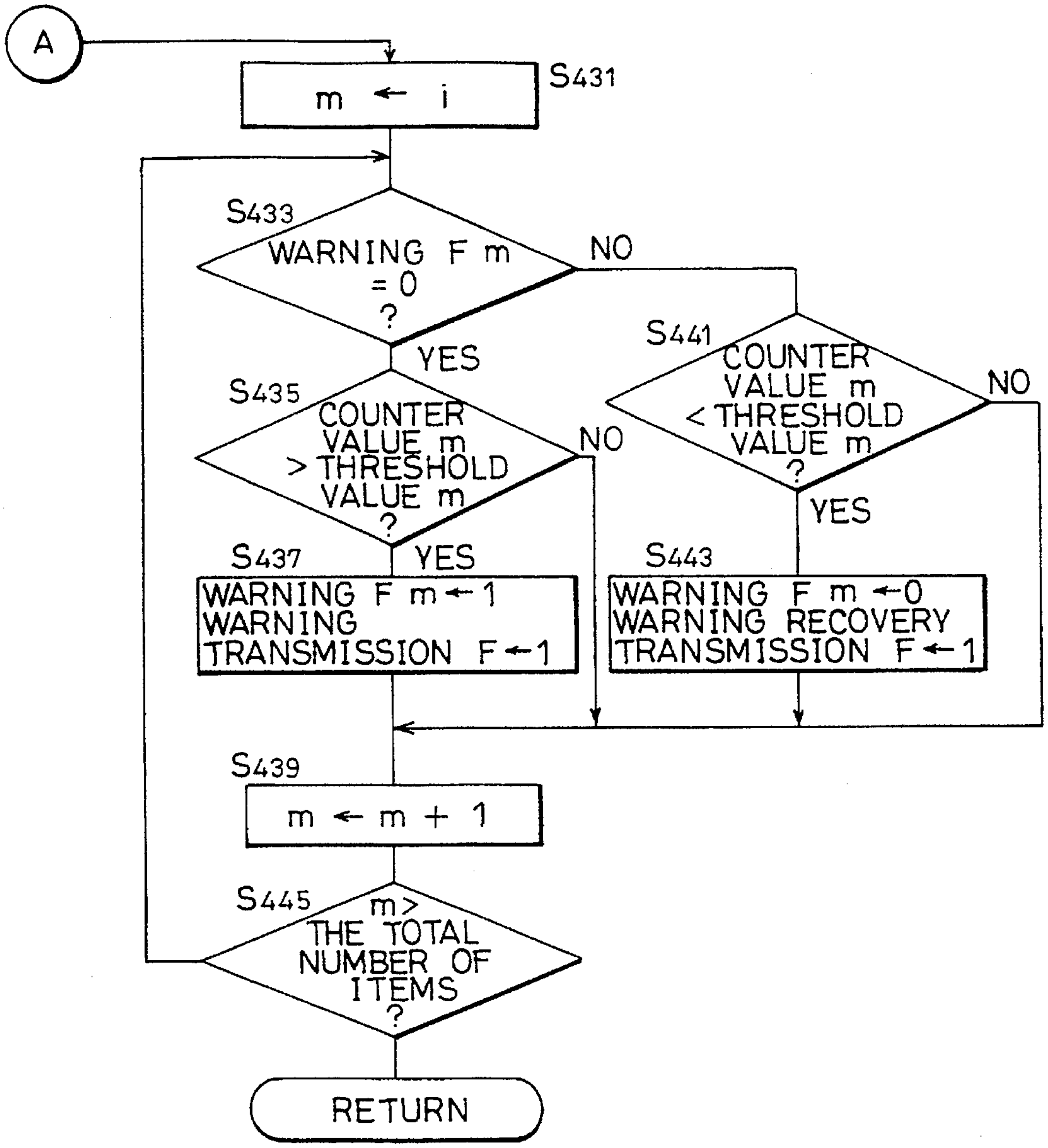

* Warning Transmission Determination (FIGS. 12A and 12B)

In this routine, the warning transmission and so forth are controlled.

Steps S401 through 8427 are processes for making warning transmission when a value of element data gets out of a peculiar permittable range, and warning recovery transmission when it recovers into the permittable range, respectively.

First, an initial value "1" is set in the item number i indicating a type of the element data (S401).

Next, in step S411, a warning flag about objective element data (in the first time, the first element data) is examined.

As the result, when the warning flag about the particular element data is "0" (YES in S411), a determination is made as to whether or not the element data value is in the permittable range peculiar to the element data, in other words, whether or not it is in the range not more than an upper limit threshold value $_{iU}$ and not less than a lower limit threshold value $_{iL}$. When it is out of the permittable range (YES in S413 or YES in S415), a warning flag $F_i$ about the particular element data and a warning transmission flag are set to "1", respectively (S417). By this, the line communication process (FIGS. 14A and 14B) is carried out and warning data is transmitted to the center.

On the other hand, when a warning flag of the objective element data is "1" (NO in S411), a determination is made as to whether the value of the element data has recovered into the above-mentioned permittable range or not. If it has recovered (YES in S421 and YES in S423), a warning flag $F_i$ about the particular element data is reset to "0", and the warning recovery transmission flag is set to "1". By this, the line communication process (FIGS. 14A and 14B) is carried out, and warning recovery data is transmitted to the center.

After performing such processes until i attains the number of items of the element data, in other words, after performing processes with respect to all the element data, the flow proceeds to the processes after step S431.

Steps S431–S445 are processes for making warning transmission when count values (frequency) of the JAM counter and the PM counter exceed peculiar threshold values, and warning recovery transmission when they recover below the threshold values, respectively.

First, an initial value "i (the last number of the element data+1)" is set in the item number m indicating types of a JAM counter and a PM counter (S431).

Next, in step S433, a warning flag about the objective JAM counter or PM counter is examined.

As a result, when the warning flag about the particular JAM counter or PM counter is "0" (YES in S433), a determination is made as to whether or not the value of the counter is in a permittable range peculiar to the counter, or whether it exceeds the threshold value m or not. When it exceeds the same (YES in S435), the warning flag $F_m$ and the warning transmission flag about the particular counter are set to "1", respectively (S437). By this, the line communication process (FIGS. 14A and 14B) is carried out and warning data is transmitted to the center.

On the other hand, when a warning flag about the objective JAM counter or PM counter is "1" in the above-mentioned S433 (NO in S433), a determination is made as to whether the value of the particular counter has been recovered below the above threshold value or not. In the case of recovery (YES in S441), the warning flag $F_m$ about the particular counter is reset to "0", and the warning recovery transmission flag is set to "1". By this, the line communication process (FIGS. 14A and 14B) is carried out and the warning recovery data are transmitted to the center.

CPU 11 performs such processes until m attains the total number of items of element data and counters, in other words, after performing with respect to all the counters, it returns to the main routine.

As described above, the warning transmission and the warning recovery transmission are controlled.

Figure 13:
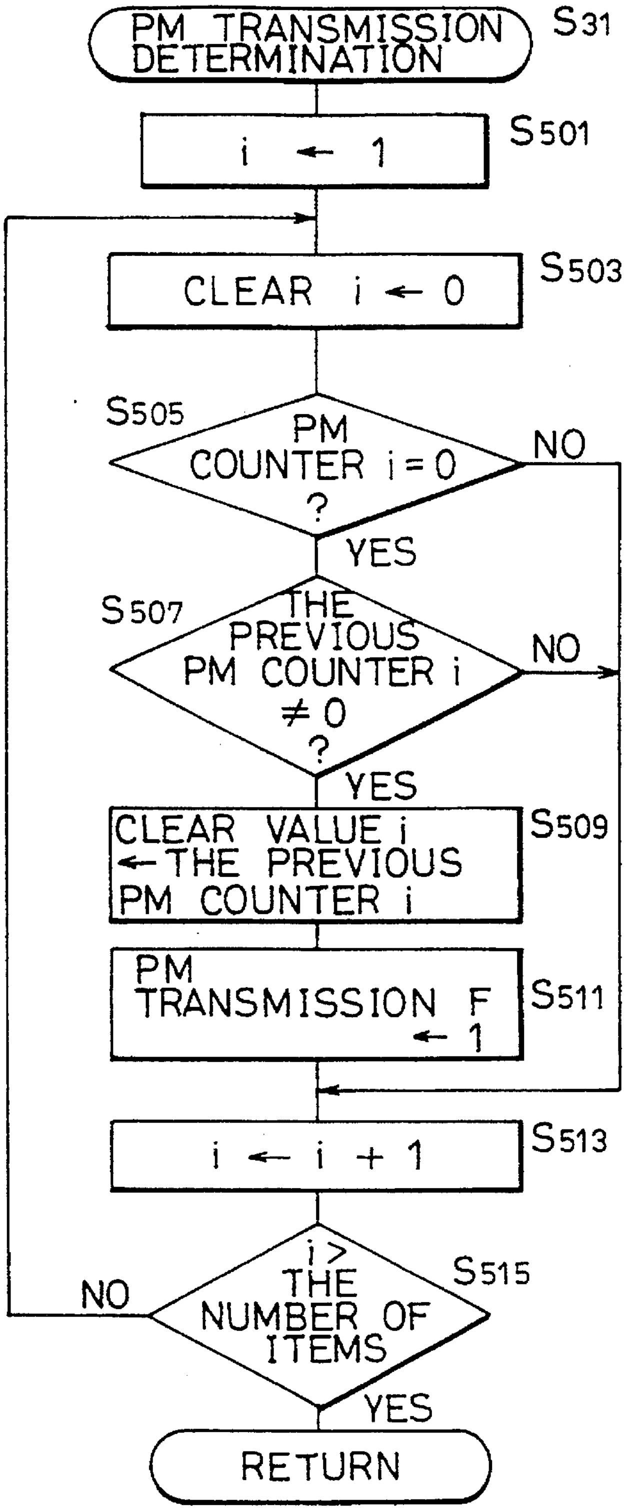
FIG. 13 is a flow chart showing specific contents of a PM transmission determination routine.

* PM Transmission Determination (FIG. 13)

In this routine, the PM transmission is controlled.

First, an item number i indicating a type of a PM counter is set to an initial value "1" (S501), and after the processes in steps S503–S511 are carried out, the value of i is incremented, that is, changing a type of PM counter, the above processes are repeated.

Here, the processes in the above S503–S511 are processes for retaining a count value immediately before clearing the PM counter (S509) and setting the PM transmission flag to "1" (S511) when the PM counter is cleared (YES in S505 and YES in S507). A PM counter is cleared by a serviceman when replacing parts corresponding to the PM counter.

When "PM transmission flag=1", the line communication process (FIGS. 14A and 14B) is carried out, and the PM data (types of replaced parts, a count value immediately before the replacement) are transmitted to the center.

Figure 14A:
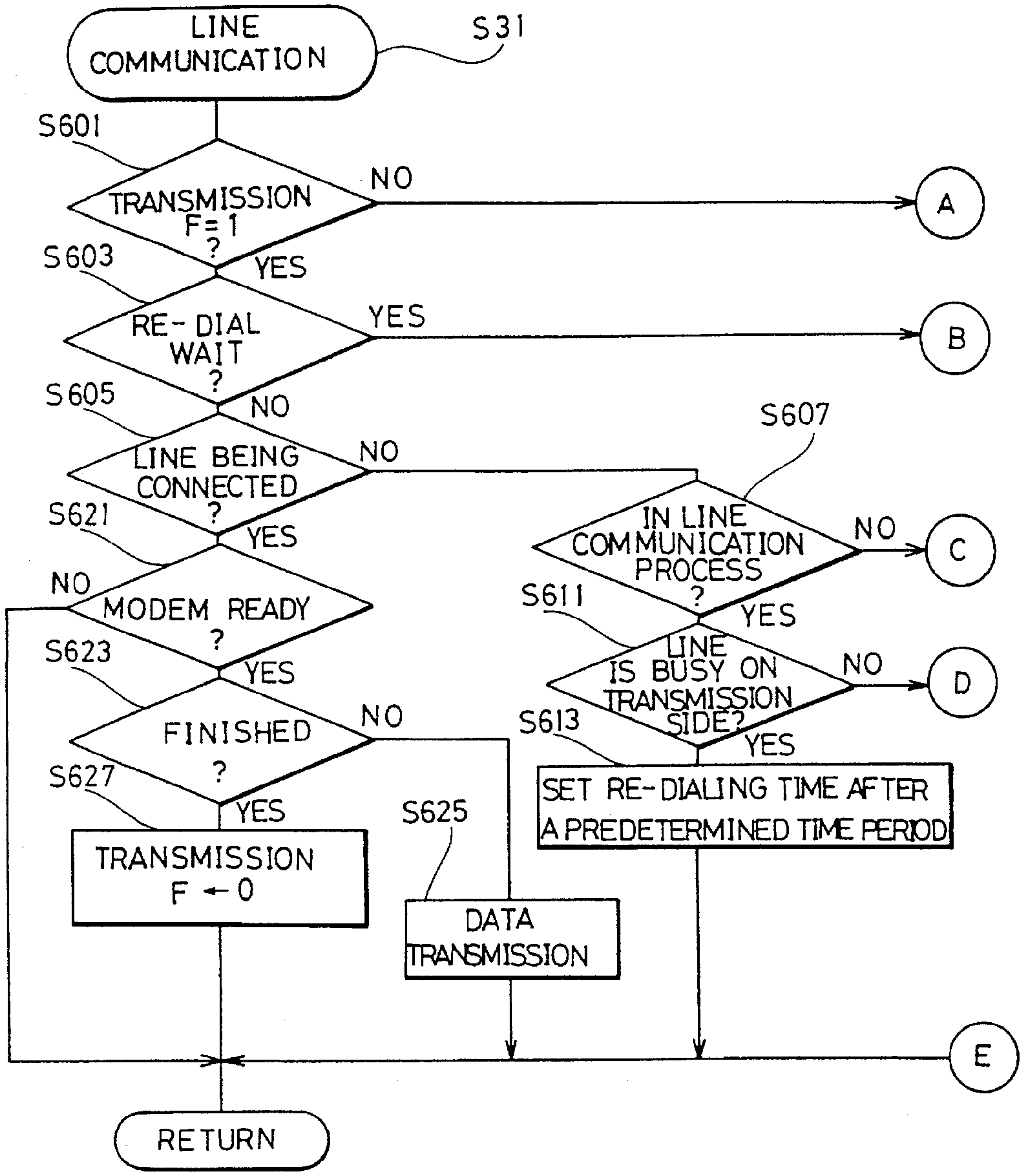
FIGS. 14A and 14B are flow charts showing specific contents of the line communication process routine of FIG. 7.
Figure 14B:
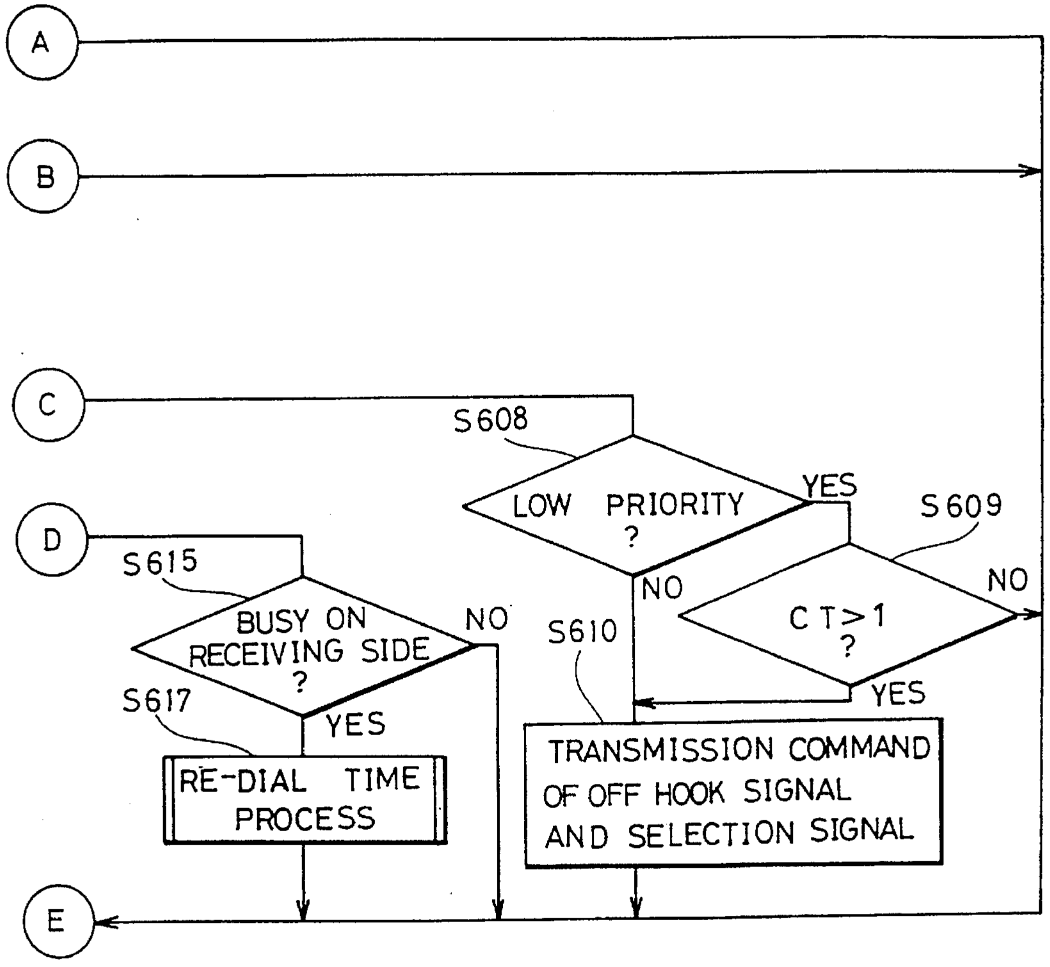

* Line Communication Process (FIGS. 14A and 14B)

In this routine, the center is called in response to "any of transmission flags=1", and data corresponding to the particular transmission flag is transmitted.

That is, when any of transmission flags is set to "1" (YES in S601), on the conditions that it is not in the redialing standby (NO in S603), the line is not connected yet with the center (NO in S605), and it is not in standby after a transmission command of an off-hook signal and a selection signal (NO in S607), and furthermore on the condition that the present time is not in the transmission forbidding time period in the case of transmission with the low priority (YES in S608 and YES in S609), transmission of an off-hook signal and a selection signal is commanded to model 52 (S610). The "CT" in step S609 will be described in detail in the description of the redialing time process (FIGS. 15A and 15B).

Figure 20:
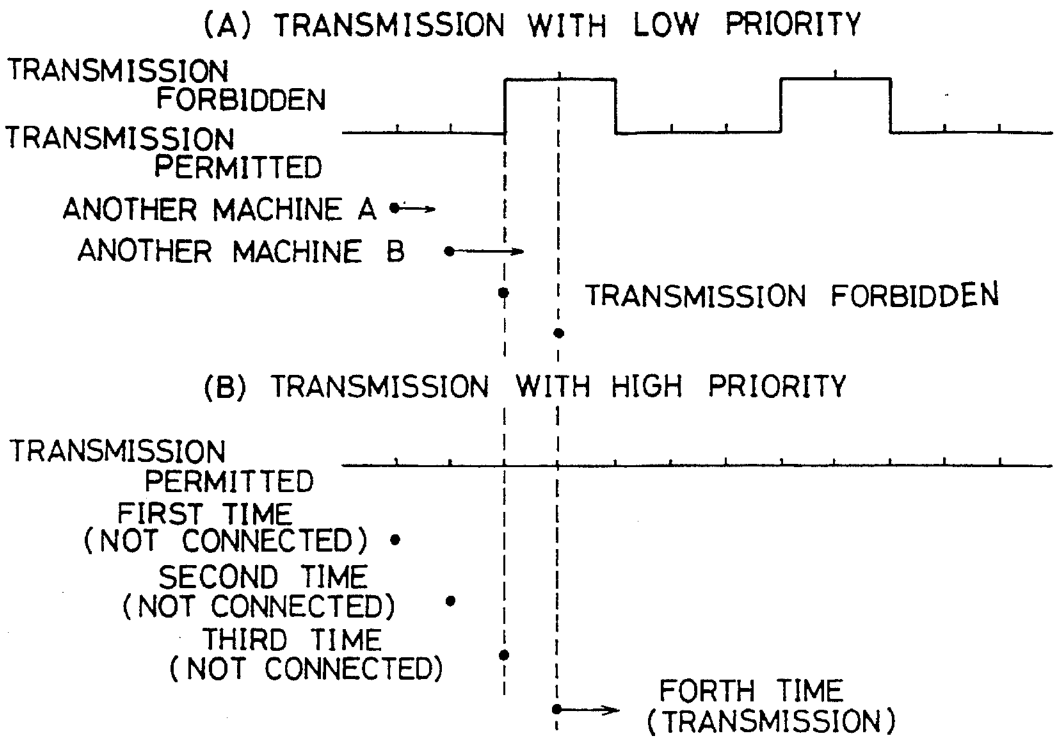
FIG. 20 is a diagram showing transmission conditions in accordance with the priority when the first embodiment of the present invention is applied thereto.

In the above description, the transmission forbidding time period means a time period in which transmission with low priority (for example, transmission other than a trouble transmission) is forbidden, wherein transmission forbidding and transmission permission are alternately repeated at intervals of two minutes, three minutes, two minutes, three minutes, . . . as shown in FIG. 20 (in the figure the scale is one minute). Accordingly, when transmission from a number of DTs collectively occur, connection with a DT making transmission with high priority is likely to be secured.

Figure 21:
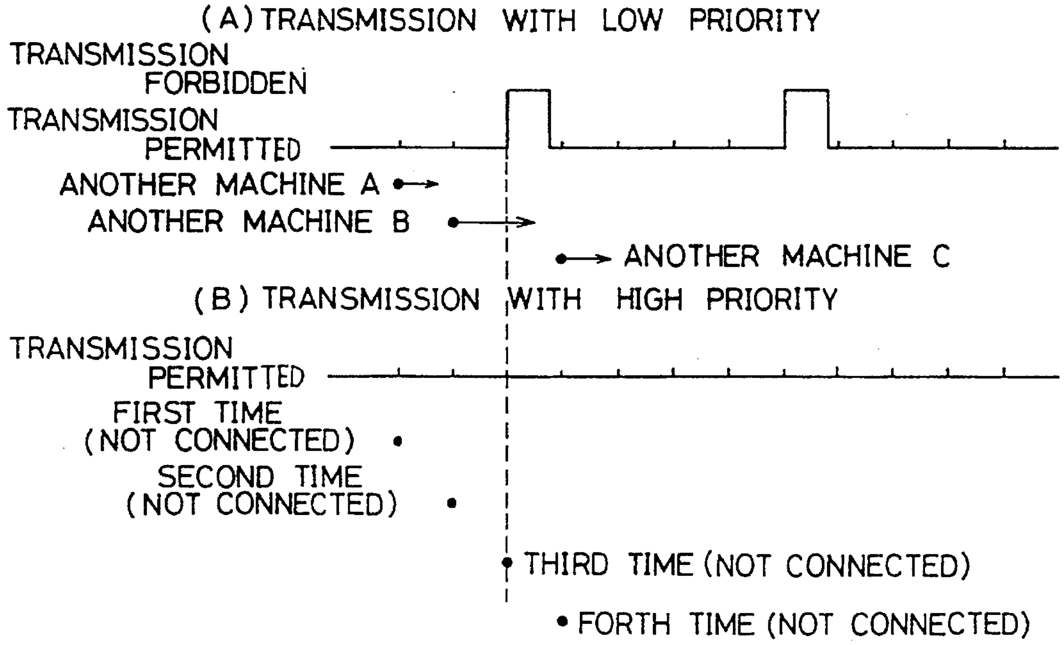
FIG. 21 is a diagram showing transmission conditions in accordance with the priority when the first embodiment of the present invention is not applied thereto.

Furthermore, each transmission forbidding maintaining time is set to two minutes which is longer enough than 45 seconds which is an average time required for communication with the center. Therefore, as clearly seen from comparison with FIG. 21, even when transmission from other equipments take place one after another and communication with another device takes a long time, connection of the line with the center is made relatively sooner (three minutes after in FIG. 20). In FIG. 21, the transmission forbidding maintaining time is 40 seconds.

As a result of the process in the S610, when the telephone machine 53 is "line is busy", and an off-hook signal and a selection signal can not be transmitted accordingly (YES in S611), in order to perform the above-mentioned S610 process again after a predetermined time period, a re-dial time (a time after the above predetermined time period) is set (S613). By this, until the above-mentioned re-dial time, the determination in the S603 is "YES", and the process of the S610 is not carried out, accordingly. At the re-dial time, with NO in S603 → NO in S605 → NO in S607 → (NO in S608 or YES in S608 and YES in S609) → S610, modem 52 is commanded to transmit an off-hook signal and a selection signal again.

As a result of transmission of the selection signal to the telephone network from modem 52 in accordance with the process in the S610, when a determination is made that the modem 72 on the center side is "busy (including a case in which there is no response from CPU 91 even when connection with modem 72 is implemented)" (YES in S615), the redial time process (Refer to FIGS. 15A and 15B, S617)

is carried out, and the process of the above S610 is carried out again at the time set in the process. The redialing time process will be described later.

On the other hand, as a result of the transmission of the selection signal to the telephone network from modem 52 in accordance with the process of the above S610, when the line is connected with the center side modem 72 (YES in S605), after standing by the ready of modem 52 (YES in S621), the data is transmitted to the center (S625). The transmitted data is data defined by a transmission flag which is set to "1".

In this way, when all the data are transmitted (YES in S623), the above transmission flag is reset to "0" (S627).

The line communication process is performed as described above, data is transmitted to the center and data from the center are received as needed.

* Present Time Setting (FIG. 16)

Waiting for completion of the data transmission (YES in S701), in step S703, the ready condition of the center is brought on standby. Upon the ready of the center (YES in S703), the present time data which is transmission data from the center side (year, month, day, hour, minute, second) is received (S705).

After receipt, a determination is made as to whether the receipt has been made normally. As a result, in the case of error occurrence (NO in S707), retransmission of the present time data is demanded for the center side (S709).

When it is normally received (YES in S707), the line with modem 72 on the center side is disconnected (S711), and subsequently, the present time is set on the basis of the above received data (S713).

As described above, the present time of the DT is made coincide with the present time on the center.

* Redial Time Process (FIGS. 15A and 15B)

This routine is a process for setting a redialing time when a DT can not be connected to the center due to some conditions in the center.

First, a counter for counting the number of times of redialing (a redial counter) is counted up (S651). The counter is cleared after connection with the center.

Next, a determination is made as to whether the present dialing is a dialing in an emergency mode (in the case of trouble transmission) or not, and if it is the emergency mode (YES in S653), on the condition that a redial counter value is a (=about 10–20 times) or less (YES in S655), the time one minute after the present time is set as the next dialing (re-dialing) time (S657).

That is, in the case of the emergency mode, the center is called for every minute until the number of times of redialing exceeds a times.

When the number of times of redialing in the emergency mode exceeds a (NO in S655), a predetermined time in the next day is set as a redialing time (S659). The redialing time is set in the next day in order to avoid occupying a telephone of a user when connection to the center can not be made in spite of dialing for "a" times (abnormally busy network condition, operation stop of the center computer and so forth are possible).

On the other hand, when it is determined that it is not in the emergency mode in the S653 (NO in S653), that is, when it was dialing because of a cause other than trouble transmission, on the condition that the redial counter value is b or less (YES in S661), an arbitrary even minute time within twenty minutes from the present time is set as the next dialing (re-dialing) time on the basis of a random number produced in a random number producing portion 19 of CPU 11 (S663). That is, redialing is made within twenty minutes. This is for dispersing redialing times of respective DTs on the basis of random numbers when the center is called from a large number of DTs, so that the possibility of connection to the center is enhanced for each. When the set time is in the transmission forbidding time period (NO in S685), however, the redial time is set again. The processes of steps S681– S685 will be described later together.

When the number of times of redialing in the non-emergency mode exceeds b (NO in S661), on the condition that it is c or less (YES in S665), an arbitrary even minute time within forty minutes from the present time is set as the next dialing time employing a random number similarly to the above-described case (S667). That is, redialing is made within forty minutes. This is for further enhancing the possibility of connection to the center by dispersing redialing times of respective DTs in a range wider than the case of step S663 when center dialings take place from a large number of DTs. However, similarly to the above description, if the set time is in a transmission forbidding time period (NO in S685), the redialing time is set again.

Furthermore, when the number of times of redialing in the non-emergency mode exceeds c and also it is d or less (YES in S669), an arbitrary time within forty minutes from the present time is set as the next dialing time employing a random number similarly to the above description (S671). That is, releasing the condition of even number minute time to increase selectable times than the case of step S667, the possibility of connection to the center is enhanced. When the set time is in the transmission forbidding time period (NO in S685), however, the redialing time is set again.

When the number of times of redialing in the non-emergency mode exceeds d (NO in S669), a predetermined time on the next day is set as a redialing time (S673). This is for, when connection to the center can not be made in spite of dialing of d times (an abnormality on the network, operational stop of a center computer and so forth are possible), avoiding occupying a telephone of a user.

Steps S681–S685 are processes for re-setting a redialing time when the redialing time set in the non-emergency mode is in the transmission forbidding time period (NO in S685).

Figure 7:
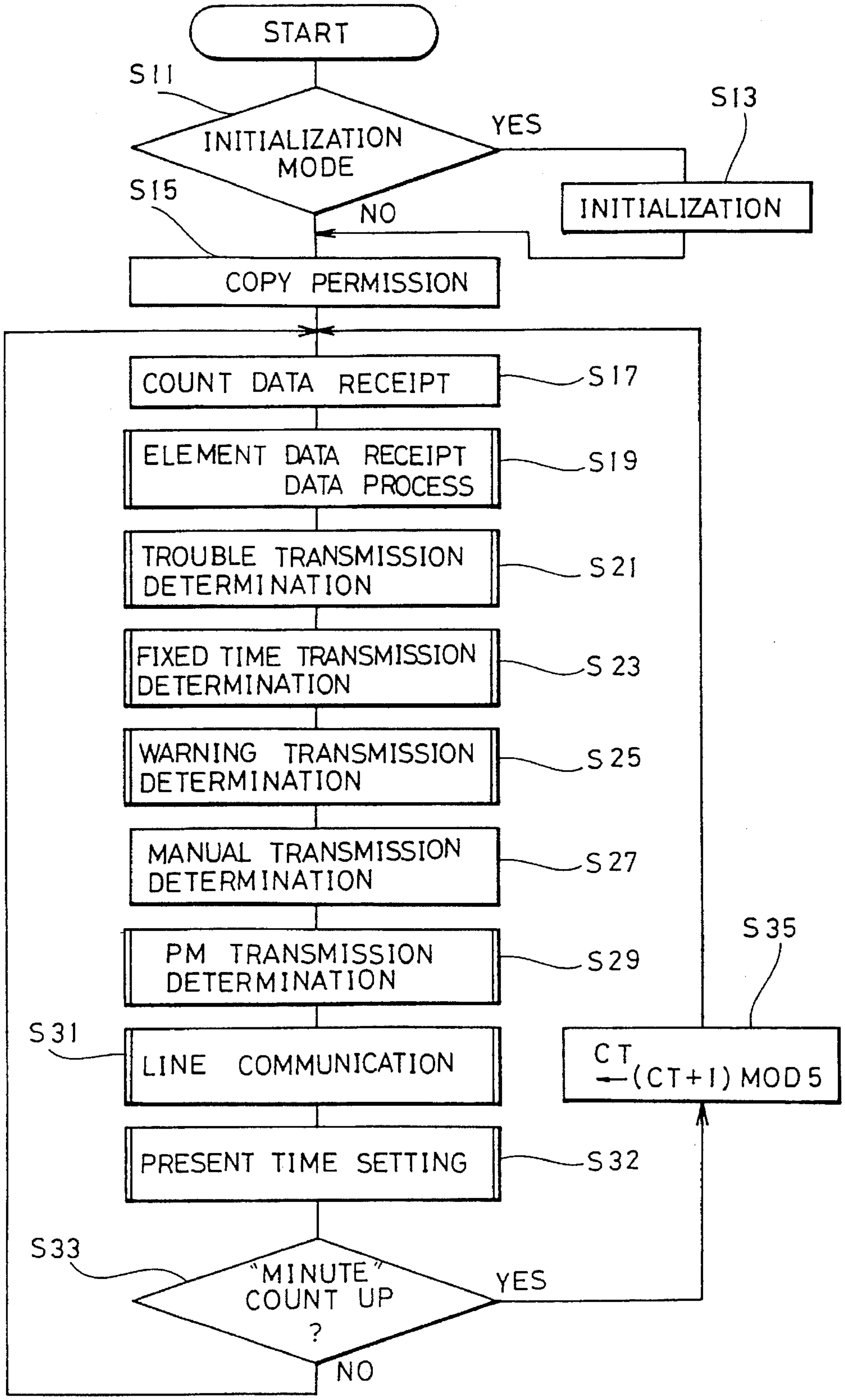
FIG. 7 is a flow chart showing a main routine performed by the control CPU of the control apparatus of FIG. 1.

As shown in FIG. 7, CPU 11 increments a counter variable CT through "1" every time one minute passes (YES in S33), and divides it by "5" and the remainder is substituted into the counter variable CT (S35). That is, the value of the CT changes in rotation as 0→1→2→3→ 4→0→ . . . for every one minute. Here, CT=2–4 is a transmission permission time period and CT=0–1 is a transmission forbidding time period (refer to FIG. 18).

A CTX can be made equivalent to the above CT by, in the process of step S683, adding the present time X thereto, dividing it by "5" to obtain a remainder, and substituting it into the counter variable CTX. That is, CTX=2–4 can be a transmission permitted time period and CTX=0–1 can be a transmission forbidding time period.

In this way, a determination is made in the above step S685.

Processing in the Center

Next, the processing in a CPU 91 provided in computer 90 in the center will be described referring to FIGS. 17–19.

Figure 17:
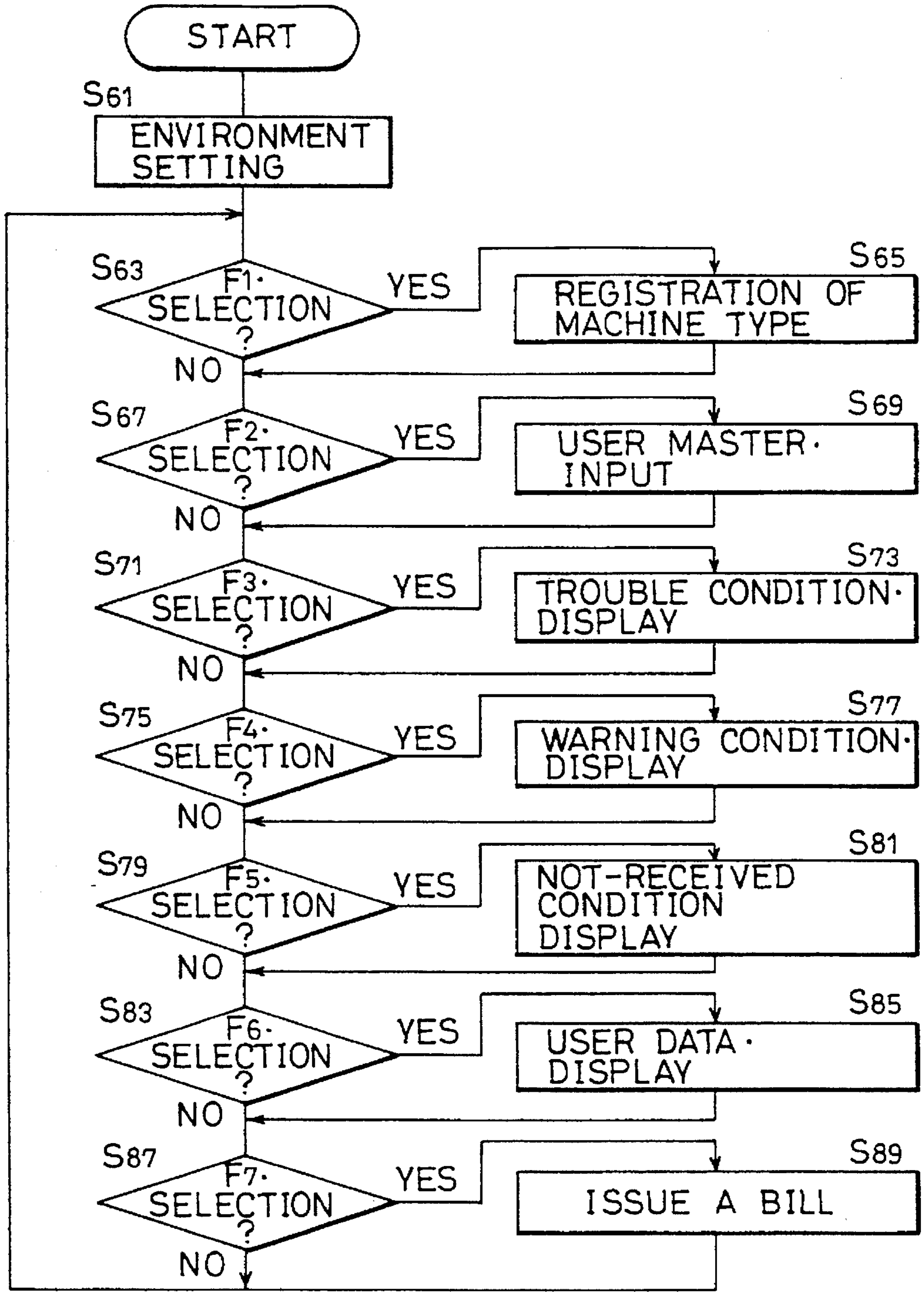
FIG. 17 is a flow chart showing a main routine of the control CPU of the centralized control unit of FIG. 1.

(a) F1–F7 key processes (FIG. 17)

CPU 91 starts processing upon turn-on of a power source, and performs environment setting of a modem, a printer and the like (S61). Subsequently, in response to input operation of each key F1–F7, the following modes are set or the following processes are executed.

F1 key operation (YES in S63)

An acceptance mode of machine type registration is set (S65). That is, new registration of machine type name, the number of items of element data, a name of each element data, a standard threshold value of each element data, a standard threshold value of each counter, etc. are accepted.

F2 key operation (YES in S67)

A registration acceptance mode of a user master is set (S69). That is, new registration of a name of user, address, telephone number, machine type name, machine number, date and time of fixed time transmission, etc. are accepted. Also, the DTID is automatically set.

F3 key operation (YES in S71)

The trouble conditions are displayed (S73). That is, user information (a name of the user, address, telephone number, a machine type name) of a copying machine of trouble transmission, date and hour of occurrence and so forth are displayed in display 92 together with contents of the trouble. The number of trouble cases is always displayed in a corner portion of display 92 without any connection with operation of F3 key.

F4 key operation (YES in S75)

A warning condition is displayed (S77). That is, user information and so forth of a copying machine of the warning transmission are displayed in display 92 together with the contents of the warning. The number of warning cases is always displayed in a corner portion of display 92 without any connection with operation of the F4 key.

F5 key operation (YES in S79)

A not-received condition is displayed (S81). That is, user information of a copying machine which does not make fixed time transmission even after a predetermined fixed time transmission time is displayed in display 92. The number of no receipt cases is always displayed in a corner portion of display 92 without any connection with operation of the F4 key.

F6 key operation (YES in S83)

A display mode for user data is implemented (S85). That is, when a user is selected, user information is displayed in display 92. Also, if a sub menu is selected, count values of various counters of the copying machine of the particular user (a total counter, a counter for each paper size, a JAM counter, a trouble counter, a PM counter) and element data are displayed for every month or for every item.

F7 key operation (YES in S87)

A bill is printed out (S89). For example, an amount asked is calculated on the basis of a count value of the total counter and a predetermined calculation expression, and printer 94 is activated to print it out.

Figure 18:
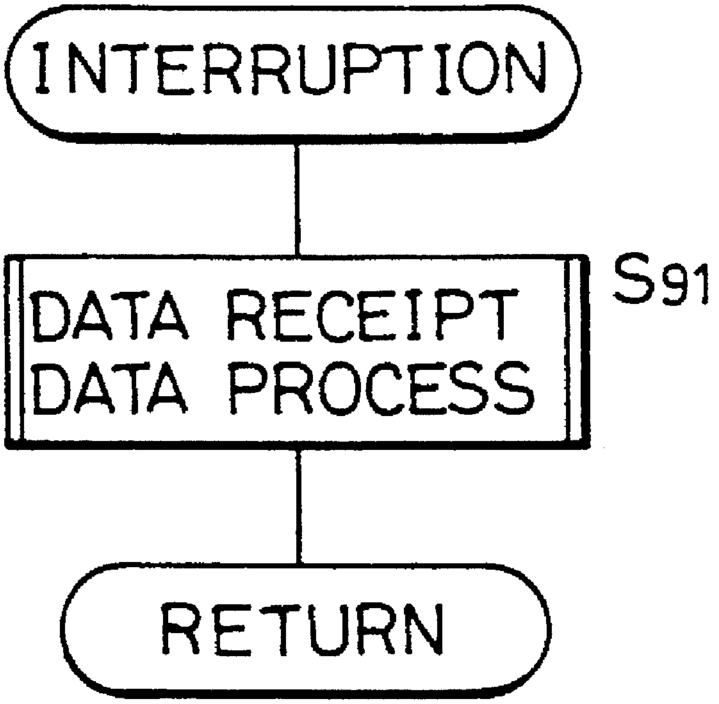
FIG. 18 is a flow chart showing an interruption process for the control CPU of the centralized control unit of FIG. 1.
Figure 19:
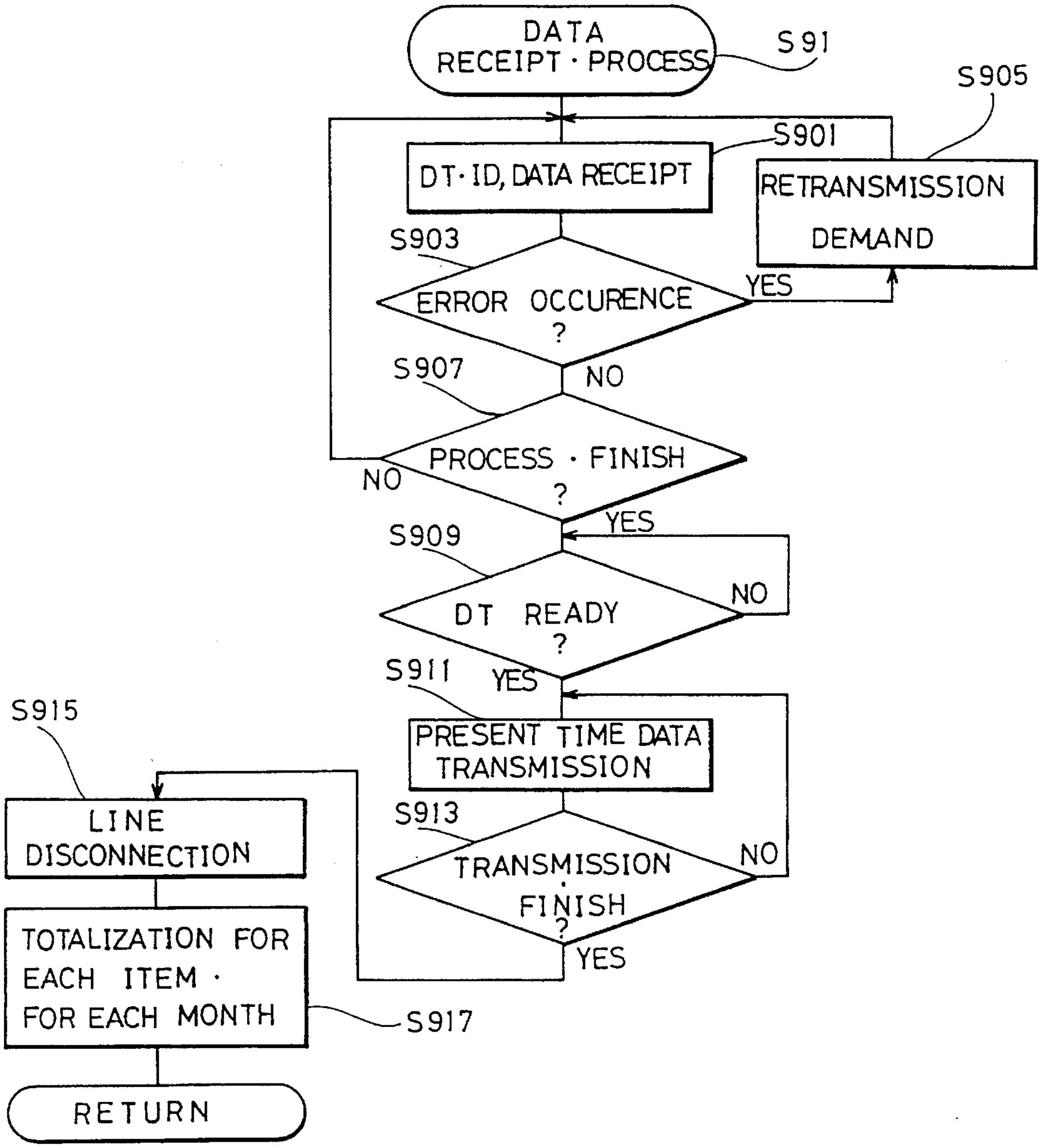
FIG. 19 is a flow chart showing specific contents of the data receipt and the data process routine of FIG. 18.

(b) Interruption Process (FIGS. 18 and 19)

CPU 91 receives data transmitted from a DT by an interruption process, and also applies a predetermined process to the received data (S91).

First, when an interruption is produced on the DT side, CPU 91 receives a DTID and transmission data (S901).

When a communication error occurs (YES in S903), CPU 91 requests retransmission of the DTID and the transmission data to the DT side (S905).

When the data receiving and data processing are normally finished (YES in S907), after standby of the ready of the DT (YES in S909), the present time data is transmitted to the DT side (S911).

Subsequently, when the data transmission is finished (YES in S913), CPU91 disconnects the line (S915), and then finds out totals for each item and for each month to produce data to be displayed in the screen by operator's selection (S917).

When the number of times of communication error occurrence in S903 is a predetermined number of times or less, retransmission may be requested in S905 and when it exceeds the predetermined times, the line may be disconnected by force.

In this embodiment, transmission forbidding time periods each longer than the time required for normal data communication with the centralized control unit is set at certain time intervals for a case where the priority of the transmission is low. When the priority is high, the transmission is always permitted. Also, redialing of transmission with high priority is made after a relatively short time period.

By this, transmission with high priority (for example, transmission by trouble occurrence, etc.) is likely to be made even when the line is busy.

A description will be made below referring to FIG. 20 (about the present embodiment) and FIG. 21 (when a transmission forbidding time period about transmission with low priority is shorter than the time required for data communication). In the figure, the "." mark without an arrow shows a case where connection to the centralized control unit can not be made.

It is presumed that the line on the centralized control unit side is occupied by transmission with low priority from another device A ([A] in the figure) just before the first transmission with high priority (FIG. 21[B]), or that the data communication between another machine B and the centralized control unit is maintained overlapping the transmission forbidding time period about transmission with low priority.

If transmissions from other apparatus continuously take place after that, not only at the time of retransmission (the second time) but also at re-re-transmission (the third time) and re-re-retransmission (the fourth time), connection with the control center for transmission with high priority can not be made.

On the other hand, as shown in FIG. 20, when the transmission forbidding time period about transmission with low priority is set longer than the time required for the data communication, even if connection can not be made at the first time, the connection with the control center for transmission with high priority can be made at the fourth transmission with high priority because transmission of another device B is finished and also the transmission with low priority of other devices is forbidden.

Next, the second embodiment of the present invention will be described.

In the second embodiment, transmission time periods are separately divided according to the priority of transmission. The above-described first embodiment and the second embodiment are different in the processes of line communication and redialing time described in FIGS. 14A and 14B, FIGS. 15A and 15B, FIG. 20 and FIG. 21 in the first embodiment. The second embodiment will be described employing FIGS. 22A and 22B replacing FIGS. 14A and 14B and FIGS. 22A and 22B replacing FIGS. 15A and 15B of the first embodiment, respectively, and FIGS. 24 and 25. Since other figures of the first embodiment can be shared by the second embodiment, description about those figures is not repeated in this embodiment.

Figure 22A:
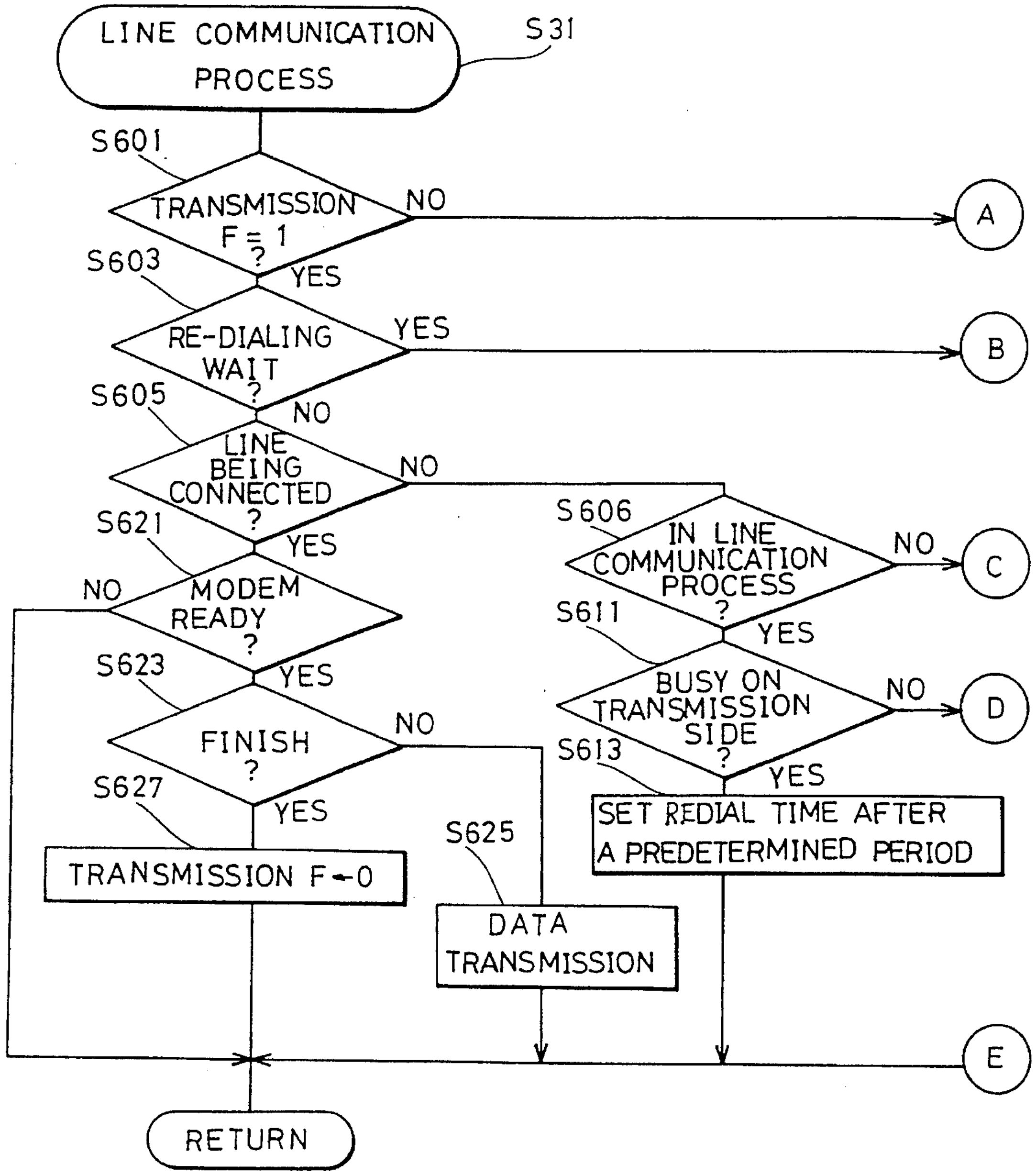
FIGS. 22A and 22B are flow charts showing specific contents of a line communication process routine according to the second embodiment of the present invention.
Figure 22B:
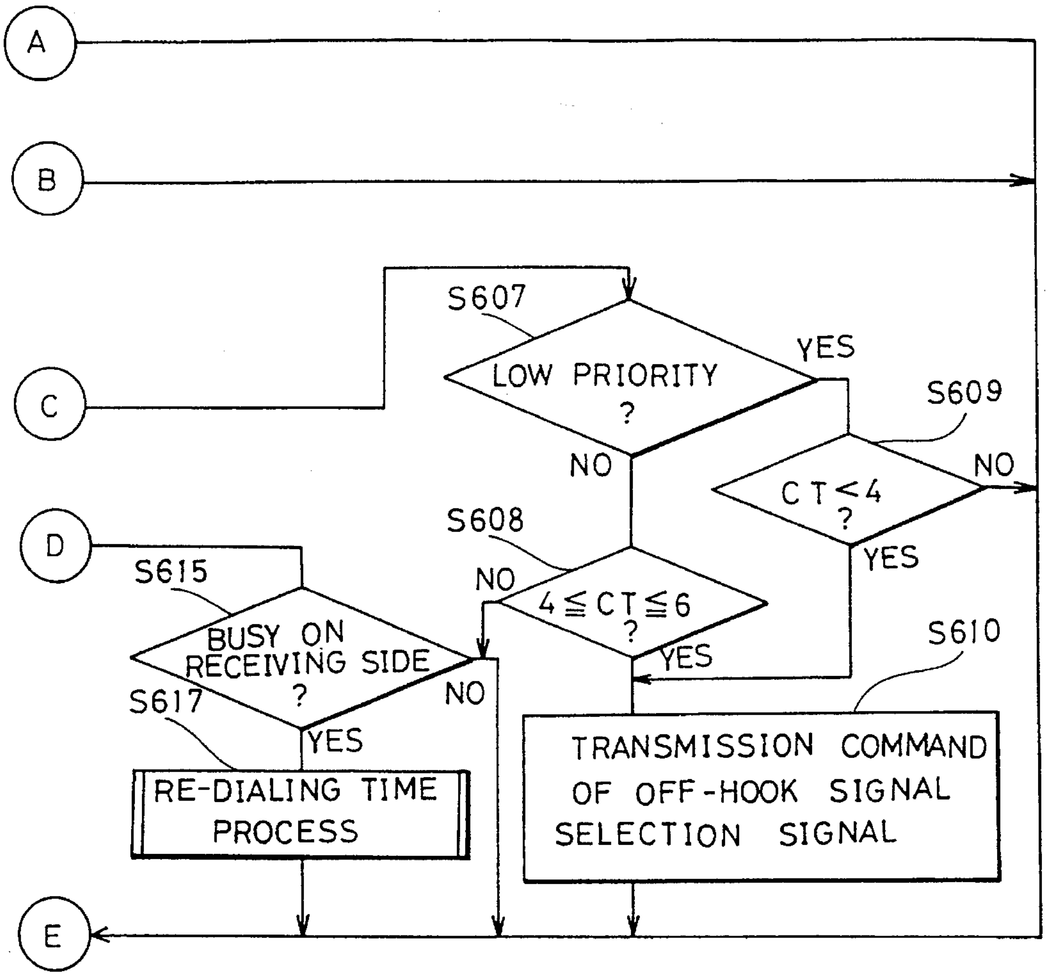

* Line Communication Process (FIGS. 22A and 22B)

In this routine, the center is called in response to "any transmission flag=1", and data corresponding to the transmission flag is transmitted.

Figure 23A:
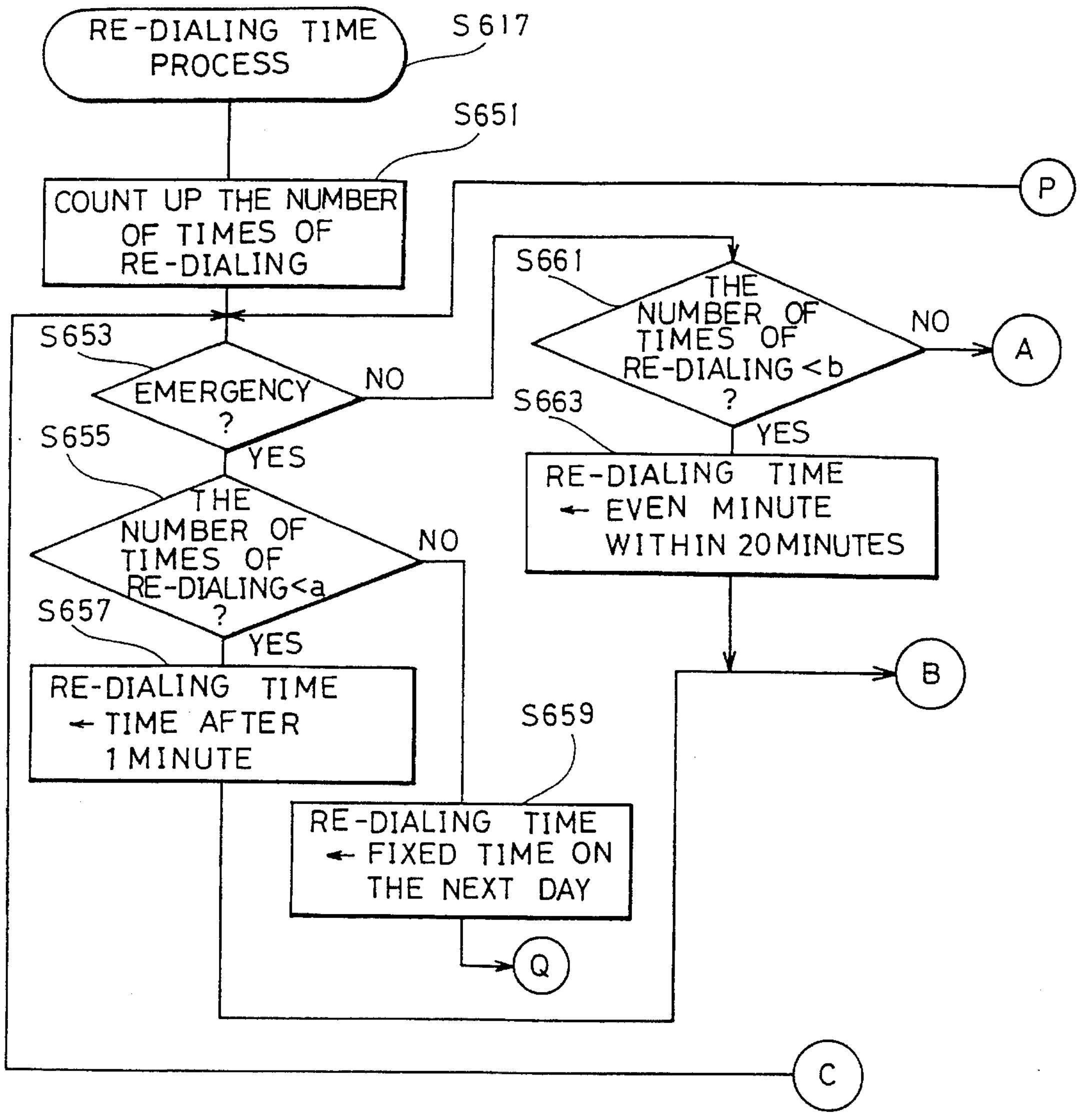
FIGS. 23A and 23B are flow charts showing specific contents of the redialing time process in the second embodiment of the present invention.
Figure 23B:
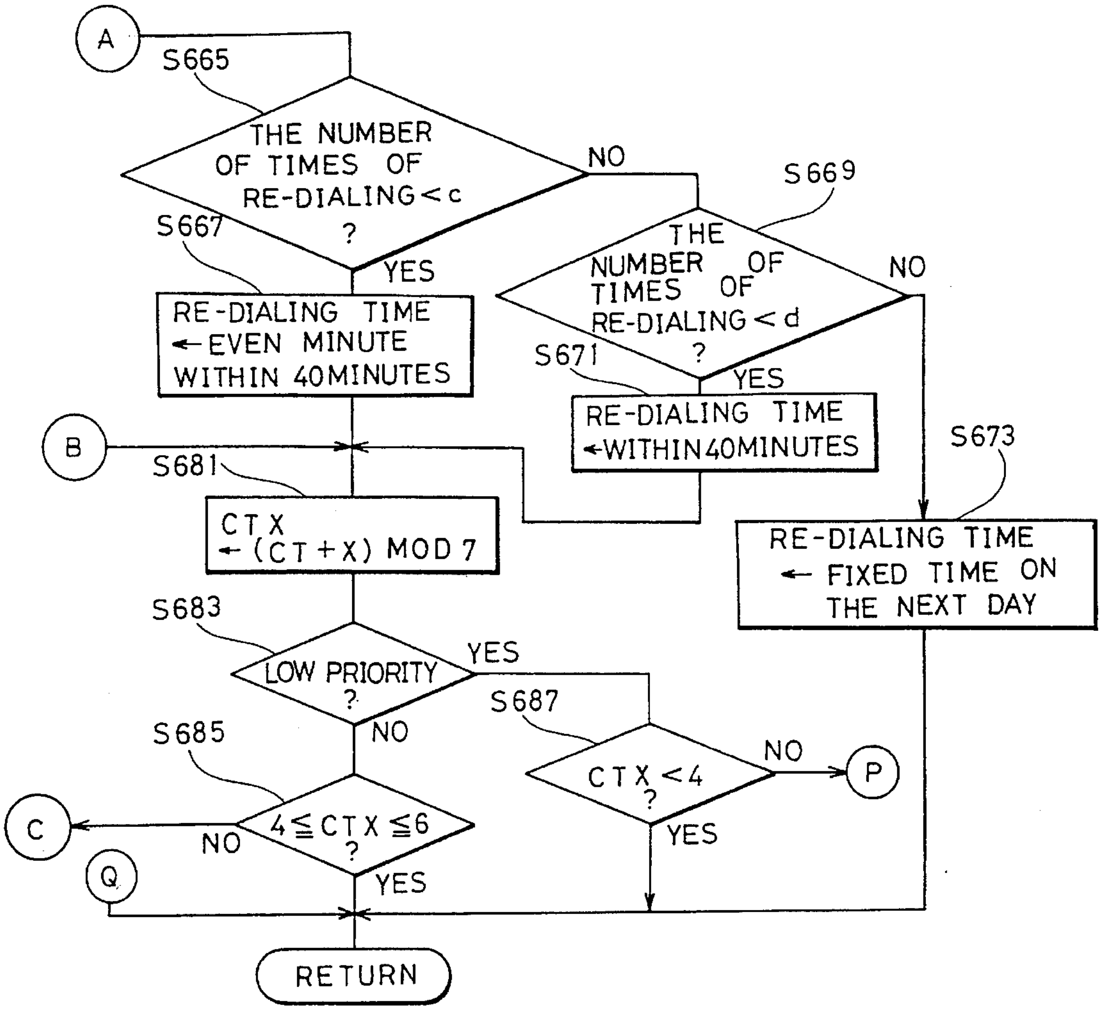

That is, when any of transmission flags is set to "1" (YES in S601), on the conditions that it is not in redialing standby (NO in S603), the line is not connected to the center (NO in S605), and it is not in standby after transmission command of an off-hook signal and a selection signal (NO in S606), and furthermore on the condition that it is not in the transmission forbidding time period (YES in S607 and YES in S609, or NO in S607 and YES in S608), command of transmission of an off-hook signal and a selection signal is made for modem 52 (S610). The "CT" of steps S608 and S609 will be described in the description about the redialing time process (FIGS. 23A and 23B).

Figure 24:
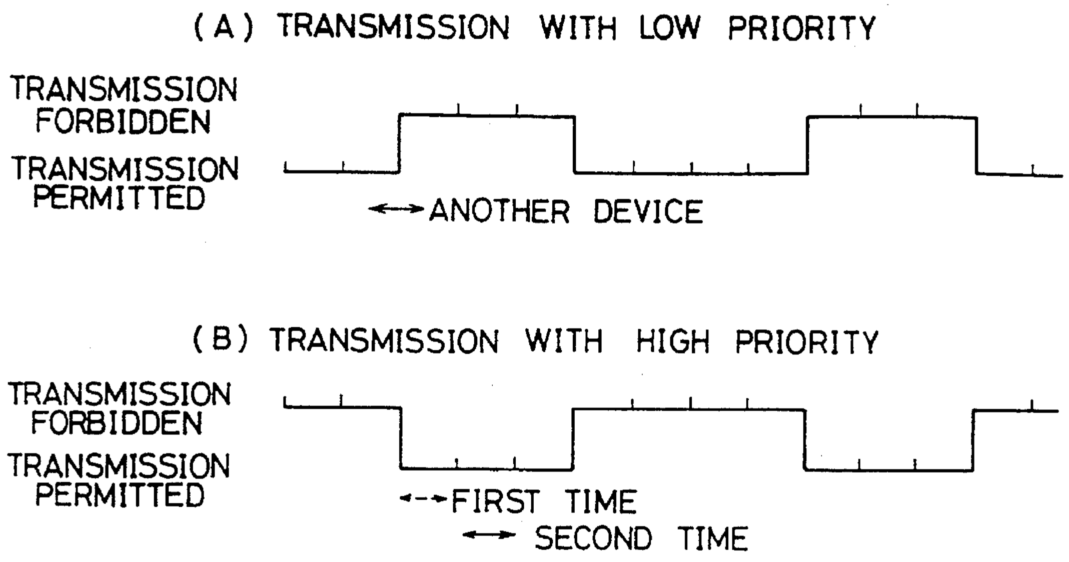
FIG. 24 is a diagram showing transmission condition in accordance with the priority when the second embodiment of the present invention is applied thereto.

In the description above, the transmission forbidding time periods are time periods which are set alternately and complimentarily for communication with high priority (for example, trouble communication) and transmission with low priority as shown in FIG. 24 (in the figure, the division of the scale is one minute), wherein each transmission forbidding and transmission permission are alternately repeated at intervals of three minutes, four minutes, three minutes, four minutes, . . . . Usually, since transmission with high priority such as trouble transmission is low in the occurrence frequency as compared to transmission with low priority, connection between a DT making transmission with high priority and the center can be easily secured even when transmission collectively take place from a large number of DTs. Also, as seen from comparison with FIG. 25, when transmission from other apparatus continuously take place, the line is connected to the center relatively sooner (the second time in FIG. 24).

As a result of the process in the S609, when the telephone machine 53 is "line is busy", and an off-hook signal and a selection signal can not be transmitted accordingly (YES in S611), in order to perform the above-mentioned S610 process again after a predetermined time period, a re-dial time (a time after the above predetermined time period) is set (S613). By this, until the above-mentioned redial time, the determination in the S603 is "YES", and the process of the S610 is not carried out, accordingly. At the re-dial time, with NO in S603 → NO in S605 → NO in S606 → (YES in S607, and, YES in S609, or NO in S607, and YES in S608) → S610, modem 52 is commanded to transmit an off-hook signal and a selection signal again.

As the result of transmission of the selection signal to the telephone network from modem 52 in accordance with the process in the S610, when a determination is made that the modem 72 on the center side is "busy (including a case in which there is no response from CPU 91 even when connection with modem 72 is implemented)" (YES in S615), the redial time process (S617, FIGS. 15A and 15B) is carried out, and the process of the above S610 is carried out again at the time set in the process. The redialing time process will be described later.

On the other hand, as the result of the transmission of the selection signal to the telephone network from modem 52 in accordance with the process of the above S610, when the line is connected with the center side modem 72 (YES in S605), after standing by the ready of modem 52 (YES in S621), the data is transmitted to the center (S625). The transmitted data is data defined by a transmission flag which is set to "1".

Thus, when all the data are transmitted (YES in S623), the above transmission flag is reset to "0" (S627).

The line communication process is performed as described above, data is transmitted to the center and data from the center are received as needed.

* Redial Time Process (FIGS. FIGS. 23A and 23B)

This routine is a process for setting a redialing time when a DT can not be connected to the center due to some conditions in the center.

First, a counter for counting the number of times of redialing (a redial counter) is counted up (S651). The counter is cleared after connection with the center.

Next, a determination is made as to whether the present dialing is a dialing in an emergency mode (in the case of trouble transmission) or not, and if it is the emergency mode (YES in S653), on the condition that a redial counter value is a (=about 10–20 times) or less (YES in S655), the time one minute after the present time is set as the next redialing time (S657). That is, in the case of the emergency mode, the center is called for every minute until the number of times of redialing exceeds "a" times. When the set time is in the transmission forbidding time period (NO in S685, or NO in S687), however, the redialing time is set again. The process is of steps S681–S687 will be described later.

When the number of times of redialing in the emergency mode exceeds a (NO in S655), a predetermined time in the next day is set as a redialing time (S659). The redialing time is set in the next day in order to avoid occupying a telephone of a user when connection to the center can not be made in spite of dialing for a times (abnormality on the network, operation stop of the center computer and so forth are possible).

On the other hand, when it is determined that it is not in the emergency mode in the S653 (NO in S653), that is, when it was dialing because of a cause other than trouble transmission, on the condition that the redial counter value is b or less (YES in S661), an arbitrary even minute time within twenty minutes from the present time is set as the next redialing time on the basis of a random number produced in a random number producing portion 19 of CPU 11 (S663). That is, redialing is made within twenty minutes. This is done in order to increase the possibility of connecting to the center in the first redialing by dispersing redialing times of respective DTs on the basis of the random numbers when dialing to the center from a large number of DTs are made. Similarly to the case of the above-described emergency, however, when the set time is in the transmission forbidding time period (NO in S685 or NO in S687), the redialing time is set again.

When the number of times of redialing in the non-emergency mode exceeds b (NO in S661), on the condition that it is c or less (YES in S665), an arbitrary even minute time within forty minutes from the present time is set as the next dialing time employing a random number similarly to the above-described case (S667). That is, redialing is made within forty minutes. This is for further enhancing the possibility of connection to the center by dispersing redialing times of respect DTs in a range wider than the case of step S663 when center dialings take place from a large number of DTs. However, similarly to the above description, if the set time is in a transmission forbidding time period (NO in S685 or NO in S687), the redialing time is set again.

Furthermore, when the number of times of redialing in the non-emergency mode exceeds c and also is d or less (YES in S669), an arbitrary time within forty minutes from the present time is set as the next dialing time employing a random number similarly to the above description (S671). That is, releasing the condition of even number minute time to increase selectable times than the case of step S667, the possibility of connection to the center is enhanced. When the set time is in the transmission forbidding time period (NO in S685 or in S687), however, the redialing time is set again.

When the number of times of redialing in the non-emergency mode exceeds d (NO in S669), a predetermined time in the next day is set as a redialing time (S673).

When connection to the center can not be made in spite of dialing of d times (an abnormality on the network, operational stop of a center computer and so forth are possible), it is avoided to occupy a telephone of a user.

Steps S681–S687 are processes for setting a redialing time again when the set redialing time is in the transmission forbidding time period (NO in S685, or NO in S687).

As shown in FIG. 7, CPU 11 increments a counter variable CT through "1" for every one minute (YES in S33), and divides it by "7", and substitutes the reminder thereof into the counter variable CT (S35). That is, the value of the CT changes in rotation as 0→1→2→3→4→ 5→6→0→ . . . for every time one minute. The CT=0–3 is the transmission permitting time period with transmission with low priority and CT=4–6 is transmission permitting time period of transmission with high priority (refer to FIG. 24).

A CTX can be made equivalent to the above CT by, in the process of step S681, adding the present time X to CT, dividing it by "7", to obtain the reminder, and substituting it into the counter variable CTX. That is, CTX=0–3 is for transmission permission time period of transmission with low priority and CTX=4–6 is for transmission permission time period of transmission with high priority.

In this way, the determination of the step S685 and S687 can be made.

In the embodiment, different transmission time periods are assigned by transmission time period control means to transmission with low priority and transmission with high priority, respectively. Accordingly, the possibility of connection with the center for transmission with high priority can be further enhanced.

A similar limitation is also provided in redialing, so that transmission with high priority (e.g., transmission for trouble occurrence) is likely to be connected even when the line is very busy.

Description will be made below referring to FIG. 24 (more preferable example) and FIG. 25 (although included in the present invention, there is no assignment made for transmission time periods). In the figure, a broken line shows the case where connection to the centralized control unit is impossible.

Figure 25:
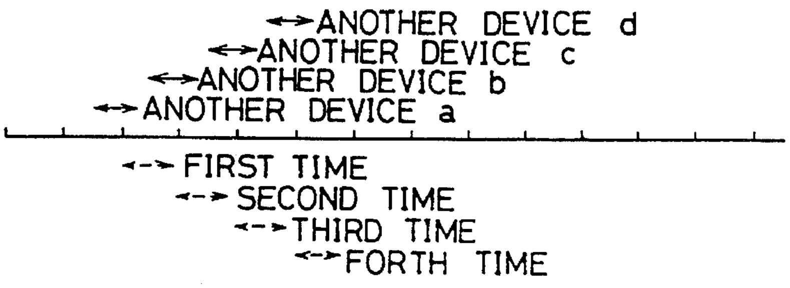
FIG. 25 is a diagram for describing a case where the line of the centralized control unit size is occupied by transmission with low priority of another equipment in the second embodiment of the present invention.

It is presumed that the line on the centralized control unit side is occupied by transmission with low priority from another device "a" just before the first transmission with high priority (FIG. 25). In this case, the transmission with high priority cannot be connected to the center as clearly seen from the figure.

When transmissions from other apparatus continuously occur after that as shown in the figure, not only retransmission (the second time) to be performed a predetermined time after, but also re-retransmission (the third time) to be performed a predetermined time after similarly, and furthermore re-re-retransmission (the fourth time) cannot be connected to the control center.

On the other hand, as shown in FIG. 24, when transmission with low priority and transmission with high priority are assigned to different transmission time periods, respectively, even if connection cannot be made at the first time, at the time of retransmission of transmission with high priority, the transmission with high priority can be connected to the control center since transmission of another apparatus with low priority is already finished, and transmission from other apparatus with low priority are forbidden.

Next, the third embodiment of the present invention will be described.

Figure 26:
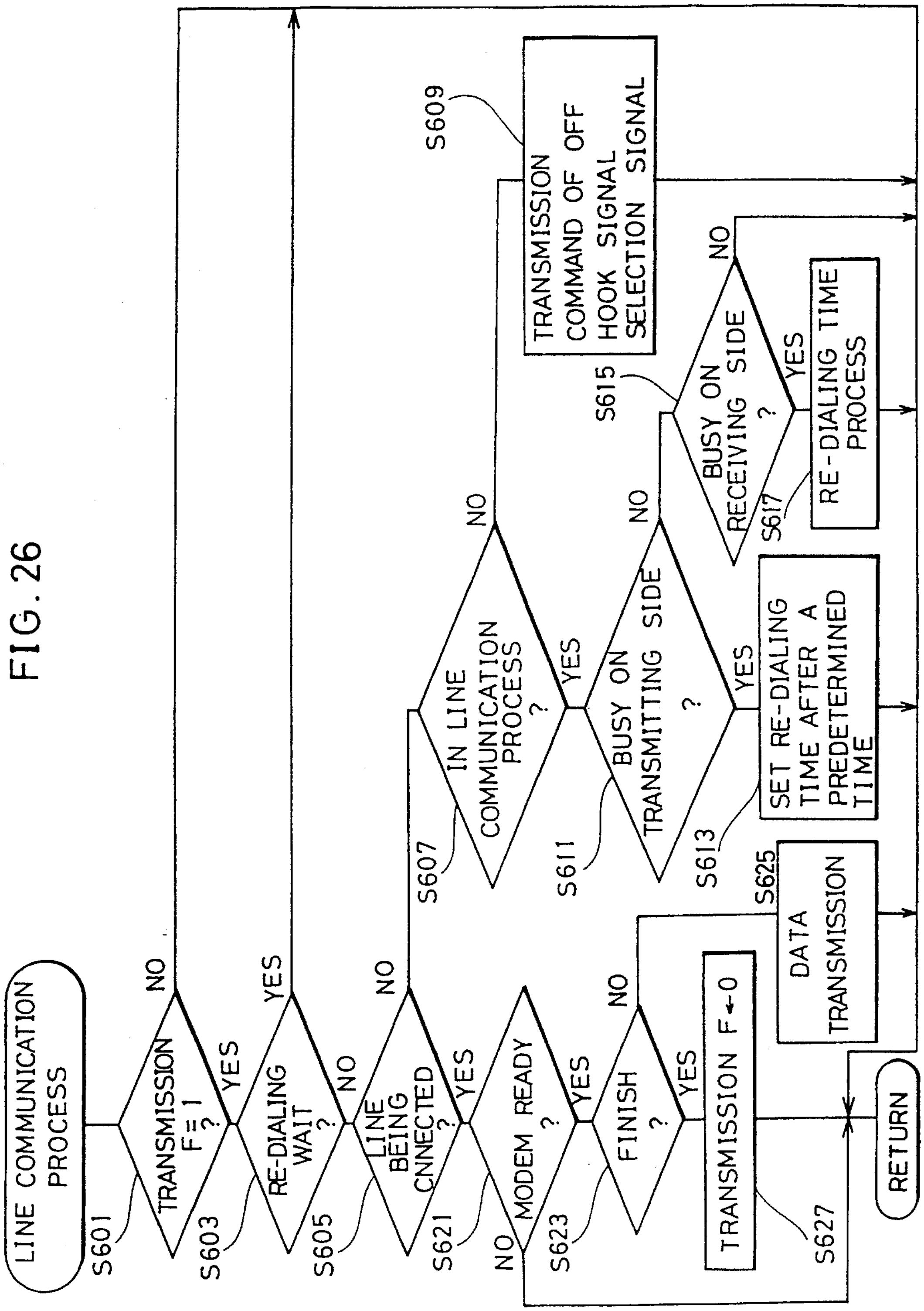
FIG. 26 is a flow chart showing specific contents of the line communication process routine in accordance with the third embodiment of the present invention.

In the third embodiment, the transmission forbidding time period described in FIG. 24 of the second embodiment is released depending on the number of times of redialing. The above-described second embodiment and the third embodiment are different from each other in the line communication process and the redialing time process described in FIGS. 22A and 22B and FIGS. 23A and 23B of the second embodiment. In the third embodiment, instead of these figures, FIGS. 26, 27A and 27B will be employed for description. Other figures for the second embodiment are common with the third embodiment, so that description about the figures is not repeated in this embodiment. * Line Communication Process (FIG. 26)

In this routine, the center is called in response to "any of transmission flags=1", and data corresponding to the particular transmission flag is transmitted.

That is, when any of transmission flags is set to "1" (YES in S601), on conditions that it is not in a re-dial standby (NO in S603), the network with the center is not connected (NO in S605), and it is not in a standby state after transmission con. and of an off-hook signal and a selection signal (NO in S607), transmission of an off-hook signal and a selection signal is commanded to modem 52 (S609).

As the result of the process in the S609, when the telephone machine 53 is "line is busy", and an off-hook signal and a selection signal can not be transmitted accordingly (YES in S611), in order to perform the above-mentioned S609 process again after a predetermined time period, a re-dial time (a time after the above predetermined time period) is set (S613). By this, until the above-mentioned redial time, the determination in the S603 is "YES", and the process of the S609 is not carried out, accordingly. At the redial time, with NO in S603→ NO in S605→NO in S607→S609, modem 52 is commanded again to transmit an off-hook signal and a selection signal.

As the result of transmission of the off-hook signal and the selection signal to the communication network from modem 52 in accordance with the process in the S609, when a determination is made that the modem 72 on the center side is "busy (including a case in which there is no response from CPU 91 even when connection with modem 72 is implemented)" (YES in S615), the redial time process (FIG. 16) is carried out (S617), and the process of the above S609 is carried out again at the time set in the process. The redialing time process (S617) will be described later.

On the other hand, as the result of the transmission of the off hook signal and the selection signal to the communication network from modem 52 in accordance with the process of the above S609, when the communication line is connected with the center side modem 72 (YES in S605), after standing by the ready of modem 52 (YES in S621), the data is transmitted to the center (S625). The transmitted data is data defined by a transmission flag which is set to "1" .

In this way, when all the data are transmitted (YES in S623), the above transmission flag is reset to "0" (S627).

The line communication process is performed as described above, data is transmitted to the center and data from the center are received as needed.

Figure 27A:
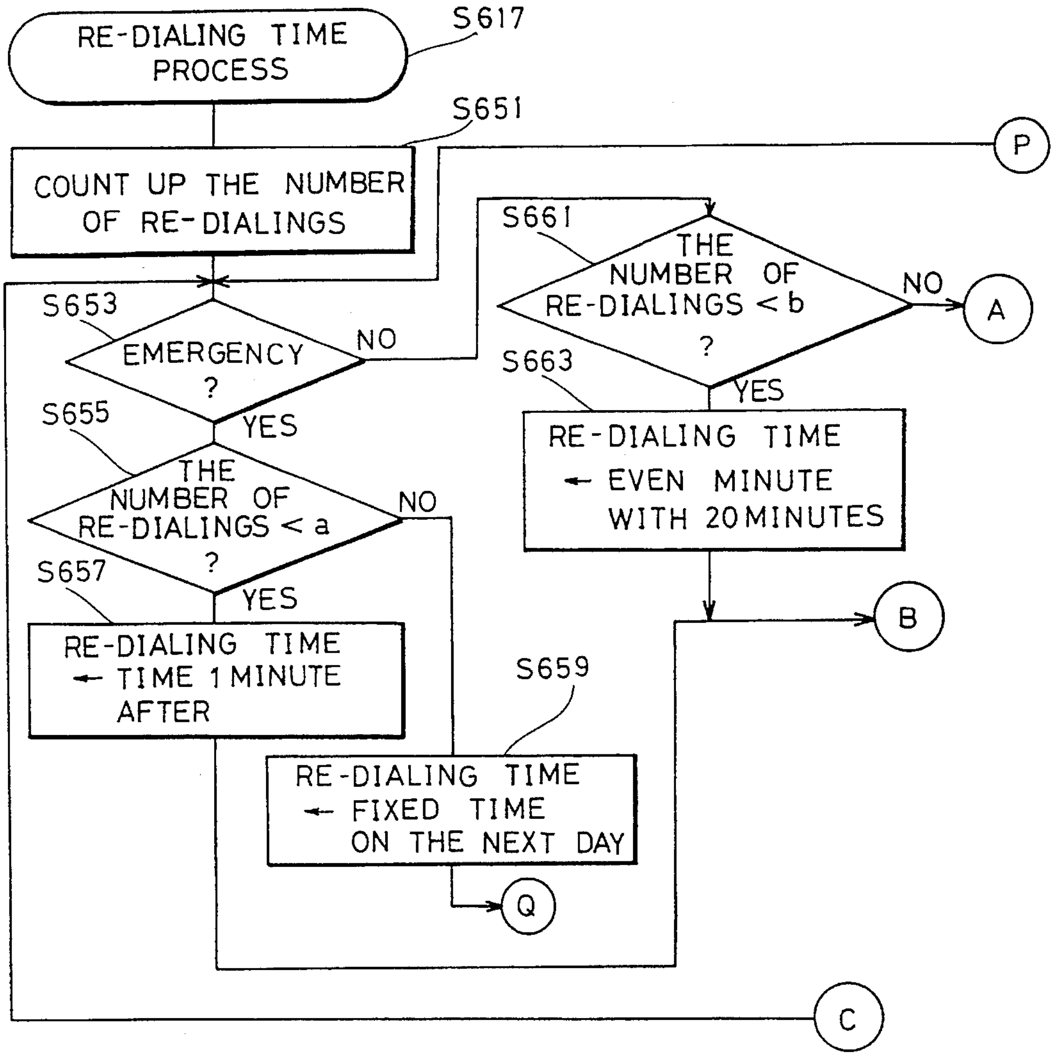
FIGS. 27A and 27B are flow charts showing specific contents of a redialing time process routine in according with the third embodiment of the present invention.
Figure 27B:
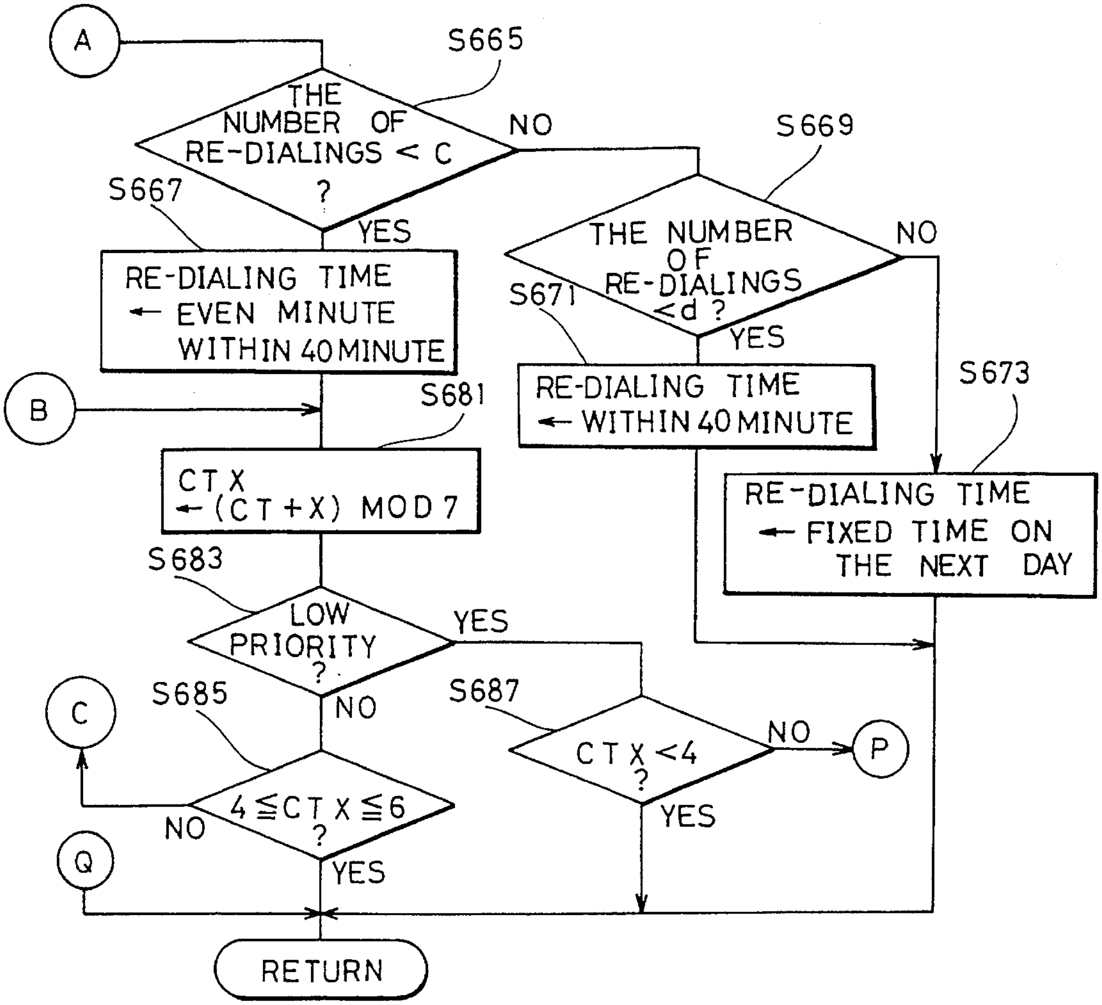

* Redial Time Process (FIGS. 27A and 27B)

This routine is a process for setting a redialing time when a DT can not be connected to the center due to some conditions in the center.

First, a counter for counting the number of times of redialing (a redial counter) is counted up (S651). The counter is cleared after connection with the center.

Next, a determination is made as to whether the present dialing is a dialing in an emergency mode (in the case of trouble transmission) or not, and if it is the emergency mode (YES in S653), on the condition that a redial counter value is a (=about 10–20 times) or less (YES in S655), the time one minute after the present time is set as the next redialing time (S657). That is, in the case of the emergency mode, the center is called for every minute until the number of times of redialing exceeds a times. When the set time is in the transmission forbidding time period (NO in S685 or NO in S687), however, the redialing time is set again. The processes in steps S681–S687 will be described later.

When the number of times of redialing in the emergency mode exceeds a (NO in S655), a predetermined time in the next day is set as a redialing time (S659). The redialing time is set in the next day in order to avoid occupying a telephone of a user when connection to the center can not be made in spite of dialing for a times (an abnormality on the network, operation stop of the center computer and so forth are possible).

On the other hand, when it is determined that it is not in the emergency mode in the S653 (NO in S653), that is, when it was dialing by a cause other than trouble transmission, on the condition that the redial counter value is b or less (YES in S661), an arbitrary even minute time within twenty minutes from the present time is set as the next dialing (re-dialing) time on the basis of a random number produced in a random number producing portion 19 of CPU 11 (S663). That is, redialing is made within twenty minutes. This is for dispersing redialing times of respective DTs on the basis of random numbers when center callings from a large number of DTs take place to enhance the possibility of connection to the center. Similarly to the case of the above-described emergency, however, when the set time is in the transmission forbidding time period (NO in S685, or NO in S687), the redialing time is set again.

When the number of times of redialing in the non-emergency mode exceeds b (NO in S661), on the condition that it is c or less (YES in S665), an arbitrary even minute time within forty minutes from the present time is set as the next dialing time employing a random number similarly to the above-described case (S667). That is, redialing is made within forty minutes. This is for further enhancing the possibility of connection to the center by dispersing redialing times of respect DTs in a range wider than the case of step S663 when center dialings take place from a large number of DTs. However, similarly to the above description, if the set time is in a transmission forbidding time period (NO in S685 or NO in S687), the redialing time is set again.

Furthermore, when the number of times of redialing in the non-emergency mode exceeds c and also is d or less (YES in S669), an arbitrary time within forty minutes from the present time is set as the next dialing time employing a random number similarly to the above description (S671). That is, releasing the condition of even number minute time to increase selectable times than the case of step S667, the possibility of connection to the center is enhanced. Then, even if the set time is in the transmission forbidding time period, in order to enable transmission, it returns omitting steps S681–S687.

When the number of times of redialing in the non-emergency mode exceeds d (NO in S669), a predetermined time in the next day is set as a redialing time (S673).

When connection to the center can not be made in spite of dialing of d times (an abnormality on the network, operational stop of a center computer and so forth are possible), it is avoided to occupy a telephone of a user.

Steps S681–S687 are processes for setting a redialing time again when the set redialing time is in the transmission forbidding time period (NO in S685 or NO in S687).

As shown in FIG. 7, CPU 11 increments a counter variable CT through "1" every time one minute passes (YES in S33), divides it by "7", and substitutes the remainder thereof into the counter variable CT (S35). That is, the value of the CT changes in rotation as 0→1→2→3→4→5→6→0 . . . for every one minute. The CT=0–3 is for the transmission permitting time period of transmission with low priority and CT=4–6 is for the transmission permitting time period of transmission with high priority (refer to FIG. 24).

To the variable CT, in the process in step S681, the present time X is added, which is divided by "7" to obtain the remainder thereof and substituting it into a counter variable CTX, and the CTX can be made equivalent to the above CT. That is, CTX=0–3 is made for the transmission permitting time period of transmission with low priority and CTX=4–6 is made for the transmission permitting time period of transmission with high priority.

In this way, determinations in the above steps S685 and S687 are made.

Next, the fourth embodiment of the present invention will be described.

Figure 28:
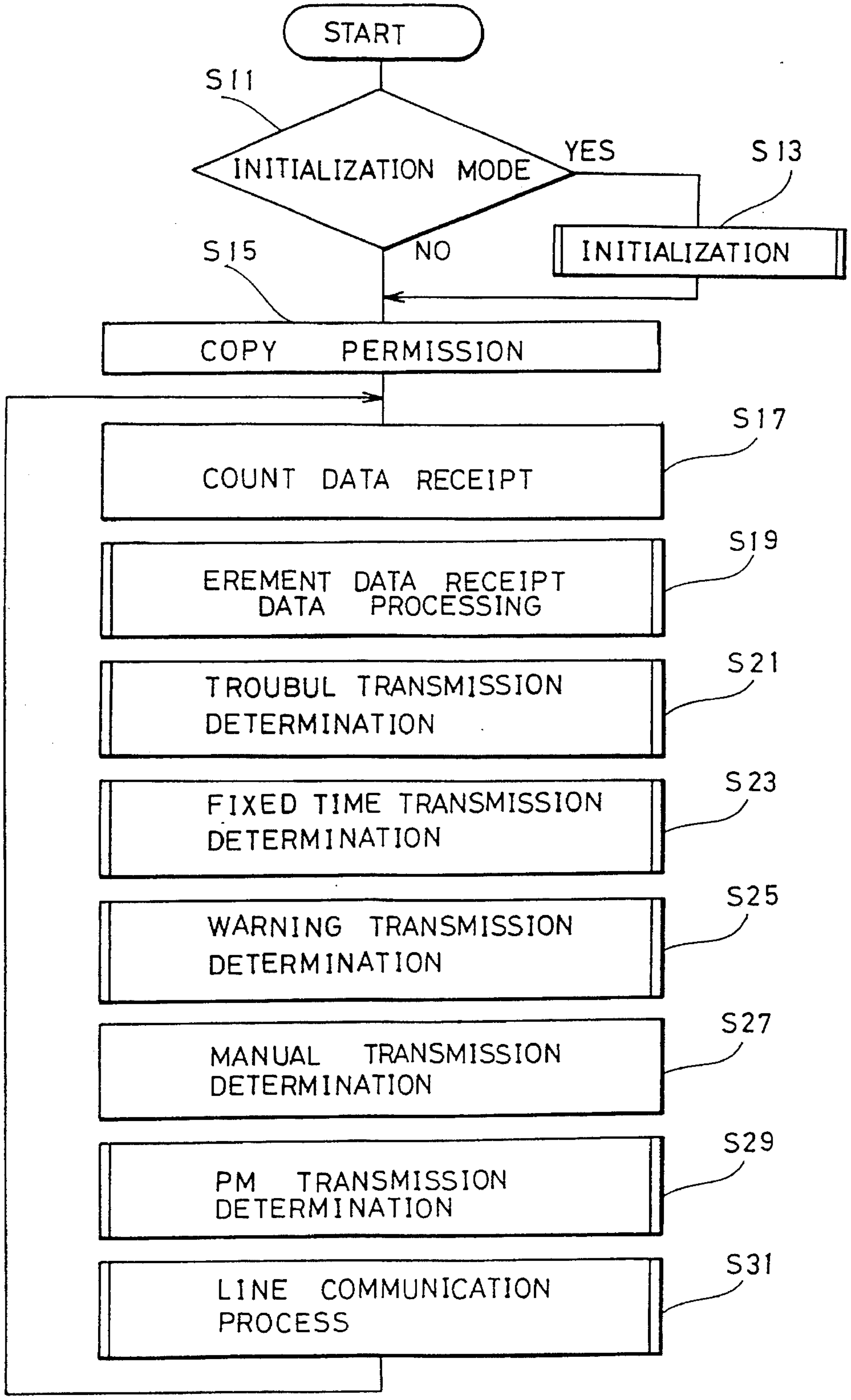
FIG. 28 is a flow chart showing a main routine of CPU 11 in accordance with the fourth embodiment of the present invention.

In this fourth embodiment, the number of times of redialing is transmitted and a fixed time transmission time is changed according to the number of times of redialing. The above-described first embodiment and the fourth embodiment are different in a part of the processing by the CPU 11 of a DT and a part of the processing of CPU 91 on the center. The fourth embodiment will be described referring to FIG. 28 replacing FIG. 7 of the first embodiment, FIGS. 29A and 29B replacing FIGS. 14A and 14B, and FIG. 30 replacing FIG. 19. In the process by the CPU 11 of the DT shown in FIG. 28, the present time setting subroutine (FIG. 16 of the first embodiment) is not included. Other figures of the first embodiment can be shared with the fourth embodiment, so that description about those figures is not repeated in this embodiment.

Figure 29A:
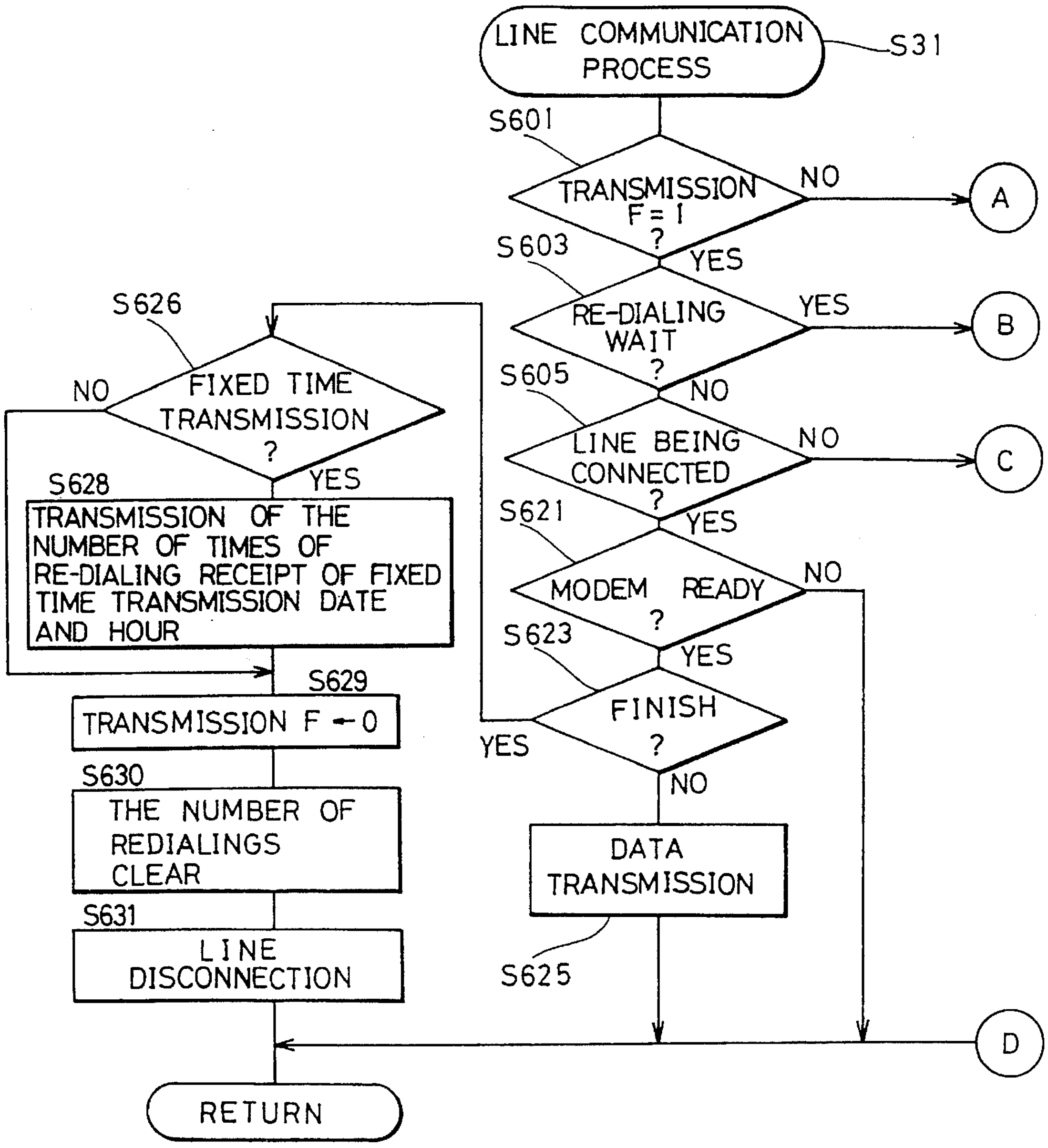
FIGS. 29A and 29B are flow charts showing specific contents of the line communication process routine of FIG. 28.
Figure 29B:
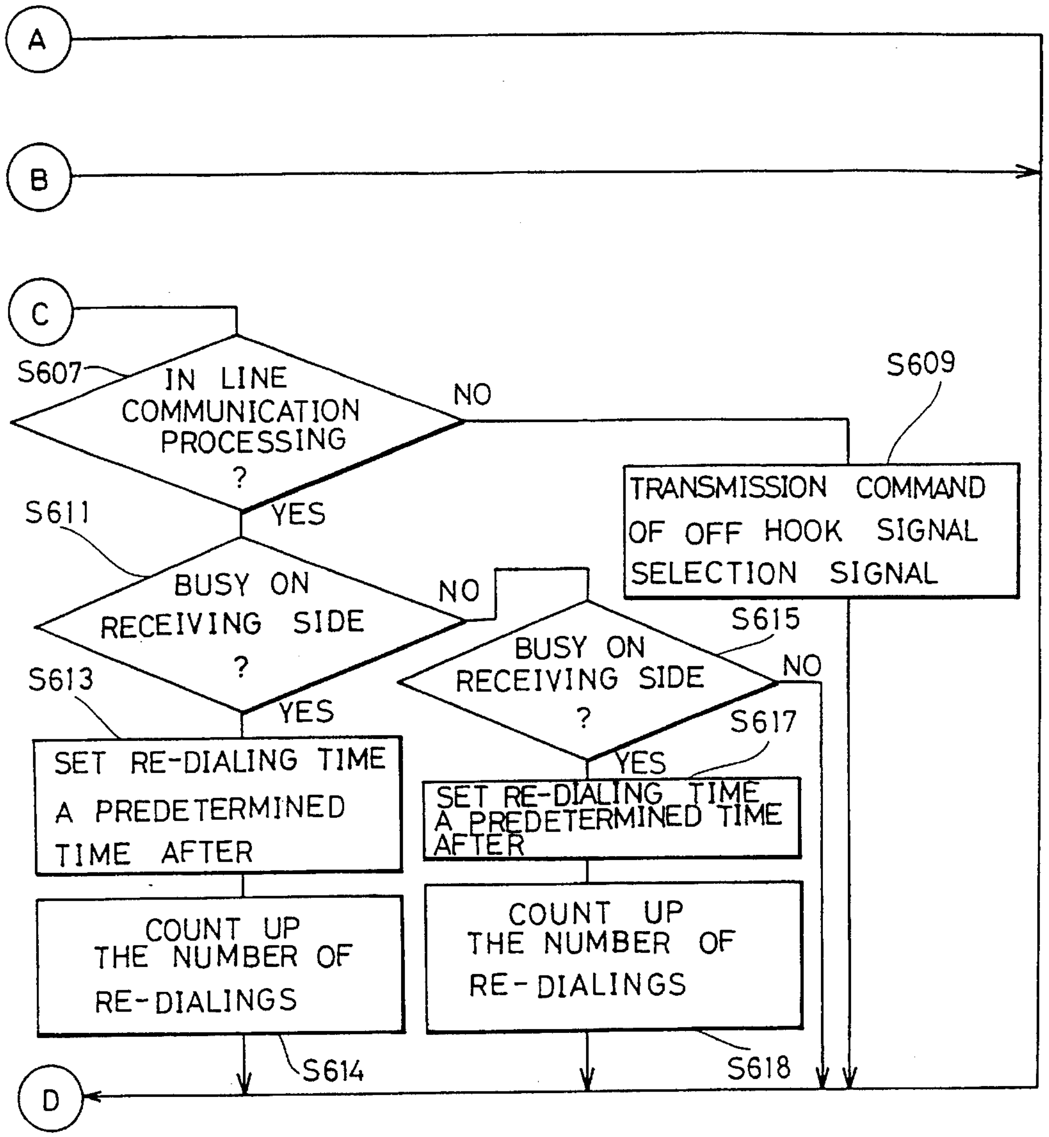
Figure 30:
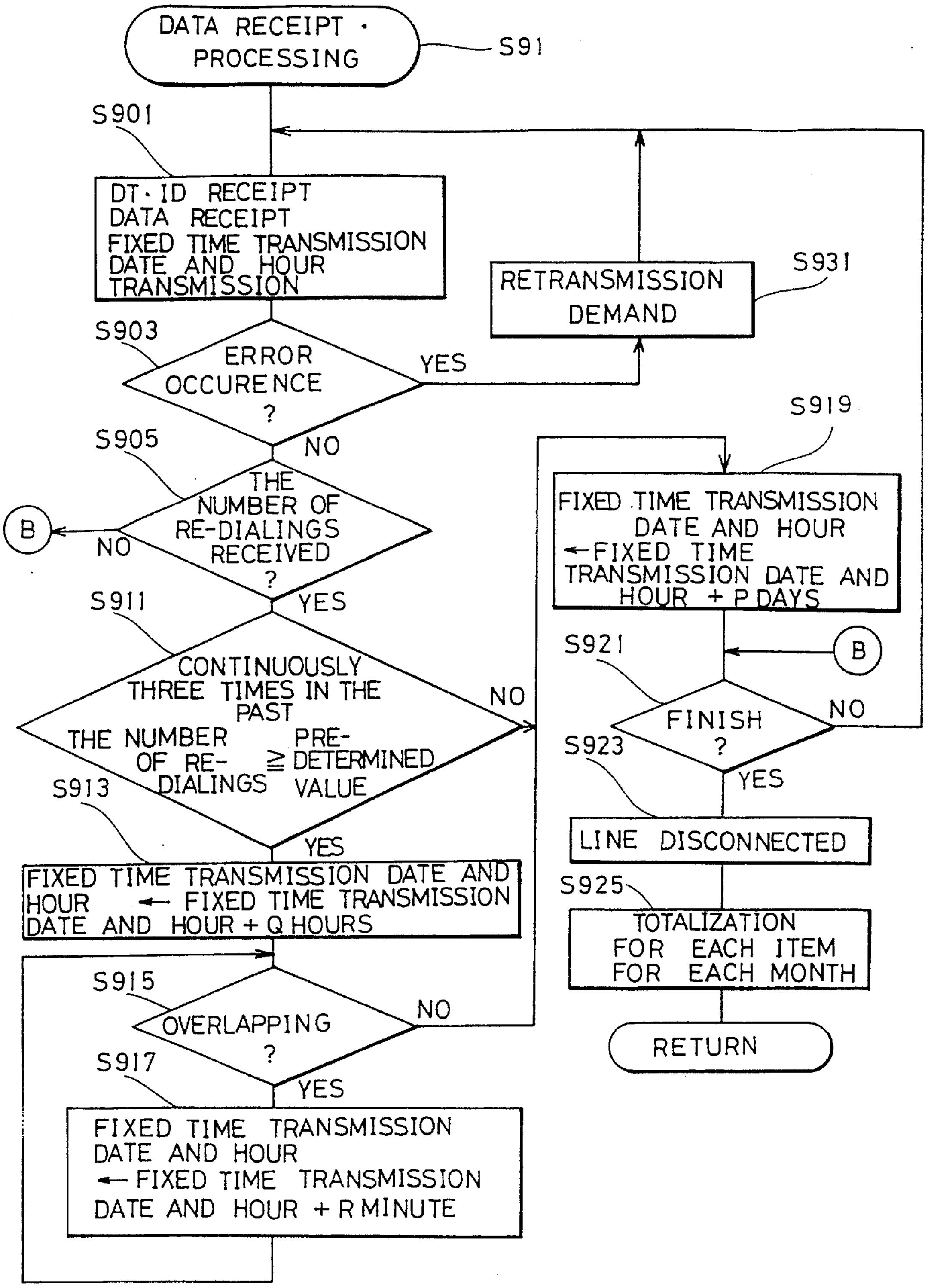
FIG. 30 is a flow chart showing specific contents of a data receiving and data processing routine performed as an interruption process for the control CPU of the centralized control unit in the fourth embodiment of the present invention.

* Line Communication Process (FIGS. 29A and 29B)

In this process, the center is called in response to "any of transmission flags=1", and data corresponding to the transmission flag is transmitted.

That is, when any of transmission flag is set to "1" (YES in S601), on the conditions that it is not in redialing standby (NO in S603), the communication line to the modem 75 on the center side is not connected (NO in S605), and an off-hook signal and a selection signal are not transmitted to the communication line (NO in S607), transmission of an off-hook signal and a selection signal is commanded for modem 52 (S609).

By the process in step S609, a determination in the next step S607 is "YES". In this case, when the telephone machine 53 at the user is "busy (the communication line is used)", and modem 52 cannot transmit an off-hook signal and a selection signal to the communication network accordingly (YES in S611), a time a predetermined time period after is set as a redialing time (S613), and a counter for counting the number of times of redialing is counted up (S614). By this, the determination in step S603 is "YES" until the above redialing time, and the calling process of the center side modem 72 (the process in S609) is not carried out. At the above-mentioned redialing time, with NO in S603 → NO in S605 → NO in S607 → S609, a command of transmission of an off-hook signal and a selection signal to the communication network is made.

Also, when modem 72 at the center is determined to the "busy (the communication network on the center side is occupied)" (YES in S615) as a result of transmission of an off-hook signal and a selection signal from modem 52 by the process of the step S609, a time a predetermined time after is also set as a redialing time (S617), and a counter for counting the number of times of redialing is counted up (S618). By this, the determination in the step S603 is "YES" until the redialing time, and the calling process (the process in S609) of the center side modem 72 is not carried out. At the time set in that process, the center side modem 72 is called again.

On the other hand, when the communication line is connected with the center side modem 72 (YES in S605) as the result of transmission of an off-hook signal and a selection signal to the communication network from modem 52 by the process in the step S609, the transmission enable condition by receipt of the data transmission permitting signal transmitted from the center side is stood by, and when it becomes transmittable (YES in S621), until the transmission is finished (NO in S623), the data is transmitted to the center side (S625).

Furthermore, when the data transmission is finished (YES in S623), a determination is made as to whether the present transmission is fixed time transmission (transmission by "fixed time transmission flag=1") or not (S626). As a result, when it is a fixed time transmission (YES in S626), a counted value (including 0) of a redialing counter is transmitted, and subsequently, the next time fixed time transmission date and hour data transmitted from CPU 91 on the center side is received (refer to S628, FIG. 30, S901).

Subsequently, the transmission flag is reset to "0" (S629), the redialing counter is cleared to "0" (S630), and the communication line on the data terminal side is disconnected (S631).

When the determination in step S626 is NO, that is, when the present transmission was not fixed time transmission, the flow jumps step S628 to directly proceed to the process after step S629.

As described above, the communication terminal apparatus on the center side is called and data communication is made. In the case of fixed time transmission, the date and time data of the next fixed time transmission is received.

(b) Interruption Process (FIGS. 18, 30A and 30B)

CPU 91 receives the data transmitted from the data terminal side through the communication line by an interruption process, and applies a predetermined process to the received data (S91).

That is, upon generation of an interruption caused by receipt from the communication line, CPU 91 first receives an DTID, confirming that the DTID is correct, and then sequentially receives the data transmitted from the data terminal side (S901, refer to S625 in FIG. 29A).

When a counted value of the redialing counter is received (YES in S905), since the present receipt is of fixed time transmission (YES in S626 of FIG. 29A S628), fixed time transmission date and hour data for the next time is set (S911–S919) as data to be transmitted to the data terminal. Here, the above-mentioned fixed time transmission date and hour data for the next time is subjected to the following processes.

That is, first, a determination is made as to whether the received counted value of the redialing counter is a predetermined value or more or not, furthermore when it is a predetermined value or more, a determination is made as to whether or not a value of the above predetermined value or more have been attained continuously for three times (S911).

As a result, when the redialing counter value is less than the predetermined value, or when it did not attain the above predetermined value or more continuously for three times even when it is the predetermined value or more (NO in S911), date and hour P days after is set as fixed time transmission date and hour data for the next time (S919). That is, in this case, the fixed time transmission for the next time is implemented at the same time P days after (at the same time as that of the regular transmission at this time (transmission in the case of no redialing)).

On the other hand, when the redialing counter value is the predetermined value or more, and also it attained continuously for three times the above predetermined value or more (YES in S911), date and hour after P days and after Q hours is set (S913, S919) as fixed time transmission date and hour data for the next time. That is, in this case, the next fixed time transmission is implemented at the time Q hours after the regular transmission at this time P days after.

When overlapping with fixed time transmission time of another copying machine control apparatus is caused by the process in step S913 (YES in S915), date and hour P days after, Q hours after, and R minutes after is set as fixed time transmission date and hour data for the next time (S913, S917 and S919). That is, in this case, the next fixed time transmission is implemented Q hours+R minutes after the regular transmission at this time, after P days, so that overlapping with the above another copying machine controlling apparatus is avoided.

The fixed time transmission date and hour data for the next time set as described above is transmitted to the data terminal side (refer to S901, FIG. 29A, S928).

When an error occurs during communication with the data terminal side (YES in S903), data retransmission is demanded to the data terminal side (S931).

When the data communication with the data terminal side is finished (YES in S921), the communication line is disconnected (S923), and totalization is made for each item and for each month to produce data to be displayed in the screen by operator's selection (S925).

As described above, processes in CPU 41 of a copying machine, CPU 11 of each data terminal and CPU 91 at the center are performed, and each user and the center as a controlling side are connected to each other through the communication line.

In the case of communication by the fixed time transmission, the fixed time transmission date and hour data for the next time set as described above is transmitted to the data terminal side.

Next, the fifth embodiment of the present invention will be described.

In the fifth embodiment, not-received frequency is calculated on the center side and the fixed time transmission time is changed according to the not-received frequency. The above-described first embodiment and the fifth embodiment are different in a part of the process of CPU 11 of a DT and a part of the process by CPU 91 at the center. The fifth embodiment will be specifically described referring to FIG. 28 replacing FIG. 7 of the first embodiment (similarly to the fourth embodiment), FIG. 26 replacing FIGS. 14A and 14B (similarly to the third embodiment), FIG. 31 replacing FIGS. 15A and 15B, FIG. 32 replacing FIG. 18, FIGS. 33A and 33B replacing FIG. 19, and FIGS. 34 and 35 in addition. In the process by CPU 11 of a DT shown in FIG. 28 does not include the present time setting subroutine (FIG. 16). Other figures of the first embodiment can be shared by the fifth embodiment, so that description for the figures is not repeated in this embodiment.

The redialing time process in this embodiment (S617, FIG. 31) will be described.

The redialing time process is a process for setting retransmission (re-dialing) when connection with CPU 91 on the center side could not be made (YES in S615).

First, a counter for counting the number of times of redialing (a redial counter) is counted up (S651). The counter is cleared after communication connection with the center side.

Next, a determination is made as to whether the present dialing is a dialing in an emergency mode (in the case of trouble transmission, for example) or not, and if it is the emergency mode (YES in S653), on the condition that a redial counter value is a (=about 10–20 times) or less (YES in S655), the time one minute after the present time is set as the next dialing (re-dialing) time (S657). That is, in the case of the emergency mode, the center is called for every minute until the number of times of redialing reach "a" times.

When the number of times of redialing in the emergency mode reaches a (NO in S655), a predetermined time in the next day is set as a redialing time (S659). The redialing time is set in the next day in order to avoid interfering use of telephone 53 and the like by occupying the communication line on the user side when connection to the center can not be made in spite of dialing for a times (abnormally busy network condition, operation stop of the center side CPU 91 and so forth are possible).

On the other hand, when it is not in the emergency mode in step S653 (NO in S653), on the condition that the redial counter value is less than b times (YES in S661), an arbitrary even minute time within twenty minutes from the present time is set as the next dialing (re-dialing) time on the basis of a random number produced in random number producing portion 19 of CPU 11 (S663). By this, even when center callings take place from a large number of data terminals, redialing times for respective data terminals are dispersed and the possibility of connection to the center is enhanced.

Figure 32:
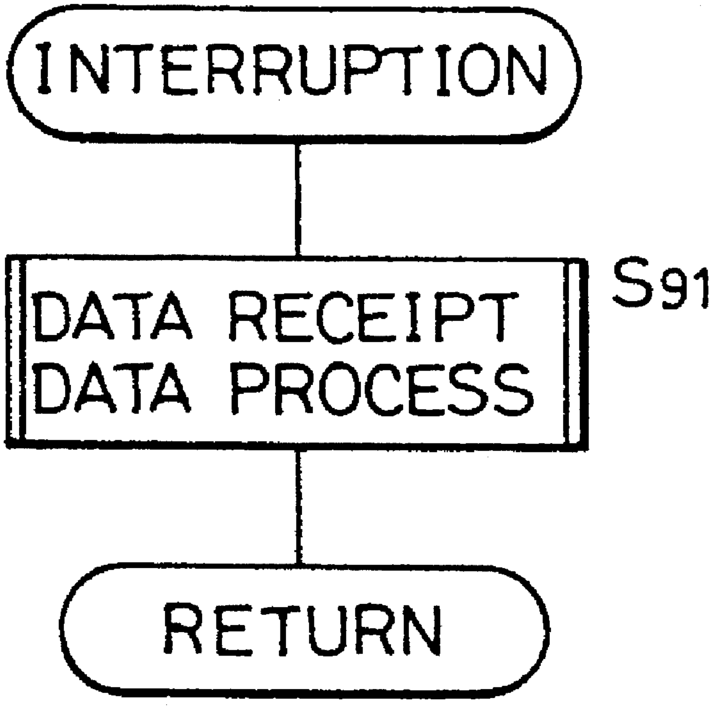
FIG. 32 is a flow chart showing specific contents of receipt interruption routine in accordance with the fifth embodiment of the present invention.
Figure 33A:
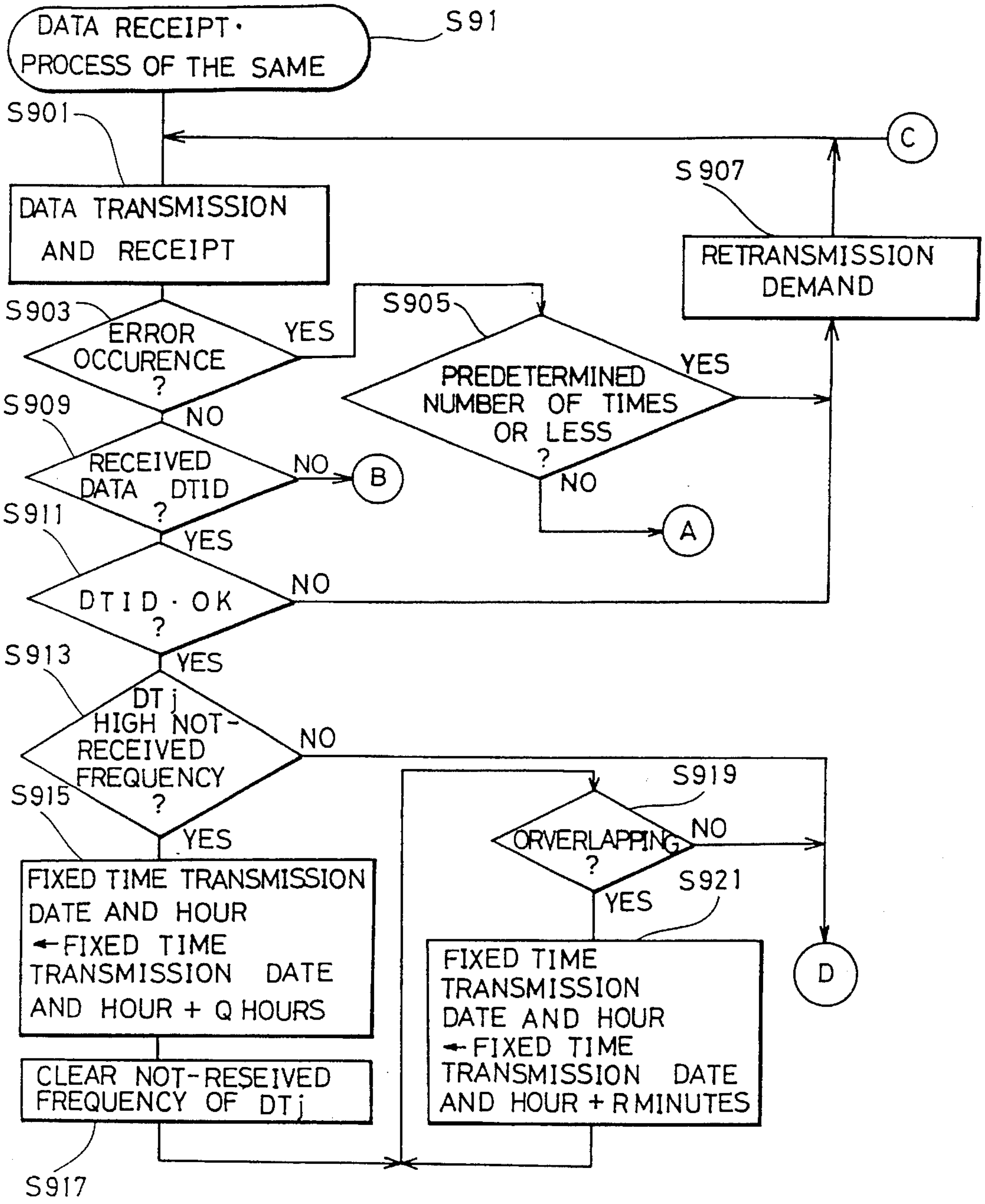
FIGS. 33A and 33B are flow charts showing specific contents of the data receiving and data processing routine of FIG. 32.
Figure 33B:
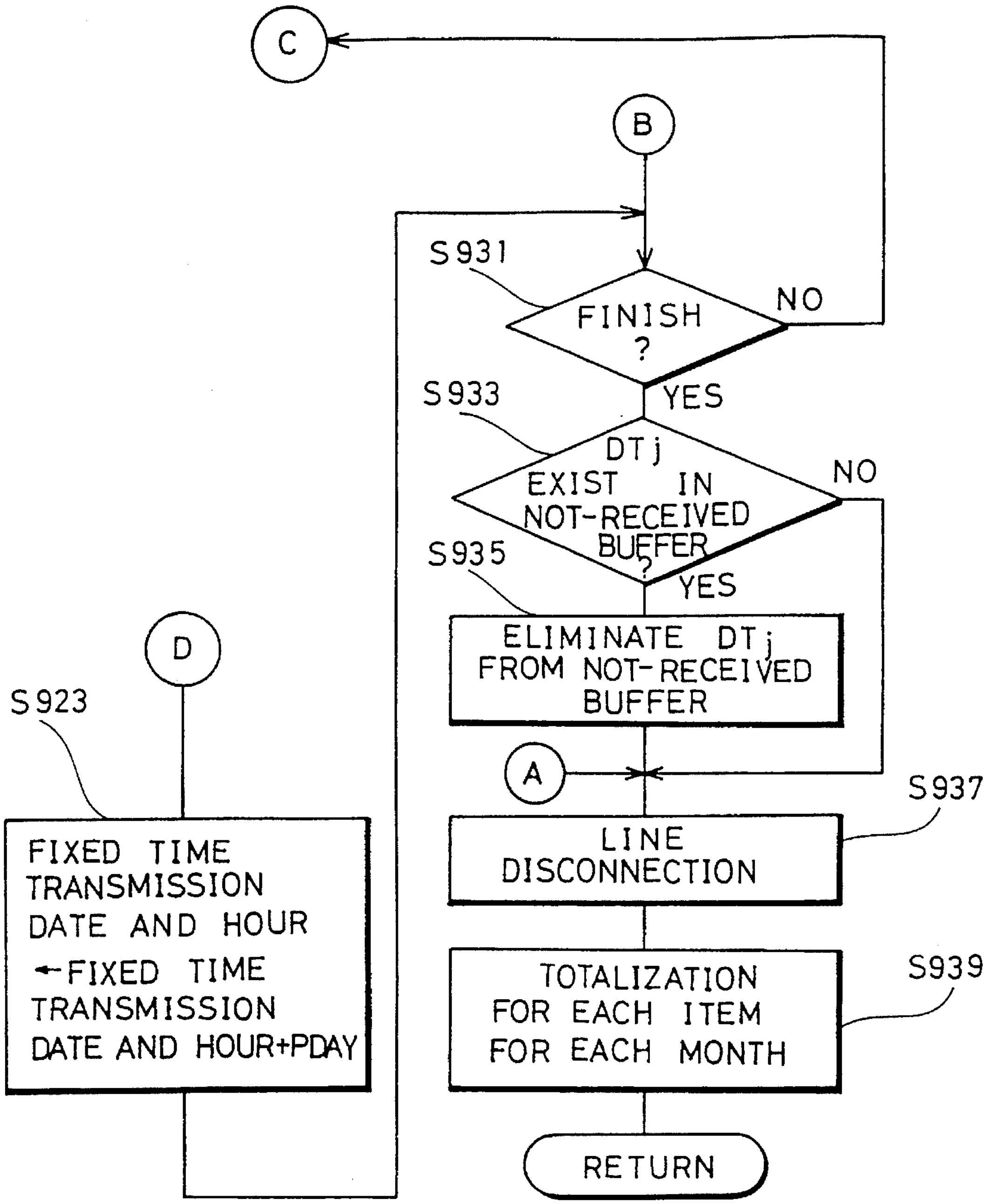

When the number of times of redialing in the non-emergency mode attains b or more (NO in S661), a predetermined time in the next day is set as the next redialing time (S665). This is for avoiding occupying the communication line on the user side to interfere use of telephone machine 53 or the like when connection cannot be made to the center in spite of center callings for b times (abnormally busy communication line, operational stop of CPU 91 on the center side and so forth are possible). (b) Receipt Interruption Process (FIGS. 32, 33A and 33B)

The receipt interruption process of CPU 91 will be described.

CPU 91 receives data transmitted from the data terminal side through the communication line by this receipt interruption process, and applies predetermined process to the received data (S91).

That is, when an interruption due to receipt from the communication line is produced, processes of the DTID and transmitted data receipt and writing, and transmission of fixed time transmission date and hour are performed (S901).

When a communication error occurs (YES in S903), on the condition that the number of times of error occurrence is a predetermined number of times or less (YES in S905), CPU 91 demands retransmission of the DTID and the transmitted data to the data terminal side, or demands to retransmit the fixed time transmission date and hour (S907).

When the DTID is received as data (YES in S909), if the data terminal of transmission source is specified as $DT_j$ (the j'th data terminal controlled by CPU 91) with the DTID, the next fixed time transmission date and hour of the data terminal $DT_j$ is calculated as shown in steps S913– S923, which is set as data for transmission.

First, a determination is made as to whether non-received frequency of the data terminal $DT_j$ of transmission source exceeds a predetermined threshold value or not (S913). The non-received frequency is a frequency that arrival by the fixed time transmission is not detected even at the fixed time transmission date and hour, which is, as described later, calculated at each data terminal and the newest value is stored for each (refer to FIG. 35).

When the non-received frequency of the data terminal $DT_j$ does not exceed the predetermined threshold value as a result of the determination in step S913 (NO in N913), a date and hour P days after is set as the next fixed time transmission date and hour data of the data terminal $DT_j$ (S923). That is, in this case, the next fixed time transmission of the data terminal $DT_j$ is carried out at the same time P days after (at the same time as the present fixed time transmission).

On the other hand, when a determination is made in step S913 that the non-received frequency of the data terminal $DT_j$ exceeds the predetermined threshold value (YES in S913), a date and hour after P days and after Q hours is set as the next fixed time transmission date and hour data (S915, S923), and the non-received frequency of the data terminal $DT_j$ is cleared (S917). That is, in this case, the next fixed time transmission of the data terminal $DT_j$ is carried out P days+Q hours after.

When overlapping with a fixed time transmission time of a copying machine controlling apparatus other than $DT_j$ occurs by the process in step S915 (YES in S919), a date and time P days after, Q hours after and R minutes after is set as the next fixed time transmission date and hour data of the data terminal $DT_j$ (S915, S921, S923). That is, in this case, the next fixed time transmission of the data terminal $DT_j$ is performed after P days+Q hours+R minutes, so that overlapping with fixed time transmission of another copying machine controlling apparatus can be avoided.

The fixed time transmission date and hour data for the next time set as described above is transmitted to the data terminal $DT_j$ by the process in step S901 after a series of data receipt from the data terminal $DT_j$.

When, in step S911, the received DTID does not correspond to any data terminal controlled by CPU 91, since it seems a transmission and receipt error of data, CPU 91 demands retransmission of data (S907).

On the other hand, when the data received is data other than DTID (NO in S909), that is, after receiving DTID once, because DTID is usually transmitted before transmission of various data of copying machine 4 to which the data terminal $DT_j$ is attached, the processes of steps S911–S923 are not necessary, so that the flow proceeds to step S931.

In this way, when the data communication with the data terminal $DT_j$ is finished (YES in S931), when $DT_j$ is stored in a not-received buffer (YES in S933), after eliminating the data (S935), the communication line is disconnected (S937), and totalization is made for each item and for each month to produce data to be displayed in a screen by operator's selection (S939).

Figure 34:
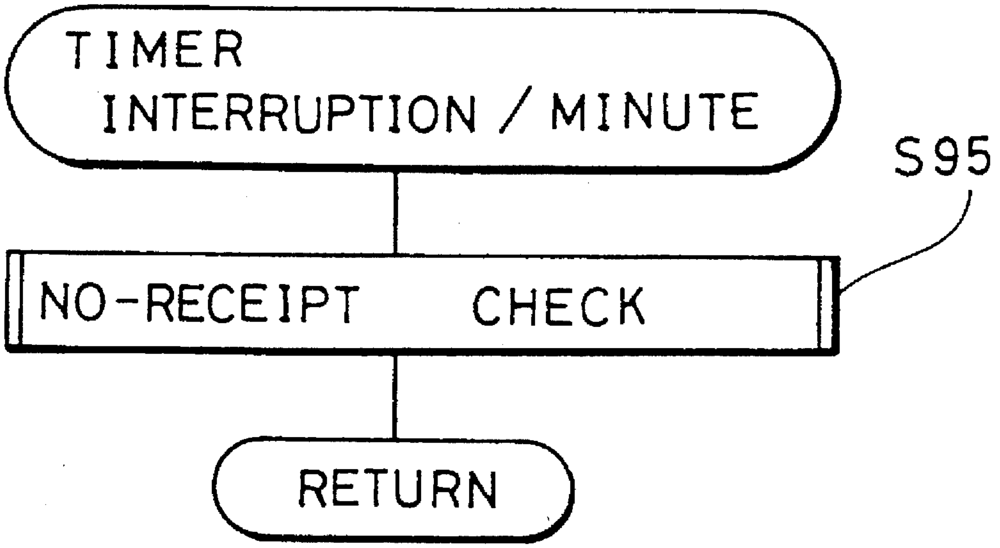
FIG. 34 is a flow chart showing a timer interruption routine in the CPU 91 in accordance with the fifth embodiment of the present invention.
Figure 35:
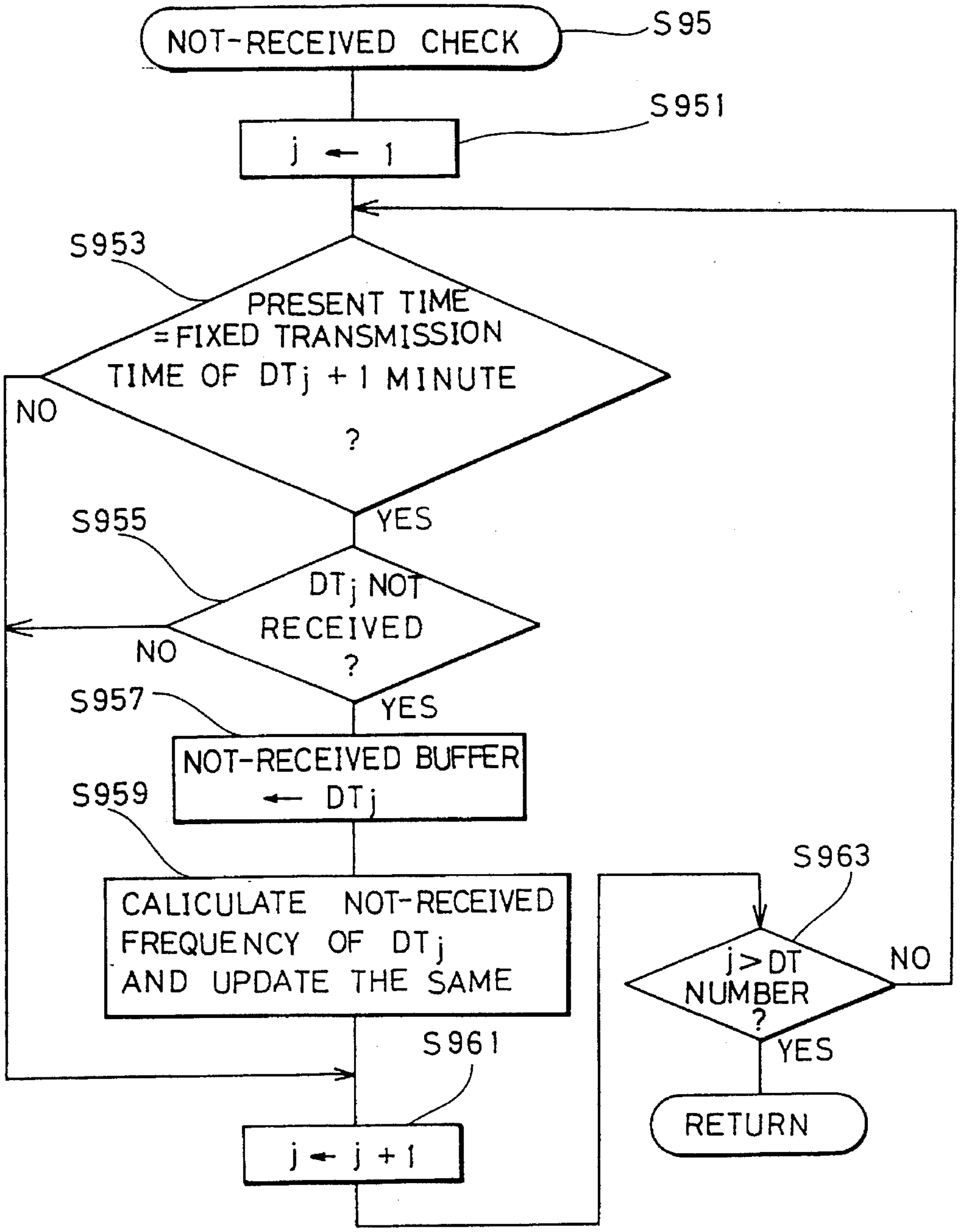
FIG. 35 is a flow chart showing specific contents of the not-received check routine of FIG. 34.

(c) Timer Interruption Process (FIGS. 34, 35A and 35B)

Next, the timer interruption process will be described.

CPU 91 performs a not-received check process by a timer interruption for every minute (S95), to detect a data terminal which does not make fixed time transmission even after the fixed time transmission time, and calculates the not-received frequency.

That is, when a timer interruption is produced, CPU 91 substitutes an initial value 1 into a variable j (j=1– the number of data terminals objective to the control) specifying a data terminal (S951), and then performs the processes of steps S953–S959 about the data terminal $DT_j$ .

First, when the fixed time transmission of the data terminal $DT_j$ is not yet received (YES in S955) at the time one minute after the fixed time transmission time of the data terminal $DT_j$ (YES in S953), the data terminal $DT_j$ is stored in a not-received buffer (S957), and the not-received frequency of the data terminal $DT_j$ is calculated to be stored in a not-received frequency area of the $DT_j$ of a memory (S959).

As described above, when the above-described processes about the data terminal $DT_j$ are finished, the value of the above variable j is incremented (S961), and the same processes are performed for the next data terminal (S953–S959).

As a calculation method of the above not-received frequency, various methods can be introduced. For example, it is how many times it was not received at the fixed time continuously in the past, or how many times it was not received at the fixed time in the past N times of fixed time transmission date and hour times, and so forth.

When the above-stated processes are finished about all the data terminals controlled by CPU 91 (YES in S963), this timer interruption is finished.

As described above, processes in CPU 41 of a copying machine, CPU 11 of each data terminal, and CPU 91 at the center are carried out.

In communication by the fixed time transmission, fixed time transmission date and hour data is set as described above to be transmitted to the data terminal side.

Finally, the sixth embodiment of the present invention will be described.

In the sixth embodiment, warning transmission is made at a fixed time or when the number of sheets of copies after it comes in the warning condition exceeds a predetermined value. The above-described first embodiment and the sixth embodiment are different in a part of process by CPU 11 of a DT. The sixth embodiment are specifically described referring to FIG. 28 replacing FIG. 7 of the first embodiment (similarly to the fourth embodiment), FIGS. 36A and 36B replacing FIGS. 12A and 13B, FIG. 37 replacing FIG. 11, FIG. 38 replacing FIGS. 14A and 14B, and FIG. 31 replacing FIGS. 15A and 15B (similarly to the fifth embodiment). In the process of CPU 11 of the DT shown in FIG. 28, the present time setting subroutine (FIG. 16) is not included. The other figures of the first embodiment are common to the sixth embodiment, so that description about those figures is not repeated in this embodiment.

Figure 36A:
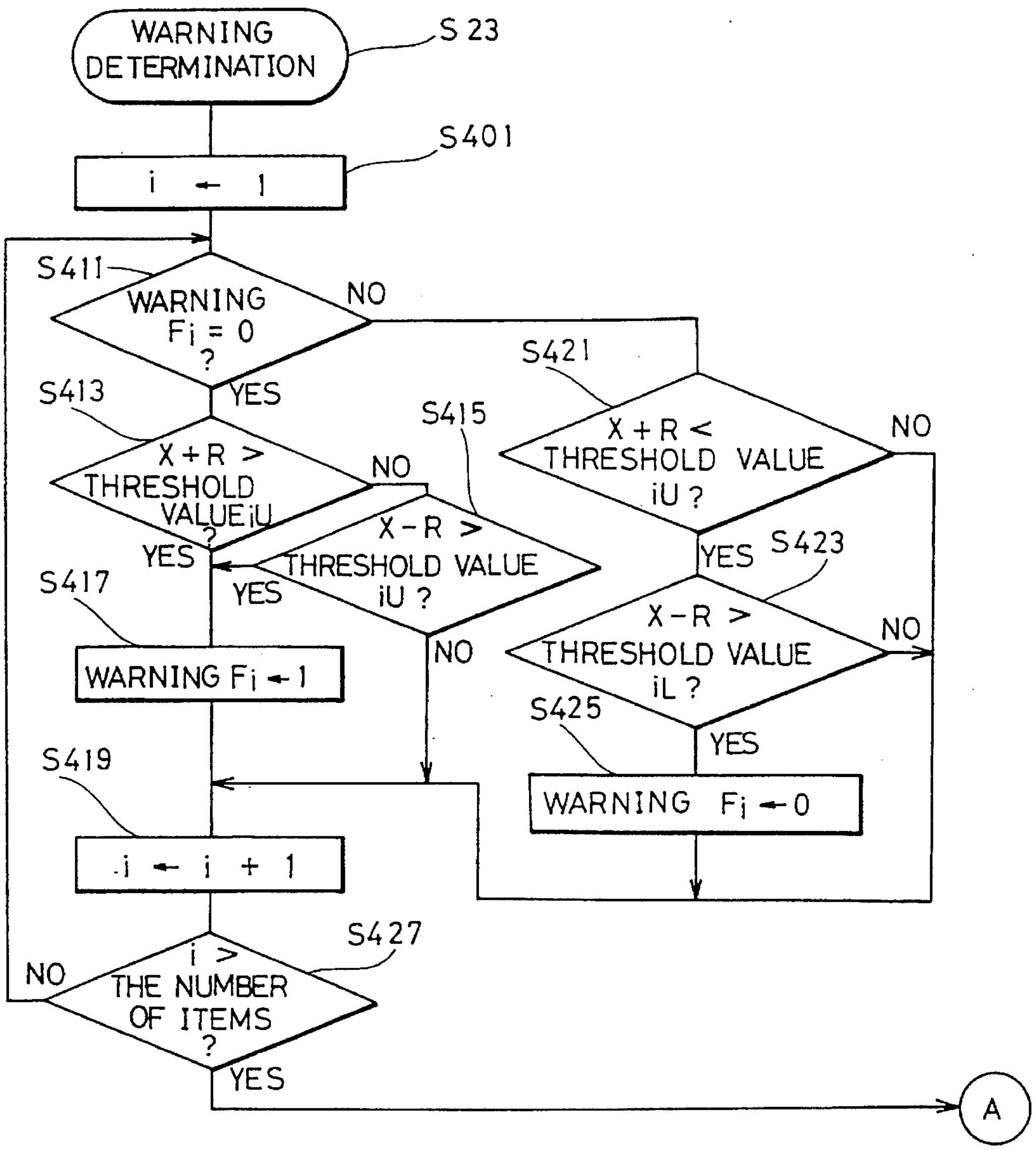
FIGS. 36A and 36B are flow charts showing specific contents of a warning determination routine in accordance with the sixth embodiment of the present invention.
Figure 36B:
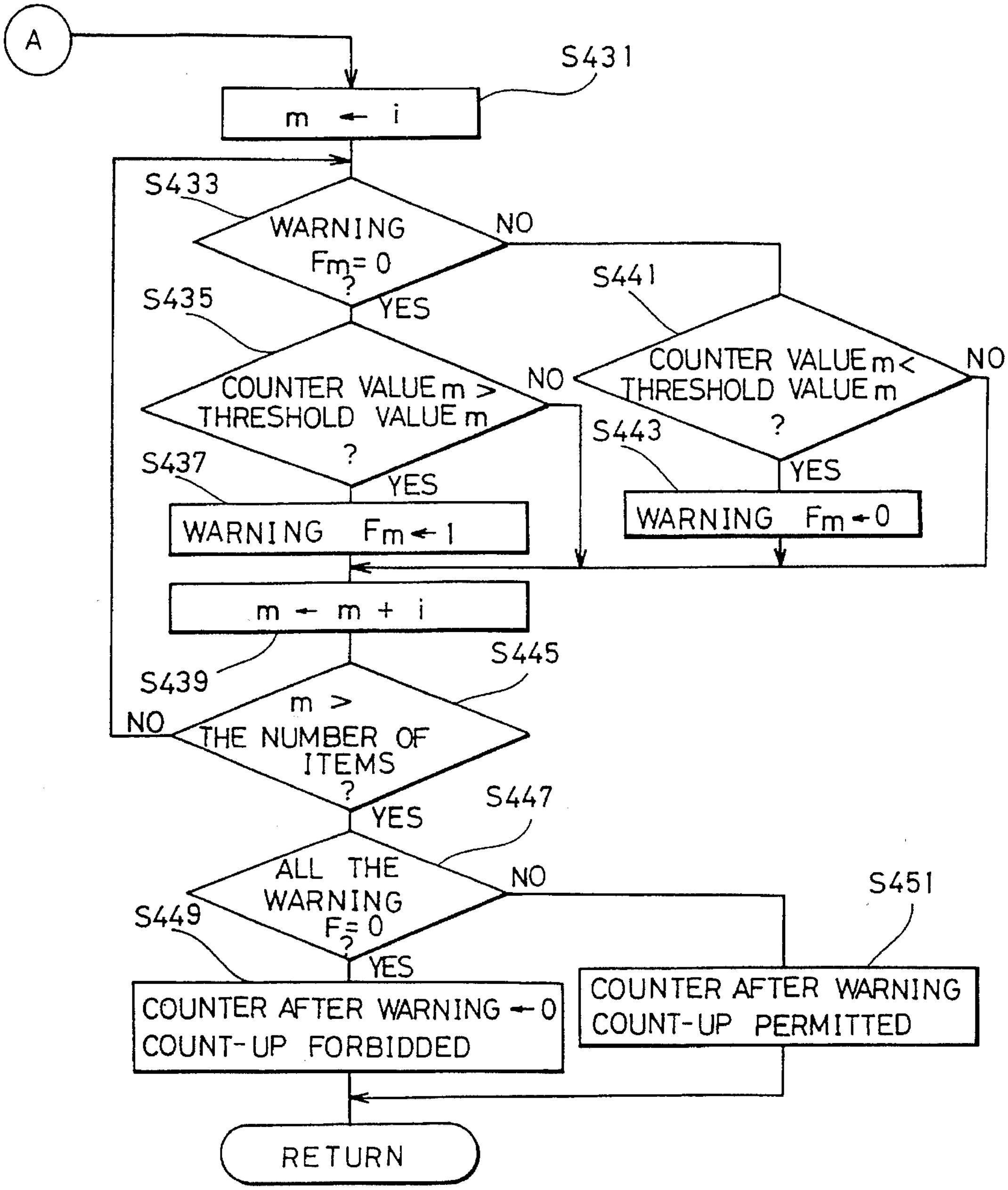

* Warning Determination (FIGS. 36A and 36B)

The present process is a subroutine for controlling a warning flag.

Steps S401–S427 are processes for setting a warning flag to "1" when a value of the element data gets out of a permittable range peculiar to the element data, and resetting a warning flag to "0" when it recovers into the permittable range.

First, an initial value "1" is set in an item number indicating a type of the element data (S401).

Next, in step S411, a warning flag about the objective element data (the first element data for the first time) is determined.

As a result, when the warning flag about the particular element data is "0" (YES in S411), a determination is made as to whether the element data value is in the permittable range peculiar to the element data or not, in other words, whether or not it is in a range of not more than an upper limit threshold value $_{iU}$ and not less than a lower threshold value $_{iL}$, and when it is out of the above permittable range (YES in S413 or YES in S415), a warning flag $F_i$ about the element data is set to "1" (S417).

On the other hand, when a warning flag of the objective element data is "1" in step S411 (NO in S411), a determination is made as to whether the value of the element data recovered into the permittable range or not, and when it recovered (YES in S421 and YES in S423), the warning flag $F_i$ about the element data is reset to "0" (S425).

After performing such processes until i reaches the number of items of the element data, in other words after performing about all the element data, the flow proceeds to the processes after step S431.

The steps S431–S445 are processes for setting a warning flag to "1" when counted values (frequency) of the JAM counter and the PM counter exceed a threshold value peculiar to the particular counter, and for resetting the warning flag to "0" when it recovers to the threshold value or less.

First, an initial value "i (a value of the last number of the element data+1)" is set in an item number m indicating a type of a JAM counter and a PM counter (S431).

Next, in step S433, a warning flag about the objective JAM counter or PM counter is determined.

As a result, when the warning flag about the particular JAM counter or PM counter is "0" (YES in S433), a determination is made as to whether the value of the counter is in a permittable range peculiar to the counter, that is, as to whether it exceeds a threshold value $_m$ or not, and when it exceeds the same (YES in S435), the warning flag $F_m$ about the counter is set to "1" (S437).

On the other hand, in the S433, when the warning flag about the objective JAM counter or PM counter is "1" (NO in S433), a determination is made as to whether or not the value of the counter recovered to the above threshold value or less, and when it recovers (YES in S411), the warning flag $F_m$ about the counter is reset to "0" (S443).

After performing such processes until m attains the total number of items of counters and element data, in other words, after it is performed about all the counters, the flow proceeds to step S447.

After step S447, a counter after warning is controlled. That is, first, warning flags are examined about all the items (S447).

As a result, when all the waning flags are "0" (YES in S447), the counter after warning is reset to "0", and counting up of the after warning counter is forbidden (S449) and the flow returns to the main routine.

On the other hand, any of one or more of the warning flags are "1" (NO in S447), counting-up of the counter after warning is permitted (S451), and the flow returns to the main routine. By this, the counter after warning is counted up every time a copying operation is finished, and also when a value of the counter after warning exceeds a predetermined set value, transmission of warning data is performed to the center (refer to S602 of FIG. 38).

As described above, a warning flag is controlled.

Figure 37:
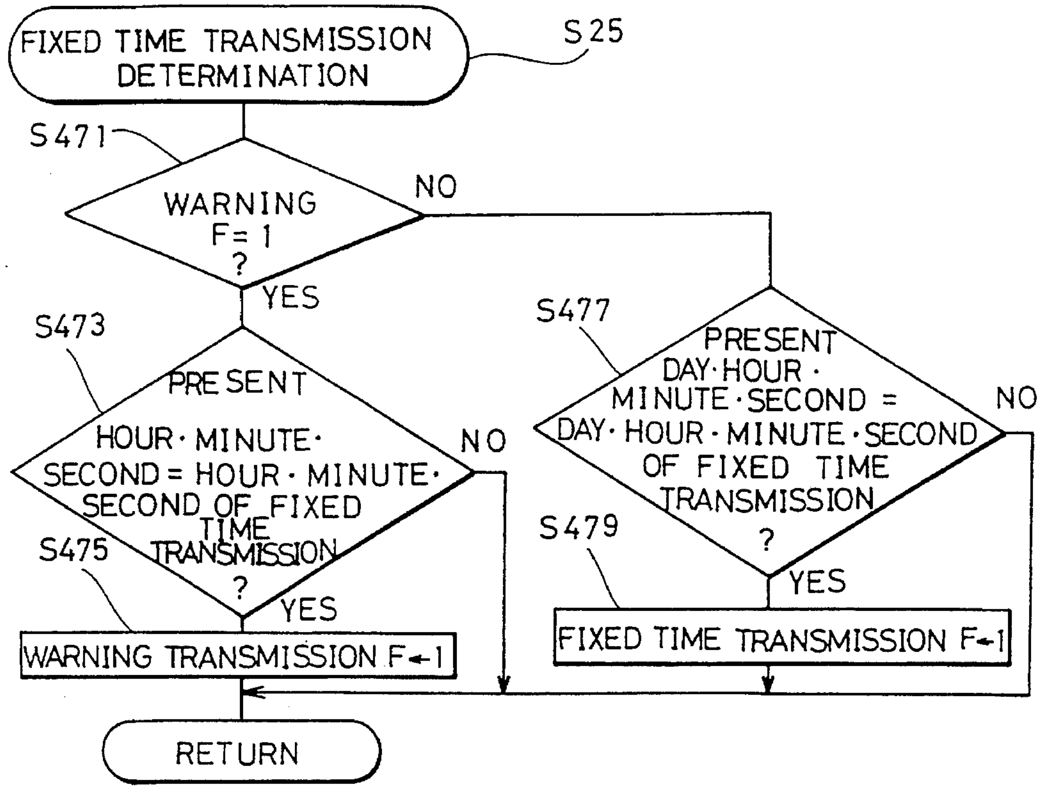
FIG. 37 is a flow chart showing specific contents of a fixed time transmission determination routine in accordance with the sixth embodiment of the present invention.

* Fixed Time Transmission Determination (FIG. 37)

A warning flag is checked when the present time (hour, minute, second) attains a fixed time transmission time (hour, minute, second) (S471).

As a result, when a warning flag about any one or more item is set to "1" (YES in S471, and YES in S473), the warning transmission flag is set to "1" (S475). By this, the line connection process (FIG. 38) described later is implemented and various kinds of data including warning data (data about items in which the warning flags are set to "1") are transmitted to the center.

On the other hand, in the fixed time transmission time (hour, minute, second), when all the warning flags are "0" (NO in S471), the present date is checked. As a result, when it is the fixed time transmission day (YES in S477), the fixed time transmission flag is set to "1" (S479). By this, the line connection process (FIG. 36) described later is implemented, and various data for fixed time transmission are transmitted to the center.

Figure 31:
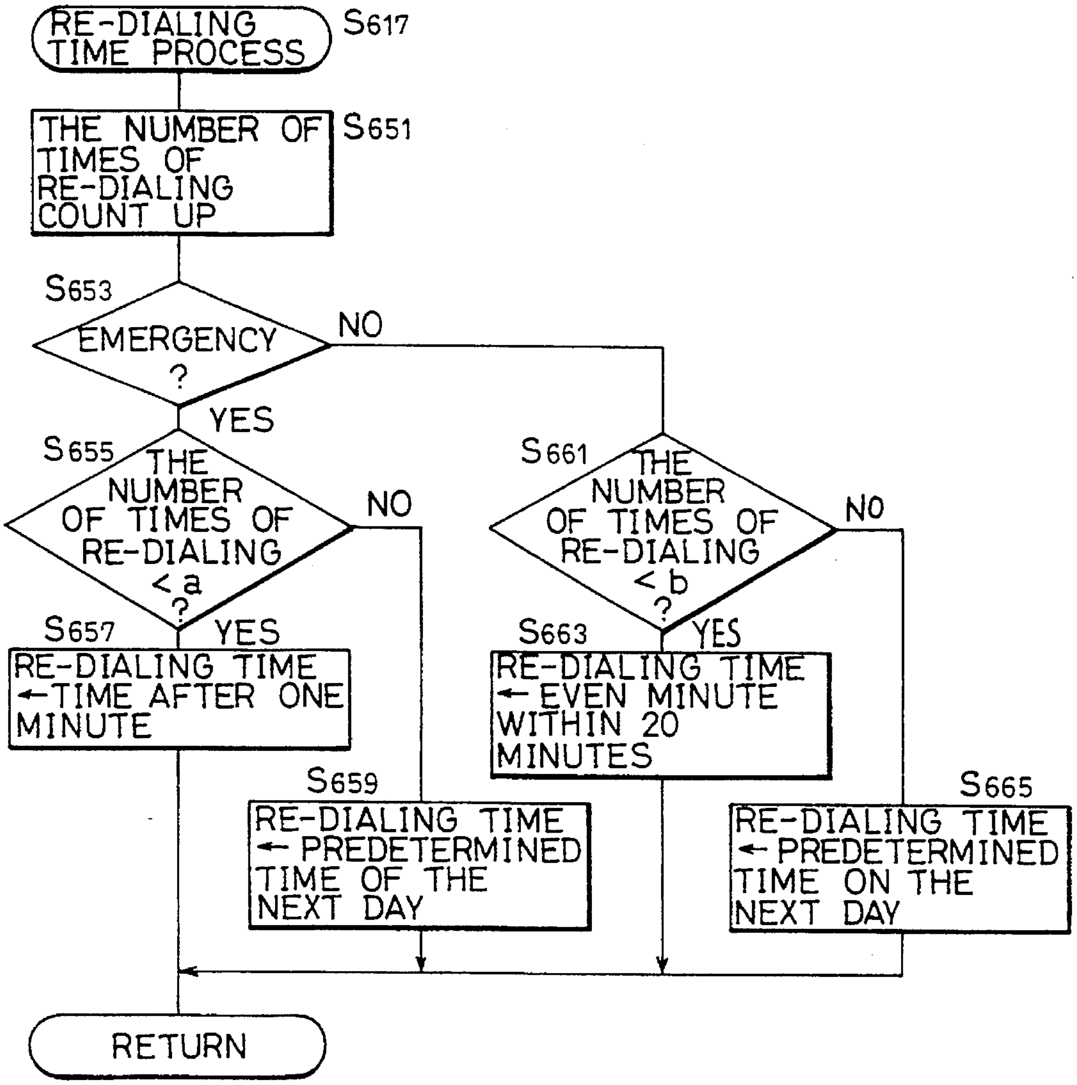
FIG. 31 is a flow chart showing specific contents of a redialing time process routine in accordance with the fifth embodiment of the present invention.
Figure 38:
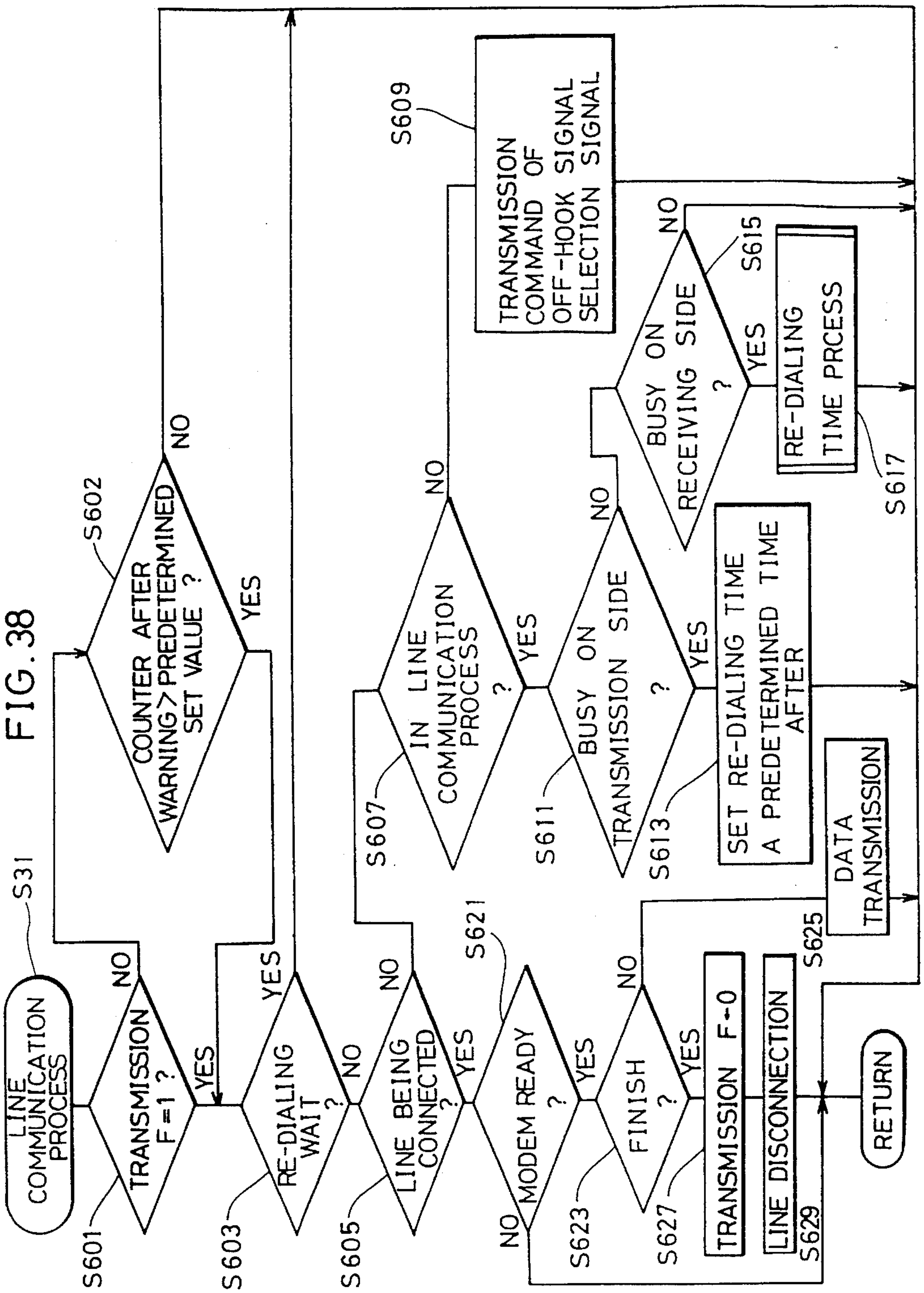
FIG. 38 is a flow chart showing specific contents of a line communication process routine in accordance with the sixth embodiment of the present invention.

* Line Communication Process (FIGS. 38 and 31)

In this process, in response to "any transmission flag=1", or in response to overflow of a counted value of the counter after warning, a center side terminal apparatus is called and transmission of predetermined data is made.

That is, when any of the transmission flags is (are) set to "1" (YES in S601), or when a counted value of the counter after warning (the number of sheets of copies after warning) exceeds a predetermined set value (YES in S602, refer to S451), on the conditions that it is not in redial standby, the communication line with the center side modem 72 is not yet connected (NO in S605), and an off-hook signal and a selection signal are not transmitted to the communication line yet (NO in S607), command to the modem 52 of transmission of an off-hook signal and a selection signal to the communication line is made (S609). This line communication process by "YES in S602" is performed only in the case of the first "YES". That is, after transmission of warning data to the center, the S602 is neglected.

By the process in step S609, the determination in the next step S607 is "YES". In this case, when the telephone machine 53 at the user is "busy (it is in use of the communication line)", and the modem 52 can not transmit an off-hook signal and a selection signal to the communication line, accordingly (YES in S611), a time a predetermined time after is set as a redialing time (S613). By this, a determination in step S603 is "YES" until the above redialing time, and the calling process of center side modem 72 is not carried out. When it becomes the above redialing time, with NO in S603 → NO in S605 → NO in S607 → S609, transmission of an off-hook signal and a selection signal to the communication line is commanded again for modem 52.

When a determination is made that the modem 72 on the center side is "busy (the communication line on the center side is occupied)" (YES in S615) as the result of transmission of the off-hook signal and the selection signal from modem 52 to the communication line by the process in the step S609, the redialing time process (FIG. 31, described above) is carried out (S617). By this, the determination in the step S603 is "YES" until the time set in the redialing time process, and the calling process of the center side modem 72 is not implemented. At the time set in the process, the center side modem 72 is called again.

On the other hand, when the off-hook signal and the selection signal are transmitted from modem 52 to the communication line by the process of the step S609, and as a result, when the communication line is connected to the center side modem 72 (YES in S605), the transmittable condition by the data transmission permission from the center side is stood by.

In this way, when it becomes transmittable (YES in S621), predetermined data defined according to a transmission flag set (predetermined data including warning data in transmission made because the counter after warning exceeds a predetermined set value) is transmitted to the modem 72 on the center side (S625).

When all the data transmission are finished (YES in S623), the transmission flag is reset to "0" (S627), and the communication line on the data terminal side is disconnected (S629).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus collecting data related to a copying machine and communicating with a centralized control unit on the basis of the collected data, comprising:

communication means for calling said centralized control unit;

first control means for operating said communication means when a predetermined transmission condition is satisfied, said predetermined transmission condition including one with high priority and one with low priority;

determining means for determining that connection with said centralized control unit can not be made in spite of activation of said communication means;

differentiating means for differentiating priority of said predetermined transmission condition;

setting means for setting a retransmission time in response to outputs of said determination means and differentiating means, said setting means, when the priority of the predetermined transmission condition is low, setting a retransmission time in transmission permitting time periods excluding transmission forbidding time periods which are provided at predetermined time intervals, each of said transmission forbidding time periods being longer than a time period required for communication with said centralized control unit;

timer means for counting the present time; and second control means for operating said communication means again when the counted present time comes to the retransmission time.

2. The control apparatus according to claim 1, wherein said transmission condition with low priority is satisfied when the counted present time comes to a predetermined time set in advance.

3. The control apparatus according to claim 1, wherein said high priority transmission condition is satisfied when a trouble occurs.

4. A controlling apparatus collecting data related to a copying machine and communicating with a centralized control unit on the basis of the collected data, comprising:

communication means for calling said centralized control unit when a predetermined transmission condition is satisfied, said predetermined transmission condition including one with high priority and one with low priority;

timer means for counting the present time;

determining means for determining whether the counted present time is in a first time period in which activation of said communication means is permitted when the priority of said transmission condition is high, or the counted present time is in a second time period in which activation of said communication means is permitted when the priority of said predetermined transmission condition is low;

differentiating means for differentiating the priority of said predetermined transmission condition; and controlling means for activating the communication means in response to outputs of said determining means and differentiating means.

5. The controlling apparatus according to claim 4, wherein said predetermined transmission condition with low priority is satisfied when the counted present time comes to a predetermined time set in advance.

6. The controlling apparatus according to claim 4, wherein said predetermined transmission condition with high priority is satisfied when a trouble occurs.

7. The controlling apparatus according to claim 4, wherein said first time period and second time period alternately exist.

8. The controlling apparatus according to claim 4, wherein said first time period and said second time period exist for every predetermined time, respectively.

9. The controlling apparatus according to claim 4, wherein the lengths of said first time period and second time period are longer than times required for communication for one time between said controlling apparatus and said centralized control unit, respectively.

10. A controlling apparatus collecting data related to a copying machine and communicating with a centralized control unit on the basis of the collected data, comprising:

communication means for calling said centralized control unit;

first control means for activating said communication means when a predetermined transmission condition is satisfied, said predetermined transmission condition including one with high priority and one with low priority;

determining means for determining that connection with said centralized control unit can not be made in spite of activation of said communication means;

differentiating means for differentiating the priority of said predetermined transmission condition;

setting means for setting a retransmission time in response to outputs of said determining means and differentiating means, said setting means setting a retransmission time in a predetermined permittable condition according to the priority of the predetermined transmission condition;

timer means for counting the present time;

second controlling means for operating said communication means again when the counted present time comes to the retransmission time;

counting means for counting the number of times of retransmission of the communication means by said second controlling means;

deciding means for deciding that said counted number of times of retransmission exceeds a predetermined number of times; and third controlling means for changing said predetermined permittable condition in response to an output of said deciding means.

11. The controlling apparatus according to claim 10, wherein said transmission condition with low priority is satisfied when the counted present time comes to a predetermined time set in advance.

12. The controlling apparatus according to claim 10, wherein said transmission condition with high priority is satisfied when a trouble occurs.

13. The controlling apparatus according to claim 10, wherein said setting means sets a retransmission time on the basis of a random number.

14. A controlling apparatus collecting data related to a copying machine and communicating with a centralized control unit on the basis of the collected data, comprising:

communication means for calling said centralized control unit;

detecting means for detecting that a condition of said copying machine is abnormal on the basis of the data from said copying machine;

counting means for counting the number of copies made after the condition of said copying machine is detected to be abnormal by said detecting means;

first deciding means for deciding that a counted value of said counting means attains a predetermined value;

timer means for counting the present time;

second deciding means for deciding that the counted present time comes to a predetermined time; and controlling means for controlling said communication means to call the centralized control unit in response to outputs from any one of the first and second deciding means.

15. A copying machine controlling system including a control terminal for collecting data related to a copying machine and a centralized control unit for collecting the data from said control terminal, wherein said control terminal comprises;

communication means for calling said centralized control unit, timer means for counting a present time, storing means for storing a predetermined time Specified by said centralized control unit, first control means for operating said communication means when the counted present time comes to the predetermined time stored in said storing means, determining means for determining that connection with said centralized control unit can not be made in spite of activation of said communication means, setting means for setting a retransmission time in response to an output of said determining means, second control means for operating said communication means again when the counted present time comes to the retransmission time, counting means for counting the number of times of retransmission of said communication means by said second control means, and first transmitting means for transmitting said counted number of times of retransmission to said centralized control unit, and said centralized control unit comprises;

receiving means for receiving the number of times of retransmission transmitted from said first transmitting means of said control terminal, specifying means for specifying a next predetermined time for communication of the control terminal with the centralized control unit, said next predetermined time being specified based on the number of times of retransmission received by said receiving means, and second transmitting means for transmitting said specified next predetermined time to said control terminal.

16. The copying machine controlling system according to claim 15, wherein said specifying means of said centralized control unit judges whether or not the number of times of retransmission exceeds a predetermined threshold value and specifies a next predetermined time changed from the present predetermined time when the number of times of retransmission exceeds the predetermined threshold value.

17. The copying machine controlling system according to claim 15, wherein said first control means of said control terminal sets a transmission flag which represents a condition to communicate with said centralized control unit when the counted present time comes to the predetermined time, and resets the transmission flag only when connection with said centralized control unit is made.

18. The copying machine controlling system according to claim 15, wherein said control terminal comprises:

clearing means for clearing the number of times of retransmission counted by said counting means after said first transmission means transmits said counted number of times of retransmission.

19. A copying machine control system including a plurality of control terminals collecting data about each of a plurality of copying machines, and a centralized control unit for collecting the data from said control terminals, wherein said each control terminal comprises;

first timer means for counting a present time, communication means for calling said centralized control unit, and first storing means for storing a predetermined time specified by said centralized control unit, control means for operating said communication means when the counted present time comes to the predetermined time stored in said first storing means, and counting means for counting a number of times said communication means attempts to call said centralized control unit, wherein said control means provides said counted number of times to said communication means for transmission to said centralized control unit, and said centralized control unit comprises;

second timer means for counting the present time, detecting means for detecting if a control terminal does not make communication when the counted present time comes to the specified predetermined time, changing means for changing the predetermined time stored in said storing means for the control terminal detected by said detecting means based, at least in part, on said counted number of times, and transmitting means for transmitting the changed predetermined time to the corresponding control terminal.

20. A copying machine control system including a plurality of control terminals collecting data about a plurality of copying machines, respectively, and a centralized control unit for collecting the data from said control terminals, wherein said each control terminal comprises;

first timer means for counting a present time, communication means for calling said centralized control unit, first storing means for storing a predetermined time specified by said centralized control unit, control means for operating said communication means when the present time comes to the predetermined time stored in the storing means, and counting means for counting a number of times said communication means attempts to call said centralized control unit, wherein said control means provides said counted number of times to said communication means for transmission to said centralized control unit, and said centralized control unit comprises;

second timer means for counting the present time, second storing means for storing a predetermined time specified for each control terminal, detecting means for detecting if a control terminal fails to communicate with the centralized control unit when the counted present time comes to the specified predetermined time, calculating means for calculating the frequency of detected failures for each control terminal, changing means for changing the predetermined time stored in said second storing means for each of the control terminals based on one of the corresponding frequency calculated by the calculating means and the counted number of time, and transmitting means for transmitting the changed predetermined time to each control terminal.

21. The copying machine control system according to claim 20, wherein said changing means of said centralized control unit changes a predetermined time specified for a corresponding control terminal into a different time period when the frequency calculated by said calculating means at the specified predetermined time is higher than a predetermined value.

22. A centralized control unit for collecting data from a plurality of control terminals each collecting data of each of a plurality of copying machines, comprising:

timer means for counting a present time;

storing means for storing a predetermined time at which each of the control terminals should make communication to said centralized control unit;

receiving means for receiving a counted number of retransmission attempts by a control terminal;

detecting means for detecting if said control terminal fails to communicate with the centralized control unit when the counted present time comes to a predetermined time;

calculating means for calculating for each control terminal the frequency of detected failures;

changing means for changing the predetermined time stored in said storing means for each of the control terminals according to one of said calculated frequency and said counted number of time; and transmitting means for transmitting the changed predetermined time to each control terminal.

* * * * *